US012613360B2

(12) United States Patent
Okumura et al.

(10) Patent No.: US 12,613,360 B2
(45) Date of Patent: Apr. 28, 2026

(54) OPTICAL PRODUCT AND LIGHT CONCENTRATOR

(71) Applicants:TOKAI OPTICAL CO. LTD., Okazaki (JP); National University Corporation Tokai National Higher Education and Research System, Nagoya (JP)

(72) Inventors: Akira Okumura, Nagoya (JP); Keiji Nishimoto, Okazaki (JP); Chiaki Inoue, Okazaki (JP)

(73) Assignees: TOKAI OPTICAL CO. LTD., Okazaki (JP); National University Corporation Tokai National Higher Education and Research System, Nagoya (JP)

( * ) Notice: Subject to any disclaimer, the term of this patent is extended or adjusted under 35 U.S.C. 154(b) by 323 days.

(21) Appl. No.: 18/457,423

(22) Filed: Aug. 29, 2023

(65) Prior Publication Data

US 2023/0408732 A1 Dec. 21, 2023

Related U.S. Application Data

(63) Continuation of application No. PCT/JP2022/006466, filed on Feb. 17, 2022.

(30) Foreign Application Priority Data

Mar. 1, 2021 (JP) ................................ 2021-031974

(51) Int. Cl.
G02B 1/115 (2015.01)
G02B 5/20 (2006.01)
G02B 5/26 (2006.01)

(52) U.S. Cl.
CPC .............. *G02B 1/115* (2013.01); *G02B 5/208* (2013.01); *G02B 5/26* (2013.01)

(58) Field of Classification Search
CPC .......... G02B 1/115; G02B 5/208; G02B 5/26; G02B 5/0875; G02B 5/281; G02B 5/285;
(Continued)

(56) References Cited

U.S. PATENT DOCUMENTS 5,552,927 A 9/1996 Wheatly et al.
5,850,309 A * 12/1998 Shirai .................. G02B 5/0891
359/360
(Continued)

FOREIGN PATENT DOCUMENTS

EP 1 660 848 B1 5/2011
JP H03-107104 A 5/1991
(Continued)

OTHER PUBLICATIONS

International Search Report and Written Opinion dated May 10, 2022 (Application No. PCT/JP2022/006466).
(Continued)

*Primary Examiner* — Balram T Parbadia
(74) *Attorney, Agent, or Firm* — BURR PATENT LAW, PLLC

(57) ABSTRACT

An optical product comprising a base member and an optical multilayer film formed directly on or indirectly above a film formation surface of the base member. The optical multilayer film reflects light on a short wavelength side and suppresses reflection of light on a longer wavelength side than the light on the short wavelength side, and has a first layer to an eighth layer counted from the base member side, the first layer is a first Al layer, the second layer is a first low-refractive-index layer, the third layer is a first high-refractive-index layer, the fourth layer is a second low-
(Continued)

refractive-index layer, the fifth layer is a second Al layer, the sixth layer is a third low-refractive-index layer, the seventh layer is a second high-refractive-index layer, and the eighth layer is a fourth low-refractive-index layer.

16 Claims, 51 Drawing Sheets

(58) Field of Classification Search
CPC .. G02B 19/0023; G02B 19/0038; G02B 5/08;
G02B 5/28
See application file for complete search history.

(56) References Cited

U.S. PATENT DOCUMENTS

| | | | | |
|---|---|---|---|---|
| 9,013,102 | B1* | 4/2015 | Wedding | H01J 11/18 |
| | | | | 250/374 |
| 11,099,308 | B2* | 8/2021 | Weigl | G21K 1/062 |
| 2006/0262436 | A1* | 11/2006 | Shimada | G02B 5/0858 |
| | | | | 359/883 |
| 2007/0273989 | A1 | 11/2007 | Hoffmann et al. | |

| | | | | |
|---|---|---|---|---|
| 2008/0131693 | A1 | 6/2008 | Himura et al. | |
| 2008/0259439 | A1* | 10/2008 | Shiraishi | G02B 5/0891 |
| | | | | 359/359 |
| 2010/0072376 | A1* | 3/2010 | Ronda | G01T 1/2002 |
| | | | | 250/363.01 |
| 2013/0215501 | A1* | 8/2013 | Hisamitsu | B05D 5/06 |
| | | | | 359/360 |
| 2016/0259102 | A1* | 9/2016 | Taka | G02B 5/208 |
| 2018/0045865 | A1 | 2/2018 | Banerjee et al. | |
| 2019/0064409 | A1 | 2/2019 | Shimoda et al. | |
| 2019/0383978 | A1* | 12/2019 | Takazane | G02B 5/0875 |
| 2020/0400391 | A1 | 12/2020 | Suemitsu et al. | |

FOREIGN PATENT DOCUMENTS

| | | |
|---|---|---|
| JP | 2006-259124 A | 9/2006 |
| WO | 2007/013269 A1 | 2/2007 |
| WO | 2017/090218 A1 | 6/2017 |

OTHER PUBLICATIONS

Extended European Search Report dated Dec. 10, 2024 (Application No. 22763000.1).

* cited by examiner

COMPARATIVE EXAMPLE 1
(PC SUBSTRATE, ACTUAL MEASUREMENT WITH PRODUCTS)

IR/UV RATIO (SIMULATION)

OPTICAL PRODUCT AND LIGHT CONCENTRATOR

CROSS REFERENCE TO RELATED APPLICATION

This application is a Continuation of International Application No. PCT/JP2022/006466, filed on Feb. 17, 2022, which claims the benefit of Japanese Patent Application Number 2021-031974 filed on Mar. 1, 2021, the disclosures of which are incorporated by reference herein in their entireties.

FIELD OF THE INVENTION

The present application is based on and claims priority to Japanese Patent Application No. 2021-031974 filed on Mar. 1, 2021, and the entire content of the patent application is incorporated herein by reference.

The present invention relates to an optical product, for example, a long-wavelength absorption type mirror-equipped light concentrator, and a light concentrator that can belong to the optical product.

BACKGROUND OF THE INVENTION

A cold mirror described in JP 2006-259124 A has a substrate, a dielectric multilayer film in which thin films having different refractive indexes have been alternately stacked, and an infrared ray-transmissive film having a refractive index higher than any of the refractive indexes of the thin films forming the dielectric multilayer film. The infrared ray-transmissive film is interposed between the substrate and the dielectric multilayer film.

In this cold mirror, heat dissipation is performed through transmission of unnecessary infrared rays, and a high reflectance for visible light is obtained by the thin films forming the dielectric multilayer film.

It is described in [0015] that the number of the layers in the dielectric multilayer film is preferably set to six or more. In examples in [0025] and the subsequent paragraphs, it is described that the total of the film thickness of the infrared ray-transmissive film and the film thickness of the dielectric multilayer film is 0.88 μm.

If the total film thickness of the cold mirror is large, the film formation time is elongated. Accordingly, the temperature rise of the substrate during film formation increases.

In this case, stresses are applied to the substrate and each of the films owing to the difference between the linear expansion coefficient of the substrate and the linear expansion coefficient of the film, whereby the cold mirror might be deformed. In particular, if the substrate is formed of a resin, the substrate might be deformed or melted.

Because the cold mirror has characteristics of transmitting infrared rays (long wavelength) and reflecting visible light (short wavelength), the cold mirror can be used for a light concentrator of the Cherenkov Telescope Array (CTA).

The CTA is an astronomical observatory (gamma ray observation apparatus) for observing, from the ground, very-high-energy (10 gigaelectron volts to 100 teraelectron volts) gamma rays coming from celestial objects. When the very-high-energy gamma rays enter the earth's atmosphere, the gamma rays collide with atomic nuclei in the atmosphere so as to generate electron-positron pairs. Then, these electrons and positrons collide with other atomic nuclei so as to further emit gamma rays. Progressive increase in the electrons, positrons, and gamma rays leads to generation of an electromagnetic cascade (generation of a large amount of electrons, positrons, and gamma rays). These electrons and positrons advance at a speed higher than the light speed in the atmosphere. Consequently, Cherenkov radiation is generated and observed on the earth as light concentrated in a wavelength range of not shorter than 300 nm and not longer than 500 nm (300 to 500 nm, the same applies below).

In order to efficiently detect Cherenkov light having such a wavelength in an environment on the earth, it is necessary to use a photodetector that prevents Cherenkov light from becoming unobservable owing to light (night-sky-light) emitted from at least either of the night sky and stars. In conventional gamma ray observation, photomultiplier tubes (PMTs) are used, and vapor deposition on a photocathode of the PMTs is adjusted such that the quantum efficiency of the photocathode increases within the range of 300 to 500 nm, whereby the sensitivity of Cherenkov light detection has been successfully increased.

Meanwhile, in association with development of technologies of semiconductor photodetectors in recent years, there has been intensified momentum of using semiconductor photomultiplier elements (SiPMs) each having a high photon detection efficiency, for gamma ray observation as well. However, silicon semiconductors have properties that the sensitivities thereof for light having long wavelengths are also high. Thus, Cherenkov light cannot be selectively detected, and the detection amount of night-sky-light increases. Consequently, the efficiency of Cherenkov light detection could be decreased.

In order to improve the efficiency of Cherenkov light detection with SiPMs as well, it is conceivable to dispose a reflection type low-pass filter as a multilayer film onto a front surface of each SiPM and selectively cut light having a long wavelength out of light heading for a photodetector. However, SiPMs has a characteristic of secondarily emitting infrared rays. Therefore, the infrared rays have to be released to outside of SiPMs. If the reflection type low-pass filter is disposed on a front surface of a SiPM, the secondarily emitted infrared rays are reflected and returned to the SiPM. Consequently, an attempt to eliminate night-sky-light by means of disposition of the low-pass filter leads to increase in the detection amount of the secondarily emitted infrared rays.

A main object of the present invention is to provide a short-wavelength selective reflection type optical product in which deformation at the time of production is suppressed.

Also, another main object of the present invention is to provide a light concentrator which is including SiPMs, for example. Although SiPMs that themselves cannot adjust the sensitivity for each wavelength range and that secondarily emits infrared rays, the light concentrator can increase the sensitivity of detecting light in a predetermined wavelength range such as Cherenkov light.

SUMMARY OF THE INVENTION

In order to achieve the above-described object, an optical product is provided. The optical product includes a base member and an optical multilayer film formed directly on or indirectly above a film formation surface of the base member. The optical multilayer film reflects light on a short wavelength side and suppresses reflection of light on a longer wavelength side than the light on the short wavelength side. The optical multilayer film has a first layer, a second layer, a third layer, a fourth layer, a fifth layer, a sixth layer, a seventh layer, and an eighth layer counted from the base member side. The first layer is a first Al layer formed of Al, the second layer is a first low-refractive-index layer formed of a low-refractive-index material, the third layer is a first high-refractive-index layer formed of a high-refractive-index material, the fourth layer is a second low-refractive-index layer formed of a low-refractive-index material, the fifth layer is a second Al layer formed of Al, the sixth layer is a third low-refractive-index layer formed of a low-refractive-index material, the seventh layer is a second high-refractive-index layer formed of a high-refractive-index material, and the eighth layer is a fourth low-refractive-index layer formed of a low-refractive-index material.

Also, another optical product is provided. The optical product includes a base member and an optical multilayer film formed directly on or indirectly above a film formation surface of the base member. The optical multilayer film reflects light on a short wavelength side and suppresses reflection of light on a longer wavelength side than the light on the short wavelength side. The optical multilayer film has a first layer counted from the base member side, the first layer being a metal layer formed of a metal. The optical multilayer film further has one or more Al layers, at least one of a low-refractive-index layer disposed on the base member side relative to each of the Al layers and a high-refractive-index layer disposed on the base member side relative to the Al layer, and at least one of a low-refractive-index layer disposed on an air side relative to the Al layer and a high-refractive-index layer disposed on the air side relative to the Al layer. The low-refractive-index layer is formed of a low-refractive-index material and the high-refractive-index layer is formed of a high-refractive-index material. The metal layer has a physical film thickness of not smaller than 20 nm. The Al layer that is closest to the air side has a physical film thickness of not smaller than 5 nm and not larger than 35 nm.

Further, in order to achieve the above-described object, a light concentrator in which either of the above optical products is used is provided.

A main effect of the present invention is to provide a short-wavelength selective reflection type optical product in which deformation at the time of production is suppressed.

Also, another main effect of the present invention is to provide a light concentrator which is including SiPMs, for example. Although SiPMs that themselves cannot adjust the sensitivity for each wavelength range and that secondarily emits infrared rays, the light concentrator can increase the sensitivity of detecting light in a predetermined wavelength range such as Cherenkov light.

DETAILED DESCRIPTION OF THE INVENTION

Hereinafter, exemplary embodiments of the present invention will be described with reference to the drawings as appropriate.

The present invention is not limited to the following examples.

Figure 1:
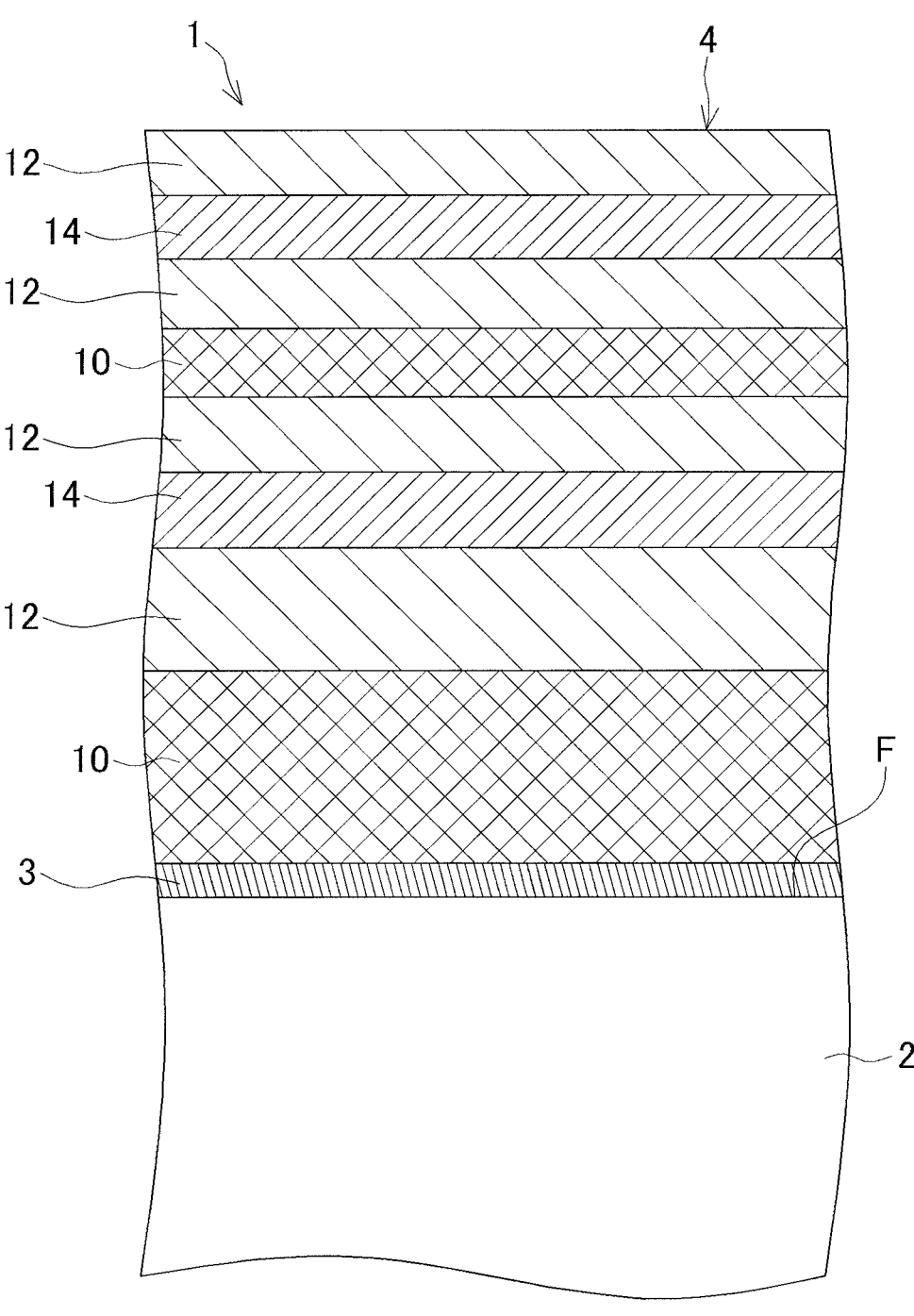
FIG. 1 is a schematic cross-sectional view of an optical product according to an embodiment of the present invention.

As shown in FIG. 1, an optical product 1 according to embodiment 1 includes a base member 2 and an optical multilayer film 4 formed above a film formation surface F of the base member 2 via underlayer 3.

The base member 2 is a base for forming the optical product 1. Here, the base member 2 has a plate shape (as in a substrate). The shape of the base member 2 may be a flat plate shape, a curved plate shape, or a shape other than a plate shape, such as a block shape.

As the material of the base member 2, a plastic is used, and a polycarbonate (PC) resin as a thermosetting resin is used herein. The material of the base member 2 is not limited to PC and may be, for example, a polyurethane resin, a thiourethane resin, an episulfide resin, a polyester resin, an acrylic resin, a polyethersulfone resin, a poly(4-methylpentene-1) resin, a diethylene glycol bis(allyl carbonate) resin, or a combination of these resins. Alternatively, the material of the base member 2 may be one other than plastic, such as glass.

The film formation surface F of the base member 2 is present at the front surface thereof, and the optical multilayer film 4 is provided above this front surface via the underlayer 3. The optical multilayer film 4 may be provided to each of both the front surface and the back surface or may be provided to each of three or more surfaces of a base member 2 having a block shape, or the like. These plurality of optical multilayer films 4 may have configurations identical to one another or may have configurations different from one another with, for example, the film thicknesses of some or all of the optical multilayer films being different. The optical multilayer film 4 may be provided directly on the film formation surface F of the base member 2 without providing any underlayer 3. Furthermore, the underlayer 3 may be composed of a plurality of layers. In addition, a front layer film such as an antifouling film (a water-repellent film, an oil-repellent film, or a water-repellent and oil-repellent film) may be provided on the front surface side (an air side, i.e., an opposite side to the base member 2) of the optical multilayer film 4.

The underlayer 3 is provided to attain at least one of the following two objects. That is, firstly, the underlayer 3 is provided to cause the adhesiveness of the optical multilayer film 4 (in particular, an Al layer 10 as a first layer counted from the base member 2 side (the same applies below)) to the base member 2 to be higher than that in the case where film formation is performed directly on the base member 2. Secondly, the underlayer 3 is provided to suppress gas emission from the base member 2 and maintain the film quality of the optical multilayer film 4 (the Al layer 10 as the first layer) above the base member 2.

Alternatively, the underlayer 3 may be provided to attain another object, instead of the at least one of these objects or in addition to the at least one of these objects.

The underlayer 3 is, for example, alumina ($Al_2O_3$), chromium (Cr), or a combination of these substances.

Alternatively, the underlayer 3 may be treated as a constituent (first layer) of the optical multilayer film 4.

The optical multilayer film 4 is a multilayer film having a structure with a total of eight layers.

The optical multilayer film 4 includes the Al layer 10 (first Al layer) as the first layer, a low-refractive-index layer 12 (first low-refractive-index layer) as a second layer, a high-refractive-index layer 14 (first high-refractive-index layer) as a third layer, a low-refractive-index layer 12 (second low-refractive-index layer) as a fourth layer, an Al layer 10 (second Al layer) as a fifth layer, a low-refractive-index layer 12 (third low-refractive-index layer) as a sixth layer, a high-refractive-index layer 14 (second high-refractive-index layer) as a seventh layer, and a low-refractive-index layer 12 (fourth low-refractive-index layer) as an eighth layer.

The optical multilayer film 4 only has to have the structure with these eight layers and may have nine or more layers (for example, ten layers or twelve layers) as a result of further having one or more layers on the base member 2 side relative to the first layer or further having one or more layers on the air side relative to the eighth layer.

Each of the Al layers 10 is formed of aluminum.

The Al layer 10 as the first layer reflects or absorbs mainly light having wavelengths in an ultraviolet range to a visible range (for example, light having wavelengths of 300 to 750 nm). Here, the visible range is defined as a range from 400 to 750 nm. Therefore, the material of the underlayer 3, and the like, basically do not influence optical properties of the optical multilayer film 4. Also, the physical film thickness of the Al layer 10 as the first layer is set to be, for example, not smaller than 100 nm from the viewpoint of ensuring sufficient reflection and absorption. Furthermore, the physical film thickness of the Al layer 10 as the first layer is set to be, for example, not larger than 200 nm, not larger than 150 nm, or not larger than 130 nm from the viewpoint of suppressing decrease in reflectance due to increase in surface roughness and suppressing increase in cost due to increase in film thickness.

The visible range is not limited to the above range and, for example, may have a lower limit of either of 410 and 420 nm or have an upper limit of any of 700, 720, 780, and 800 nm.

The Al layer 10 as the fifth layer significantly contributes mainly to increase/decrease in the reflectance on a long wavelength side. If the physical film thickness of the Al layer 10 as the fifth layer is zero (i.e., the Al layer 10 as the fifth layer is absent), the reflectance on the long wavelength side becomes high relative to the reflectance on a shorter wavelength side than the long wavelength side.

Meanwhile, if the physical film thickness of the Al layer 10 as the fifth layer is small, the reflectance on the long wavelength side becomes low relative to the reflectance on the short wavelength side, whereas, if the physical film thickness of the Al layer 10 as the fifth layer is large, the reflectance on the long wavelength side becomes high relative to the reflectance on the short wavelength side. Such characteristics are realized mainly through absorption of light on the long wavelength side by the Al layer 10 as the fifth layer. Thus, if the physical film thickness of the Al layer 10 as the fifth layer is mainly adjusted on the basis of such characteristics, the properties, of the optical multilayer film 4, of reflecting light on the short wavelength side and suppressing reflection of light on the longer wavelength side than the light on the short wavelength side are adjusted. The optical product 1 (optical multilayer film 4) having such properties can be said to be a long-wavelength absorption type mirror and can be said to be a selective reflection type mirror.

Further, if the physical film thickness of the Al layer 10 as the fifth layer is larger than a predetermined value, the Al layer 10 as the fifth layer itself acts as an ordinary mirror formed of a metal and comes to have a high reflectance regardless of whether the reflectance is one on the long wavelength side or the short wavelength side.

The band on the long wavelength side can be arbitrarily set between the UV range and an infrared range through adjustment in film designing. For example, taking Cherenkov light into account, a wavelength range of not shorter than 600 nm may be set as a long wavelength side, and a wavelength range of shorter than 600 nm may be set as a short wavelength side. In this case, for example, a performance of the optical product 1 that is the lowness regarding reflection of light on the long wavelength side relative to reflection of light on the short wavelength side, is expressed with an IR/UV ratio defined by the following formula (1). That is, a lower IR/UV ratio leads to further suppression of reflection of the light on the long wavelength side relative to reflection of the light on the short wavelength side and leads to a more favorable performance of the optical product 1 in which reflection is achieved on the short wavelength side and reflection is suppressed on the long wavelength side as in a cold mirror. Hereinafter, an optical product in which reflection is achieved on the short wavelength side and reflection is suppressed on the long wavelength side is referred to as a cold mirror regardless of whether the band is on the short wavelength side or the long wavelength side.

Also, for example, an IR/UV ratio' serving as an index similar to the IR/UV ratio is defined by the following formula (2).

$$IR/UV \text{ ratio} = \frac{\text{Average reflectance at not shorter than 600 nm and not longer than 800 nm}}{\text{Average reflectance at not shorter than 300 nm and not longer than 500 nm}} \quad (1)$$

$$IR/UV \text{ ratio}' = \frac{\text{Average reflectance at not shorter than 600 nm and not longer than 800 nm}}{\text{Average reflectance at not shorter than 350 nm and not longer than 500 nm}} \quad (2)$$

The physical film thickness of the Al layer 10 as the fifth layer is set to be, for example, not smaller than 5 nm and not larger than 30 nm from the viewpoint of ensuring more favorable performances (lower IR/UV ratio, IR/UV ratio', and the like) in the optical product 1.

If the physical film thickness of the Al layer 10 as the fifth layer is smaller than 5 nm, it becomes comparatively difficult to uniformly form the Al layer 10 as the fifth layer. Meanwhile, if the physical film thickness of the Al layer 10 as the fifth layer is larger than 30 nm, more of an Al material or the like becomes necessary accordingly, whereby cost increases.

Each of the low-refractive-index layers 12 is formed of a low-refractive-index material that is an inorganic dielectric and that is a metal oxide or a metal fluoride. The low-refractive-index material is, for example, silicon oxide ($SiO_2$), calcium fluoride ($CaF_2$), magnesium fluoride ($MgF_2$), or a mixture of two or more types of these substances.

Each of the high-refractive-index layers 14 is formed of a high-refractive-index material that is an inorganic dielectric and that is a metal oxide. The high-refractive-index material is, for example, tantalum oxide ($Ta_2O_5$), zirconium oxide ($ZrO_2$), titanium oxide ($TiO_2$), niobium oxide ($Nb_2O_5$), hafnium oxide ($HfM_2$), selenium oxide ($CeO_2$), aluminum oxide ($Al_2O_3$), yttrium oxide ($YO_2$), or a mixture of two or more types of these substances.

At least either of the low-refractive-index layers 12 and the high-refractive-index layers 14 may be formed of materials identical to one another. In this case, film designing is easy, and cost for film formation is low.

The physical film thickness of each of the low-refractive-index layers 12 and the high-refractive-index layers 14 is mainly a factor in determining a reflection band in the optical multilayer film 4. For example, if the physical film thicknesses of all the low-refractive-index layers 12 and all the high-refractive-index layers 14 are set to be large, the reflection band is shifted to the long wavelength side, whereas, if the physical film thicknesses of all the low-refractive-index layers 12 and all the high-refractive-index layers 14 are set to be small, the reflection band is shifted to the short wavelength side.

The underlayer 3 and the layers of the optical multilayer film 4 in the optical product 1 are sequentially formed on the film formation surface F of the base member 2 through physical vapor deposition (PVD such as vacuum deposition and sputtering). The underlayer 3 and the layers of the optical multilayer film 4 are produced in the same method from the viewpoint of ensuring ease of production, for example.

Alternatively, a production method for a part of the underlayer 3 and the layers of the optical multilayer film 4 may be different from a production method for another part.

A case where the underlayer 3 and the layers of the optical multilayer film 4 are formed through vacuum deposition by a vapor deposition device 51 will be described below.

Figure 2:
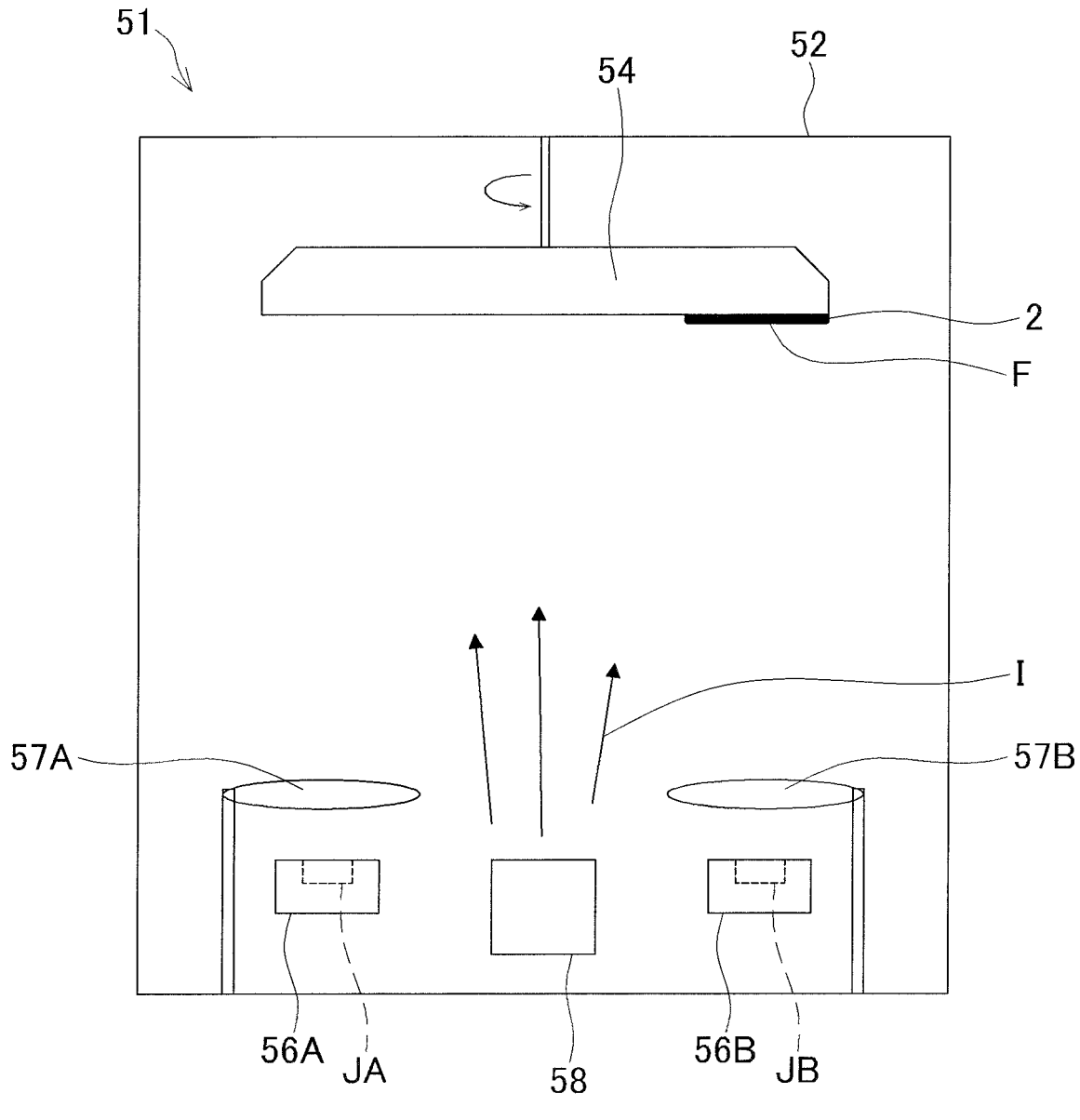
FIG. 2 is a schematic diagram of a vapor deposition device in a case where the optical product according to the embodiment of the present invention is formed through vapor deposition.

FIG. 2 is a schematic diagram of the vapor deposition device 51.

The vapor deposition device 51 has a chamber 52, a vapor deposition dome 54, a plurality of (here, two) evaporation source holders 56A and 56B, a plurality of (here, two) shutters 57A and 57B, and an ion gun 58.

The chamber 52 is a sealable container. The inside of the chamber 52 is made vacuum by a pump (not shown).

The vapor deposition dome 54 has a disc shape. The vapor deposition dome 54 is horizontally provided so as to be rotatable about a vertical central axis in the chamber 52. The vapor deposition dome 54 holds the base member 2. The number of the base members 2 to be held by the vapor deposition dome 54 may be one as shown in FIG. 2 or may be two or more.

The evaporation source holder 56A is disposed so as to be opposed to the vapor deposition dome 54 and retains an evaporation source JA so as to enable heating thereof. The evaporation source holder 56B is configured in the same manner as the evaporation source holder 56A, except that the evaporation source holder 56B retains an evaporation source JB so as to enable heating thereof, the evaporation source JB being different from the evaporation source JA.

The shutter 57A is provided such that the state thereof is switchable between a state of shielding the upper side (vapor deposition dome 54 side) of the evaporation source holder 56A and a state of not shielding said upper side. The shutter 57B is provided such that the state thereof is switchable between a state of shielding the upper side of the evaporation source holder 56B and a state of not shielding said upper side.

The ion gun 58 is provided on the evaporation source holder 56 side and radiates ionized gases (ion beams I) into the chamber 52 (as an ion source). The gases are $O_2$ gas and Ar gas. Alternatively, the gases may be replaced with other gases. For example, Ar gas may be replaced with another rare gas or may be omitted.

Regarding the evaporation source holder 56A, the evaporation source JA, the shutter 57A, and the like, only one set of them may be provided, or three or more sets of them may be provided.

First, in the vapor deposition device 51, the inside of the chamber 52 is made vacuum, and the ion gun 58 radiates ionized $O_2$ gas and ionized Ar gas under respective predetermined conditions as pretreatment so as to clean the base member 2 (ion cleaning). More specifically, even if organic matter or the like is adhered on the base member 2, such radiation of the ion beams I causes the organic matter or the like to be decomposed and peeled off owing to the ion beams I. Through such cleaning, the adhesiveness of each film to be formed later is improved.

Then, in a state where the shutter 57A is opened and the shutter 57B is closed, $Al_2O_3$ as the evaporation source JA is heated, and ion beams I are radiated from the ion gun 58 toward the base member 2 rotated and moved by the vapor deposition dome 54.

$Al_2O_3$ evaporated from the evaporation source JA through the heating turns into the underlayer 3 formed of $Al_2O_3$ on the film formation surface F of the base member 2. The underlayer 3 is more stably fixed to the film formation surface F of the base member 2 owing to actions of the ion beams I and the like.

The physical film thickness of the underlayer 3 is controlled according to a vapor deposition rate and a vapor deposition time. The physical film thicknesses of the other layers are also controlled in the same manner.

Subsequently, in a state where the shutter 57B is opened and the shutter 57A is closed, and in a state where no ion beam I is radiated, Al as the evaporation source JB is heated, and the Al evaporated from the evaporation source JB turns into the Al layer 10 as the first layer of the optical multilayer film 4 on the underlayer 3.

Further, the evaporation source JA is replaced with a vapor deposition material for each of the low-refractive-index layers 12. In a state where the shutter 57A is opened and the shutter 57B is closed, the vapor deposition material for the low-refractive-index layer 12 is heated and turns into the low-refractive-index layer 12 as the second layer on the Al layer 10.

From this point onwards, operations such as an operation of replacing either of the evaporation sources JA and JB with a vapor deposition material for each of the high-refractive-index layers 14 or the like and an operation of radiating ion beams I based on oxygen gases (including, as appropriate, Ar gas) as necessary, are performed such that the high-refractive-index layer 14 as the third layer, the low-refractive-index layer 12 as the fourth layer, the Al layer 10 as the fifth layer, the low-refractive-index layer 12 as the sixth layer, the high-refractive-index layer 14 as the seventh layer, and the low-refractive-index layer 12 as the eighth layer are sequentially vapor-deposited.

In this manner, the optical product 1 is completed.

Figure 3:
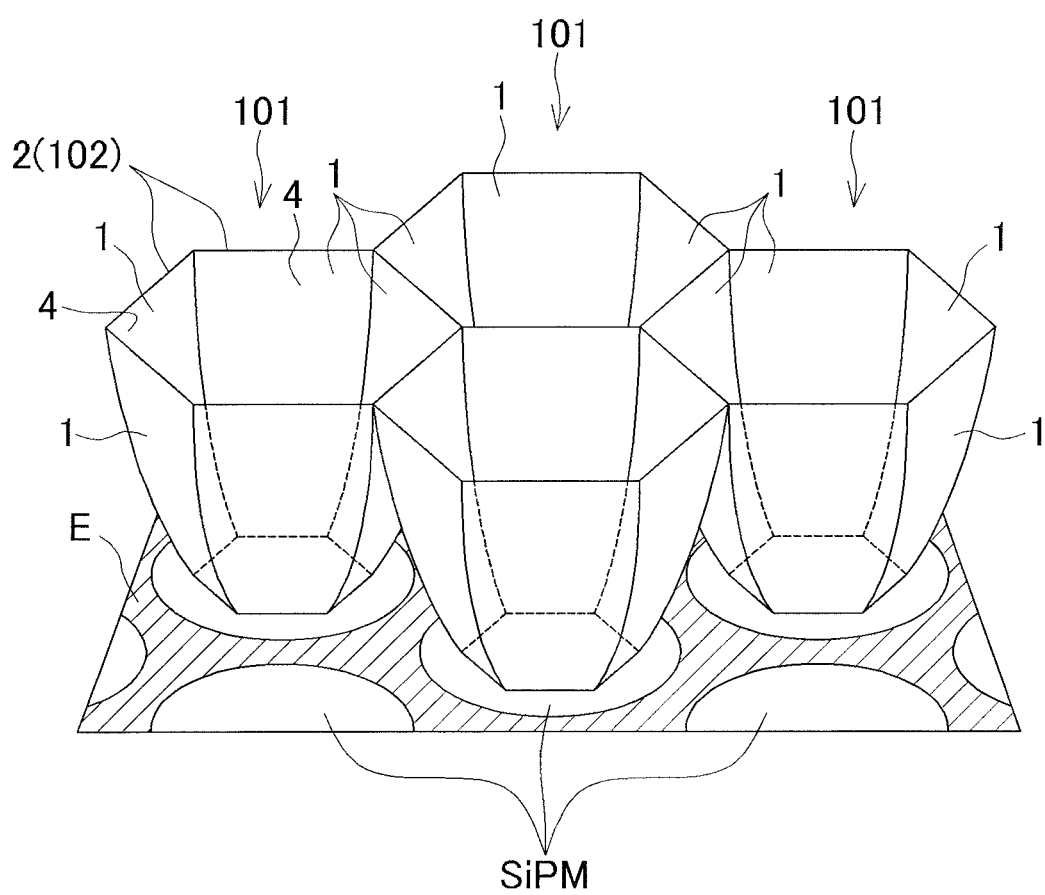
FIG. 3 is a schematic perspective view of a group of light concentrators according to the embodiment of the present invention, and a part of an element disposition surface.
Figure 4:
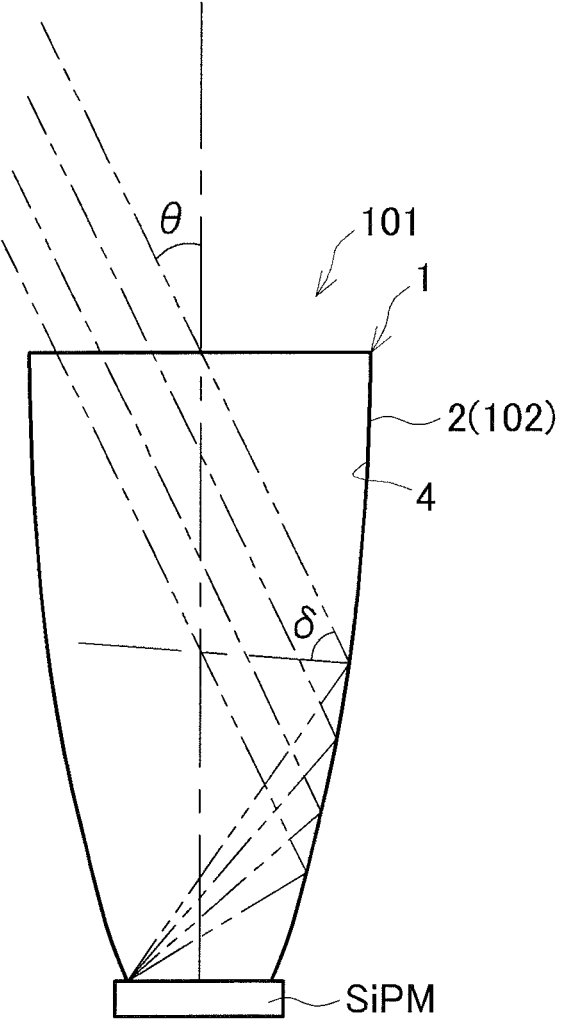
FIG. 4 is a schematic central vertical end view of any of light concentrators according to the embodiment of the present invention.

As shown in FIG. 3 and FIG. 4, a plurality of light concentrators 101 are provided correspondingly to a plurality of respective SiPMs. Each of the light concentrators 101 is for the CTA. Each light concentrator 101 may be used for another purpose.

The SiPMs are arranged on an element arrangement portion E in a staggered pattern as seen from above. The number of the SiPMs provided is, for example, about 2000.

Each light concentrator 101 has a hexagonal tubular shape. Each light concentrator 101 is disposed on the corresponding SiPM in a state of enclosing a center portion of the SiPM. Each light concentrator 101 dwindles from an upper end portion toward a lower end thereof (in a shape of cone). The coating in the present invention is applied on the inner surface of each light concentrator 101. The shape of each light concentrator 101 may be a quadrangular tubular shape or the like, the shape of a part of a tube such as a semi-cylindrical shape, a curved plate shape, or a flat plate shape. Also, each light concentrator 101 may dwindle only at a center portion thereof in the up-down direction or may dwindle from a lower end portion toward an upper end thereof, or does not have to dwindle.

The height of each light concentrator 101 is, for example, about 70 mm. The length of one side of a hexagonal opening at the upper end of each light concentrator 101 is, for example, about 50 mm.

Surfaces (six surfaces) forming each light concentrator 101 are the optical products 1 with the film formation surfaces F being located on the inner surface side. The base members 2 in a light concentrator 101 are arranged in a tubular pattern, to form a light concentrator body 102. In each light concentrator 101, the optical multilayer films 4 are arranged on the inner surface of the light concentrator body 102. Each light concentrator 101 is formed of the optical products 1 as cold mirrors.

Alternatively, the optical multilayer films 4 may be arranged on only a part of the inner surface of the light concentrator body 102. Alternatively, each light concentrator 101 may be formed by fixing the optical products 1 including the base members 2 onto the inner surface of a base body having a hexagonal tubular shape. In this case, the base body and the base members 2 form the light concentrator body 102.

Light from the sky is reflected by a mirror having a parabolic shape and selectively guided by each optical product 1, to be concentrated on the SiPM. In particular, as shown in FIG. 4, light that is incident at an incident angle θ with respect to a normal (the central axis of the light concentrator 101) to the SiPM is incident on the inner surface of the light concentrator 101 at a reflection angle S with respect to a normal to the inner surface and is reflected at the same reflection angle S with respect to the normal, to reach the SiPM.

For example, each light concentrator 101 selectively guides a 300-to-500-nm light to the corresponding SiPM by means of the optical multilayer film 4 having a high reflectance for the 300-to-500-nm light and a low reflectance for light in a wavelength range of longer than 500 nm. A part or the entirety of light in the wavelength range of longer than 500 nm is absorbed by the optical multilayer film 4.

Infrared rays secondarily emitted from the SiPM are light in the wavelength range of longer than 500 nm. Therefore, reflection of the infrared rays on the optical multilayer film 4 is suppressed. Consequently, a situation in which the infrared rays are returned to the SiPM side and influence detection of light on the short wavelength side is inhibited from occurring.

The light concentrator 101 is arranged in a state where one side of the opening at the upper end of another light concentrator 101 is in contact with one side of the opening at the upper end of an adjacent one of the light concentrator 101. A group of light concentrators 101, 101, 101 . . . has a honeycomb shape as seen from above. An upper portion of the group of light concentrators 101, 101, 101 . . . forms a honeycomb structure having an external shape with a diameter of, for example, about 3 m.

The CTA includes the group of light concentrators 101, 101, 101 . . . and the element arrangement portion E, and detects Cherenkov light that comes from the night sky and that is concentrated within 300 to 500 nm.

An optical product in embodiment 2 is configured in the same manner as the optical product 1 in embodiment 1, except for the optical multilayer film. Hereinafter, components configured in the same manner as those of the optical product 1 in embodiment 1 are, as appropriate, denoted by the same reference characters and not described.

The configuration of an optical multilayer film in embodiment 2 differs from that of the optical multilayer film 4 in embodiment 1, but, similar to the optical multilayer film 4 in embodiment 1, satisfies the following various conditions.

That is, the optical multilayer film in embodiment 2 includes a low-refractive-index layer 12 formed of a dielectric, a high-refractive-index layer 14 formed of a dielectric, a metal layer formed of a metal, and a second Al layer formed of Al. The metal layer is, for example, a first Al layer formed of Al or an Ag layer formed of Ag (silver). The physical film thickness of the metal layer is preferably not smaller than 20 nm.

Also, on the air side relative to the second Al layer, a third Al layer formed of Al may further be disposed, and, likewise, fourth and subsequent Al layers formed of Al may be disposed as appropriate.

Further, the metal layer is disposed between the second Al layer and the base member 2 and preferably disposed as a first layer counted from the base member 2 side. If the metal layer is an Ag layer or the like (formed of a material other than Al), no first Al layer is present. However, in order to maintain clarity, the second Al layer is not renamed, i.e., remains the second Al layer, and, if a third Al layer is further present, third and subsequent Al layers are not renamed, either.

In addition, at least either of one or more low-refractive-index layers 12 and one or more high-refractive-index layers 14 are disposed between the metal layer and the second Al layer.

Moreover, at least either of one or more low-refractive-index layers 12 and one or more high-refractive-index layers 14 are disposed on the air side relative to the second Al layer.

Each of the layers of the optical multilayer film in embodiment 2 is formed in the same manner as the corresponding layer of the optical multilayer film 4 in embodiment 1.

The Al layer that is closest to the air side significantly contributes mainly to increase/decrease in the reflectance on the long wavelength side in the same manner as the Al layer 10 as the fifth layer (closest to the air side) in embodiment 1. If the physical film thickness of the Al layer 10 as the fifth layer is zero (i.e., the Al layer 10 as the fifth layer is absent), the reflectance on the long wavelength side becomes high relative to the reflectance on the shorter wavelength side than the long wavelength side.

Meanwhile, if the physical film thickness of the Al layer that is closest to the air side is small, the reflectance on the long wavelength side becomes low relative to the reflectance on the short wavelength side, whereas, if the physical film thickness of the Al layer that is closest to the air side is large, the reflectance on the long wavelength side becomes high relative to the reflectance on the short wavelength side. Such characteristics are realized mainly through absorption of light on the long wavelength side by the Al layer that is closest to the air side. Thus, if the physical film thickness of the Al layer that is closest to the air side is mainly adjusted on the basis of such characteristics, the properties, of the optical multilayer film 4, of reflecting light on the short wavelength side and suppressing reflection of light on the longer wavelength side than the light on the short wavelength side are adjusted.

Further, if the physical film thickness of the Al layer that is closest to the air side is larger than a predetermined value, the Al layer that is closest to the air side itself acts as an ordinary mirror formed of a metal and comes to have a high reflectance regardless of whether the reflectance is one on the long wavelength side or the short wavelength side.

Each of bands on the long wavelength side and the short wavelength side in embodiment 2 can be arbitrarily set between the UV range and the infrared range through adjustment in film designing in the same manner as that in embodiment 1.

In embodiment 2, similar to embodiment 1, the short wavelength side is set to be 300 to 500 nm, the long wavelength side is set to be 600 to 800 nm, and a performance can be evaluated according to various IR/UV ratios.

Alternatively, in embodiment 2, taking a periscope camera or the like into account, the short wavelength side can be set to be 400 to 600 nm, and the long wavelength side can be set to be 700 to 900 nm. In this case, for example, a performance that is the lowness regarding reflection of light on the long wavelength side relative to reflection of light on the short wavelength side, is expressed with an IR/VL ratio that is similar to the IR/UV ratio and that is defined by the following formula (3). In embodiment 1 as well, the short wavelength side may be set to be 400 to 600 nm, the long wavelength side may be set to be 700 to 900 nm, and the performance may be evaluated according to the IR/VL ratio. Also, at least either of the upper limit and the lower limit of the wavelength range on the short wavelength side and the upper limit and the lower limit of the wavelength range on the long wavelength side, may be changed.

The periscope camera is a camera in which visible light (VL) from a lens is turned back by a mirror as in a periscope so as to be sent to an imaging element disposed at an angle (for example, 90°) different from that of the lens so that imaging is performed. The periscope camera is compact for the length of the optical path, and thus is built in, for example, a mobile terminal. The imaging element is sensitive also to near-infrared rays (IR) in addition to visible light. Near-infrared rays that can hardly be seen could adversely influence an image that is generated. Thus, if visible light is reflected by the mirror so as to be guided to the imaging element and near-infrared rays are transmitted so as not to be guided to the imaging element, the image quality is improved. With properties of a general imaging element, if light having a wavelength of not shorter than 700 nm is cut, the image quality is improved. Also, since near-infrared rays are not guided to the imaging element, rise in the temperature of the imaging element is suppressed accordingly, whereby operation of the imaging element is further stabilized.

$$IR/VL \text{ ratio} = \frac{\begin{array}{c}\text{Average reflectance at}\\\text{not shorter than 700 nm and}\\\text{not longer than 900 nm}\end{array}}{\begin{array}{c}\text{Average reflectance at}\\\text{not shorter than 400 nm and}\\\text{not longer than 600 nm}\end{array}} \quad (3)$$

The physical film thickness of the second Al layer that is closest to the air side is preferably not smaller than 5 nm and not larger than 35 nm and more preferably not smaller than 5 nm and not larger than 30 nm from the viewpoint of ensuring more favorable performances (lower IR/UV ratio, IR/UV ratio', IR/VL ratio, and the like) in the optical product, for example. In the case of presence of a third Al layer, a fourth Al layer, . . . as well, the physical film thickness of the Al layer that is closest to the air side is preferably set to be not smaller than 5 nm and not larger than 35 nm and more preferably set to be not smaller than 5 nm and not larger than 30 nm in the same manner.

If the physical film thickness of the Al layer that is closest to the air side is smaller than 5 nm, it becomes comparatively difficult to uniformly form the Al layer that is closest to the air side. Meanwhile, if the physical film thickness of the Al layer that is closest to the air side is larger than 35 nm, more of an Al material or the like becomes necessary accordingly, whereby cost increases.

An optical multilayer film in embodiment 2-1 belonging to such embodiment 2 has a total of six layers which are a first Al layer (metal layer), a low-refractive-index layer 12, a high-refractive-index layer 14, a second Al layer, a low-refractive-index layer 12, and a high-refractive-index layer 14 in order from the first layer. The physical film thickness of the first Al layer as the first layer is not smaller than 20 nm. The physical film thickness of the second Al layer as the fourth layer is not smaller than 5 nm and not larger than 30 nm. If the metal layer is defined as "M", the Al layer is defined as "A", each of the low-refractive-index layers 12 is defined as "L", and each of the high-refractive-index layers 14 is defined as "H", the optical multilayer film in embodiment 2-1 is expressed as "MLHALH".

Also, an optical multilayer film in embodiment 2-2 belonging to embodiment 2 has a total of six layers which are a first Al layer (metal layer), a low-refractive-index layer 12, a high-refractive-index layer 14, a second Al layer, a low-refractive-index layer 12, and a high-refractive-index layer 14 in order from the first layer. The physical film thickness of the first Al layer as the first layer is not smaller than 20 nm. The physical film thickness of the second Al layer as the fourth layer is not smaller than 5 nm and not larger than 30 nm. The optical multilayer film in embodiment 2-2 is expressed as "MLHALH" in the same manner as that in embodiment 2-1.

Further, an optical multilayer film in embodiment 2-3 belonging to embodiment 2 has a total of six layers which are an Ag layer (metal layer), a low-refractive-index layer 12, a high-refractive-index layer 14, a second Al layer, a low-refractive-index layer 12, and a high-refractive-index layer 14 in order from the first layer. The physical film thickness of the Ag layer as the first layer is not smaller than 20 nm. The physical film thickness of the second Al layer as the fourth layer is not smaller than 5 nm and not larger than 30 nm. The optical multilayer film in embodiment 2-3 is expressed as "MLHALH" in the same manner as that in embodiment 2-1.

In addition, an optical multilayer film in embodiment 2-4 belonging to embodiment 2 has a total of five layers which are a first Al layer (metal layer), a low-refractive-index layer 12, a high-refractive-index layer 14, a second Al layer, and a high-refractive-index layer 14 in order from the first layer. The physical film thickness of the first Al layer as the first layer is not smaller than 20 nm. The physical film thickness of the second Al layer as the fourth layer is not smaller than 5 nm and not larger than 30 nm. The optical multilayer film in embodiment 2-4 is expressed as "MLHAH".

Also, an optical multilayer film in embodiment 2-5 belonging to embodiment 2 has a total of nine layers which are a first Al layer (metal layer), a low-refractive-index layer 12, a high-refractive-index layer 14, a second Al layer, a low-refractive-index layer 12, a high-refractive-index layer 14, a third Al layer, a low-refractive-index layer 12, and a high-refractive-index layer 14 in order from the first layer. The physical film thickness of the first Al layer as the first layer is not smaller than 20 nm. The physical film thickness of the third Al layer as the seventh layer is not smaller than 5 nm and not larger than 30 nm. The optical multilayer film in embodiment 2-5 is expressed as "MLHALHALH". If the number of times "LHA" is repeated is written on the upper right of "LHA", the optical multilayer film in embodiment 2-5 is expressed as "M(LHA)$^2$LH".

Further, an optical multilayer film in embodiment 2-6 belonging to embodiment 2 has a total of eleven layers which are a first Al layer (metal layer), a low-refractive-index layer 12, a high-refractive-index layer 14, a low-refractive-index layer 12, a high-refractive-index layer 14, a second Al layer, a low-refractive-index layer 12, a high-refractive-index layer 14, a third Al layer, a low-refractive-index layer 12, and a high-refractive-index layer 14 in order from the first layer. The physical film thickness of the first Al layer as the first layer is not smaller than 20 nm. The physical film thickness of the third Al layer as the ninth layer is not smaller than 5 nm and not larger than 30 nm. The optical multilayer film in embodiment 2-6 is expressed as "MLHLHALHALH" or "MLH(LHA)$^2$LH".

Furthermore, an optical multilayer film in embodiment 2-7 belonging to embodiment 2 has a total of eleven layers which are a first Al layer (metal layer), a high-refractive-index layer 14, a second Al layer, a low-refractive-index layer 12, a high-refractive-index layer 14, a third Al layer, a low-refractive-index layer 12, a high-refractive-index layer 14, a fourth Al layer, a low-refractive-index layer 12, and a high-refractive-index layer 14 in order from the first layer. The physical film thickness of the first Al layer as the first layer is not smaller than 20 nm. The physical film thickness of the fourth Al layer as the ninth layer is not smaller than 5 nm and not larger than 30 nm. The optical multilayer film in embodiment 2-7 is expressed as "MHALHALHALH" or "MHA(LHA)$^2$LH".

An optical product in embodiment 3 is configured in the same manner as the optical product in embodiment 2.

An optical multilayer film in embodiment 3-1 belonging to embodiment 3 has a total of four layers and has a configuration of "MHAL".

An optical multilayer film in embodiment 3-2 belonging to embodiment 3 has a total of four layers and has a configuration of "MLAL".

An optical multilayer film in embodiment 3-3 belonging to embodiment 3 has a total of five layers and has a configuration of "MLHAH".

An optical multilayer film in embodiment 3-4 belonging to embodiment 3 has a total of eight layers and has a configuration of "MLHALHAH". The optical multilayer film in embodiment 3-4 is obtained by repeating one set of "LHA" of the optical multilayer film in embodiment 3-3 so as to have two such sets adjacent to each other, i.e., so as to be configured as "M(LHA)$^2$H".

An optical multilayer film in embodiment 3-5 belonging to embodiment 3 has a total of eleven layers and has a configuration of "MLHALHALHAH". The optical multilayer film in embodiment 3-5 is obtained by repeating one set of "LHA" of the optical multilayer film in embodiment 3-3 so as to have three such sets that are consecutive, i.e., so as to be configured as "M(LHA)$^3$H".

An optical multilayer film in embodiment 3-6 belonging to embodiment 3 has a total of fourteen layers and has a configuration of "MLHALHALHALHAH". The optical multilayer film in embodiment 3-6 is obtained by repeating one set of "LHA" of the optical multilayer film in embodiment 3-3 so as to have four such sets that are consecutive, i.e., so as to be configured as "M(LHA)$^4$H".

An optical multilayer film in embodiment 3-7 belonging to embodiment 3 has a total of seventeen layers and has a configuration of "MLHALHALHALHALHAH". The optical multilayer film in embodiment 3-7 is obtained by repeating one set of "LHA" of the optical multilayer film in embodiment 3-3 so as to have five such sets that are consecutive, i.e., so as to be configured as "M(LHA)$^5$H".

An optical multilayer film in embodiment 3-8 belonging to embodiment 3 has a total of eight layers and has a configuration of "MLHLALHL".

Embodiment 3-8 is the same as embodiment 1.

Next, preferred examples of the present invention and comparative examples that do not belong to the present invention will be described.

The present invention is not limited to the following examples. According to interpretation of the present invention, the following examples may be substantially regarded as comparative examples, or the following comparative examples may be substantially regarded as examples.

As comparative example 1, an optical multilayer film having a favorable IR/UV ratio was designed as follows.

That is, $Ta_2O_5$ was selected as a high-refractive-index material, $SiO_2$ was selected as a low-refractive-index material, and an optical multilayer film including a total of 66 layers and having a total physical film thickness of 4275.4 nm was designed. In designing, as the optical constants (refractive index and extinction coefficient) of Al, $Ta_2O_5$, and $SiO_2$, optical constants shown in FIG. 5, FIG. 6, and FIG. 7 were used in this order. The extinction coefficient of $SiO_2$ is zero over the entire wavelength range (horizontal axis) in FIG. 7.

The ordinal number (counted from the base member 2 side), the material, and the physical film thickness (nm) of each of the layers are indicated in the following Table 1.

Figure 8:
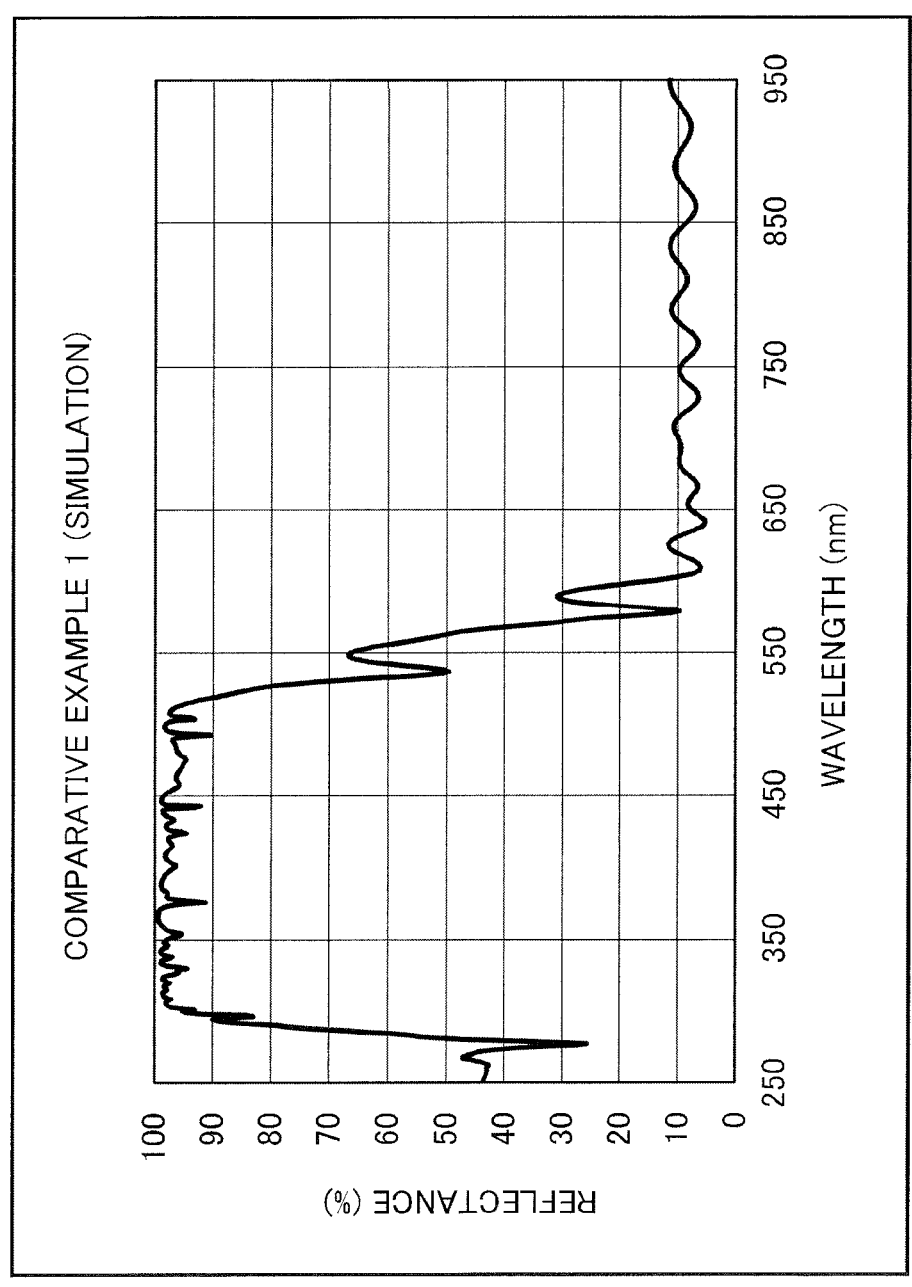
FIG. 8 is a graph of a spectral reflectance distribution, in a visible range and ranges adjacent thereto, that is related to simulative comparative example 1.

Also, a simulative spectral reflectance distribution (reflection angle $\delta=65°$) of comparative example 1 is shown in FIG. 8. An IR/UV ratio calculated on the basis of FIG. 8 was 0.089 (8.9%).

TABLE 1

| | Ordinal number of layer | | | | | | | | | |
|---|---|---|---|---|---|---|---|---|---|---|
| | 1 | 2 | 3 | 4 | 5 | 6 | 7 | 8 | 9 | 10 |
| Material | $Ta_2O_5$ | $SiO_2$ | $Ta_2O_5$ | $SiO_2$ | $Ta_2O_5$ | $SiO_2$ | $Ta_2O_5$ | $SiO_2$ | $Ta_2O_5$ | $SiO_2$ |
| Film thickness | 29.5 | 89.2 | 69.7 | 72.4 | 68.0 | 95.2 | 63.3 | 83.8 | 78.4 | 74.9 |

| | Ordinal number of layer | | | | | | | | | |
|---|---|---|---|---|---|---|---|---|---|---|
| | 11 | 12 | 13 | 14 | 15 | 16 | 17 | 18 | 19 | 20 |
| Material | $Ta_2O_5$ | $SiO_2$ | $Ta_2O_5$ | $SiO_2$ | $Ta_2O_5$ | $SiO_2$ | $Ta_2O_5$ | $SiO_2$ | $Ta_2O_5$ | $SiO_2$ |
| Film thickness | 77.2 | 81.1 | 70.6 | 94.4 | 54.7 | 113.2 | 49.5 | 106.5 | 53.5 | 92.1 |

| | Ordinal number of layer | | | | | | | | | |
|---|---|---|---|---|---|---|---|---|---|---|
| | 21 | 22 | 23 | 24 | 25 | 26 | 27 | 28 | 29 | 30 |
| Material | $Ta_2O_5$ | $SiO_2$ | $Ta_2O_5$ | $SiO_2$ | $Ta_2O_5$ | $SiO_2$ | $Ta_2O_5$ | $SiO_2$ | $Ta_2O_5$ | $SiO_2$ |
| Film thickness | 58.0 | 65.9 | 57.5 | 50.0 | 55.8 | 74.5 | 57.5 | 93.0 | 56.8 | 104.1 |

| | Ordinal number of layer | | | | | | | | | |
|---|---|---|---|---|---|---|---|---|---|---|
| | 31 | 32 | 33 | 34 | 35 | 36 | 37 | 38 | 39 | 40 |
| Material | $Ta_2O_5$ | $SiO_2$ | $Ta_2O_5$ | $SiO_2$ | $Ta_2O_5$ | $SiO_2$ | $Ta_2O_5$ | $SiO_2$ | $Ta_2O_5$ | $SiO_2$ |
| Film thickness | 43.1 | 113.6 | 34.2 | 85.6 | 41.1 | 78.2 | 48.5 | 92.5 | 37.8 | 65.0 |

| | Ordinal number of layer | | | | | | | | | |
|---|---|---|---|---|---|---|---|---|---|---|
| | 41 | 42 | 43 | 44 | 45 | 46 | 47 | 48 | 49 | 50 |
| Material | $Ta_2O_5$ | $SiO_2$ | $Ta_2O_5$ | $SiO_2$ | $Ta_2O_5$ | $SiO_2$ | $Ta_2O_5$ | $SiO_2$ | $Ta_2O_5$ | $SiO_2$ |
| Film thickness | 38.3 | 63.6 | 52.0 | 73.0 | 42.9 | 97.0 | 36.0 | 94.5 | 39.1 | 67.6 |

| | Ordinal number of layer | | | | | | | | | |
|---|---|---|---|---|---|---|---|---|---|---|
| | 51 | 52 | 53 | 54 | 55 | 56 | 57 | 58 | 59 | 60 |
| Material | $Ta_2O_5$ | $SiO_2$ | $Ta_2O_5$ | $SiO_2$ | $Ta_2O_5$ | $SiO_2$ | $Ta_2O_5$ | $SiO_2$ | $Ta_2O_5$ | $SiO_2$ |
| Film thickness | 35.3 | 56.2 | 38.3 | 54.5 | 33.8 | 55.1 | 33.2 | 68.9 | 29.9 | 77.3 |

| | Ordinal number of layer | | | | | | Total film |
|---|---|---|---|---|---|---|---|
| | 61 | 62 | 63 | 64 | 65 | 66 | thickness |
| Material | $Ta_2O_5$ | $SiO_2$ | $Ta_2O_5$ | $SiO_2$ | $Ta_2O_5$ | $SiO_2$ | — |
| Film thickness | 36.3 | 81.1 | 37.6 | 62.3 | 9.4 | 132.5 | 4275.4 |

Further, comparative example 1 was actually produced on a base member by the vapor deposition device 51 on the basis of the design of comparative example 1. Here, the base member was a substrate formed of PC and having a shape obtained by vertically dividing the light concentrator 101 into three pieces (opening pieces at 120°).

Vapor deposition conditions for comparative example 1 (PC substrate) were set as indicated in two upper rows of the following Table 2. In the case performing ion assist (in comparative example 1, in the case of performing vapor deposition of $Ta_2O_5$), conditions of ion assist were set as indicated in the corresponding rows of the following Table 3.

Also, conditions of ion cleaning were set as indicated in the uppermost row of Table 3. The time for ion cleaning was set to 60 seconds.

TABLE 2

| Material of layer | Vapor deposition material | Vapor deposition rate | Heating of vapor deposition material | | Ion assist |
|---|---|---|---|---|---|
| | | | Acceleration voltage | Current | |
| $SiO_2$ | Ring-shaped silica | 0.6 nm/sec | −6 kV | 330 mA | — |
| $Ta_2O_5$ | Granule | 0.25 nm/sec | −6 kV | 200 mA | Table 3 |
| Al | Grain | 2 nm/sec | −6 kV | 75 mA | — |
| $Al_2O_3$ | Granule | 0.5 nm/sec | −6 kV | 450 mA | Table 3 |
| $MgF_2$ | Sintered body | 0.5 nm/sec | −6 kV | 50 mA | — |
| $TiO_2$ | Granule | 0.25 nm/sec | −6 kV | 460 mA | — |
| $HfO_2$ | Sintered body | 0.5 nm/sec | −6 kV | 430 mA | — |

TABLE 3

| Material of layer, etc. | Ion assist | | | | |
|---|---|---|---|---|---|
| | $O_2$ | Ar | Acceleration voltage | Current | Neutralizer current |
| Ion cleaning | 40 sccm | 5 sccm | 750 V | 200 mA | 500 mA |
| $Ta_2O_5$ | 50 sccm | — | 500 V | 300 mA | 800 mA |
| $Al_2O_3$ | 40 sccm | 5 sccm | 500 V | 300 mA | 1300 mA |

At the time of film formation of comparative example 1 (PC substrate), the temperature of the substrate was raised to 120° C., and a thermal stress was applied to the substrate, to cause deformation. Also, the total physical film thickness of the optical multilayer film was 4275.4 nm and was comparatively large, and occurrence of a film stress led to generation of a crack in the optical multilayer film.

Figure 9:
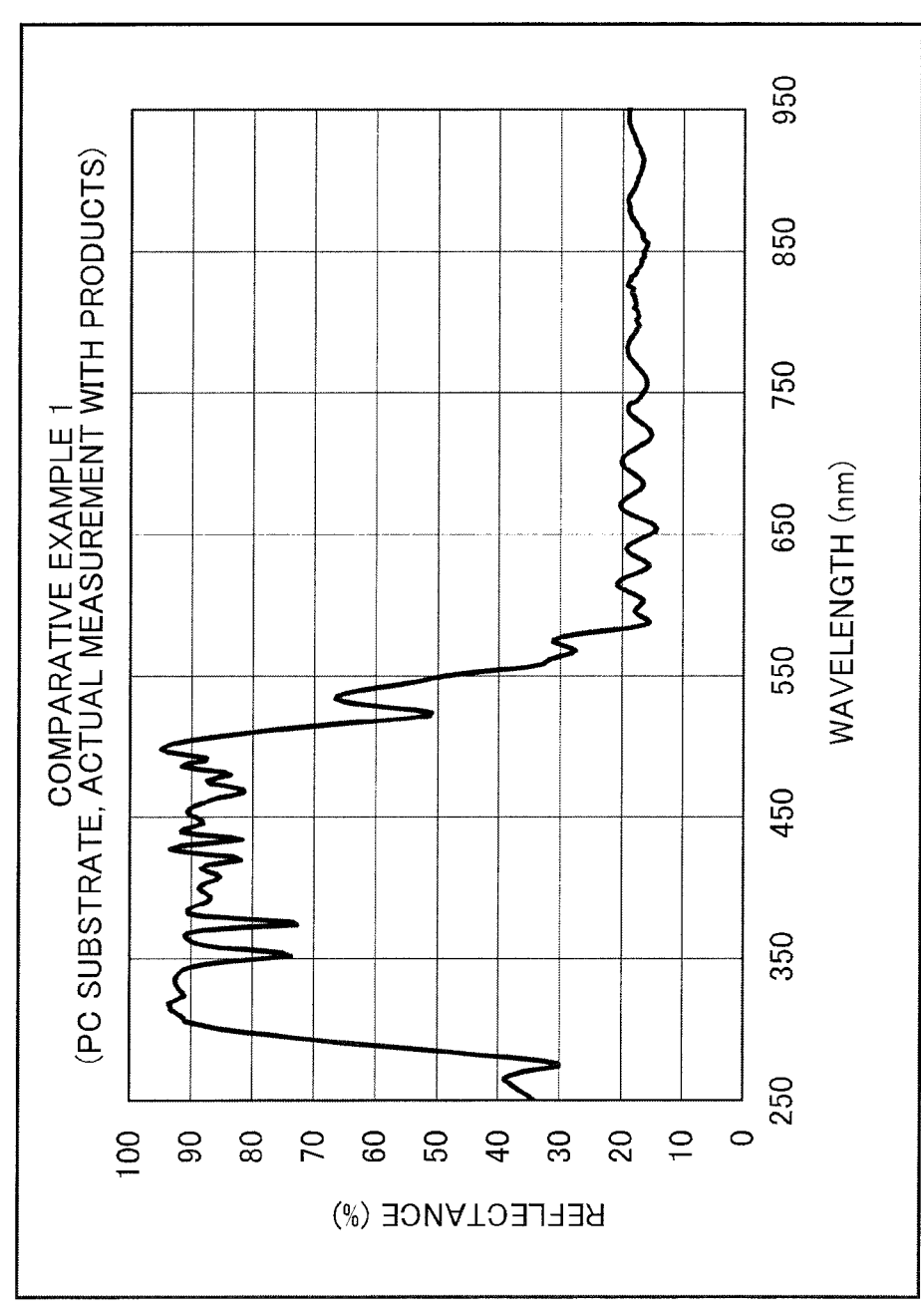
FIG. 9 is a graph of a spectral reflectance distribution, in the visible range and the ranges adjacent thereto, that is related to comparative example 1 actually produced on a PC substrate.

A spectral reflectance distribution (reflection angle δ=65°) of comparative example 1 (PC substrate) having been produced is shown in FIG. 9. An IR/UV ratio calculated on the basis of FIG. 9 was 0.202 (20.2%) which was higher than a simulative value.

Further, a substrate was formed of, instead of PC, glass (D263Teco manufactured by SCHOTT Japan Corporation) having a thickness of 0.1 mm and having a square shape with one side being 76 mm, and comparative example 1 (glass substrate) was actually produced in the same manner as that in the case of the substrate formed of PC.

Figure 10:
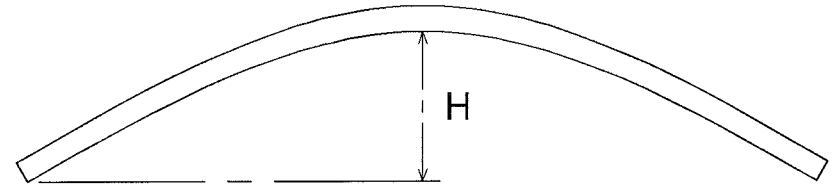
FIG. 10 is a schematic side view related to comparative example 1 actually produced on a glass substrate.

In this case, as shown in FIG. 10, comparative example 1 (glass substrate) was curved so as to protrude to the optical multilayer film side. The maximum height difference H was 2 mm.

If an optical multilayer film is formed on such a thin substrate so as to be flat, a cold mirror is easily introduced by performing cutting and pasting according to a base body or the like. However, since comparative example 1 (glass substrate) is curved, a cold mirror cannot be easily introduced.

In addition, for an article obtained by applying comparative example 1 to the inner surface of a light concentrator for the CTA, the above incident angle θ and the collection efficiency (%) for each of light having various wavelengths (one type per 100 nm from 300 to 800 nm, i.e., a total of six types) were simulated. The light concentrator is configured in the same manner as the above light concentrator 101, except for the type of the optical multilayer film on the inner surface.

Figure 11:
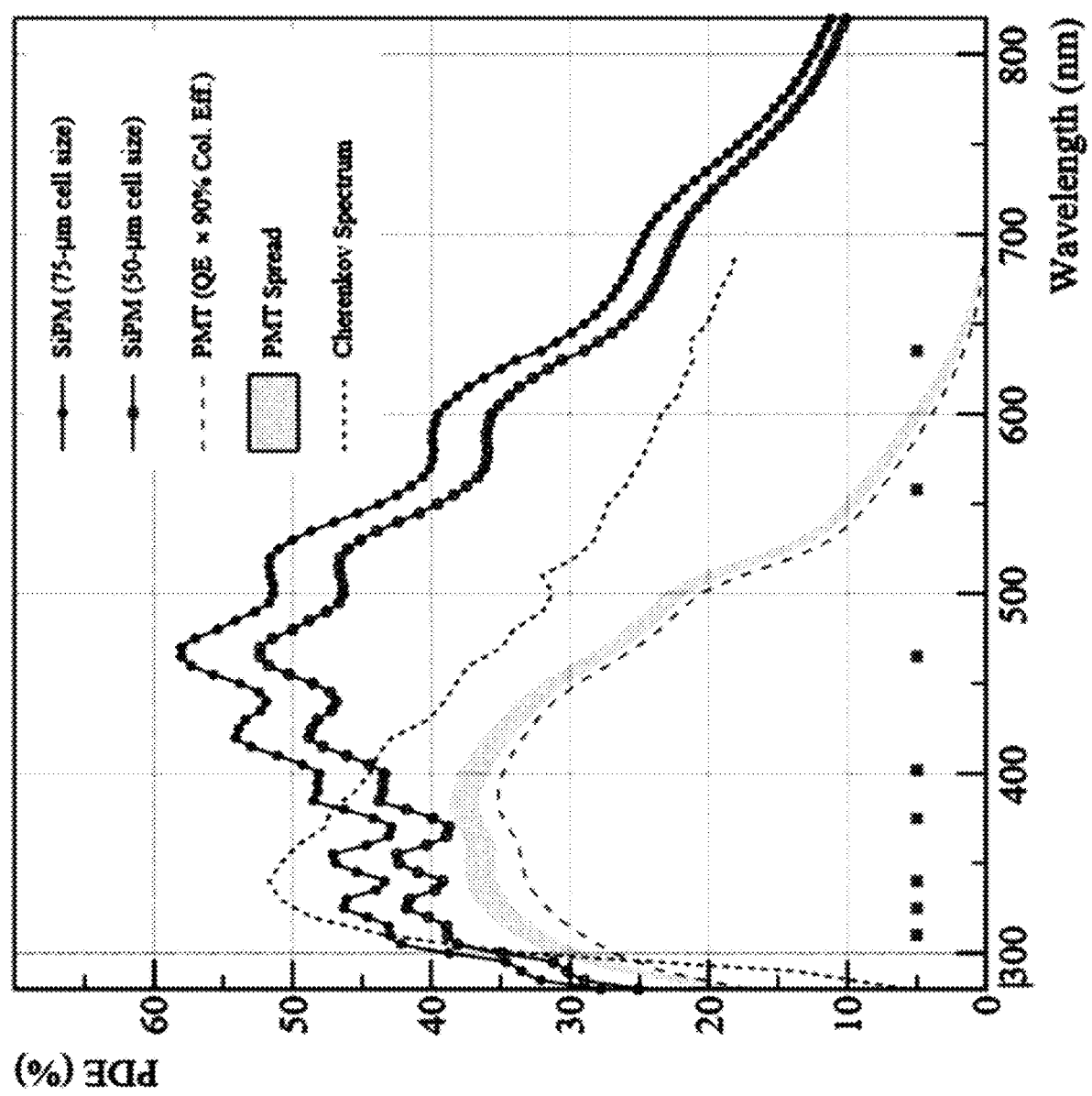
FIG. 11 is a graph indicating the relationship between wavelength and various types of photon detection efficiencies.

FIG. 11 is a graph indicating the relationship between wavelength (280 to 820 nm) and various types of photon detection efficiencies (PDE: %). In FIG. 11, "SiPM (75-μm cell size)" which is the uppermost curve at 500 nm indicates an SiPM in which the cell size of an element is 75 μm, "SiPM (50-μm cell size)" which is the second curve from the uppermost one at 500 nm indicates an SiPM in which the cell size of an element is 50 μm, "PMT (QE×90% Col. Eff.)" which is the lowermost curve (broken line) at 500 nm indicates a PMT in the case where the collection efficiency is 90%, "PMT Spread" indicates a PMT in an ordinary state in which the photon detection efficiency has a spread, and "Cherenkov Spectrum" which is the third curve (broken line) from the uppermost one at 500 nm indicates an intensity distribution of Cherenkov light. In each of the PMTs adjusted for Cherenkov light, the photon detection efficiency decreases in the wavelength range of longer than 500 nm. Meanwhile, in each of the SiPMs, a comparatively high photon detection efficiency is maintained even at 800 nm. As described above, in SiPMs, it is difficult to perform adjustment for Cherenkov light with the element themselves.

Figure 12:
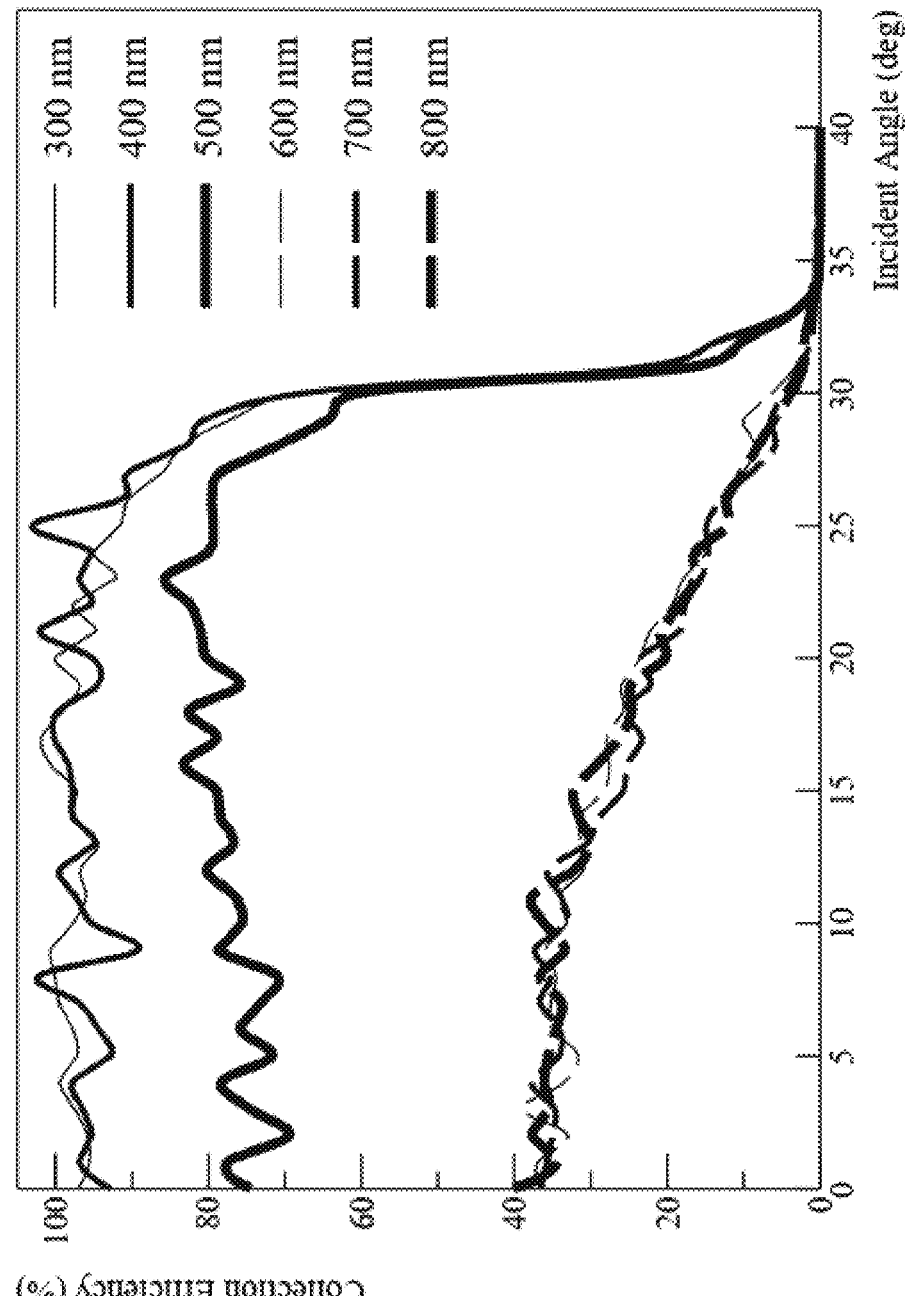
FIG. 12 is a graph related to the relationship between the incident angle θ of, and the collection efficiency for, each of light that had various wavelengths and that were incident on a light concentrator in simulative comparative example 1.

FIG. 12 is a graph related to the relationship between the incident angle θ (horizontal axis) of, and the collection efficiency (vertical axis) for, each of light that had the various wavelengths and that were incident on the light concentrator in comparative example 1. According to FIG. 12, in this light concentrator, the collection efficiency at 300 to 500 nm is higher than 70%, whereas the collection efficiency is decreased to be not higher than 40% at not shorter than 600 nm. In this respect, this light concentrator is suitable for SiPMs.

However, in comparative example 1 actually produced on the PC substrate, occurrence of a thermal stress, deformation of the substrate, a film stress, and a crack was observed as described above. Thus, the light concentrator in comparative example 1 might be comparatively inferior in durability and accuracy.

As comparative example 2, the following optical multilayer film was designed on the basis of an optical multilayer film (high-reflection mirror) applied on the inner surface of a conventional light concentrator for the CTA, for which PMTs were used.

That is, comparative example 2 in which an Al layer as a first layer, an SiO$_2$ layer formed of SiO$_2$ as a second layer, and a Ta$_2$O$_5$ layer formed of Ta$_2$O$_5$ as a third layer were stacked on an adhesion layer formed of Al$_2$O$_3$ was designed as in the following Table 4.

TABLE 4

| Ordinal number of layer, etc. | Material of film | Film thickness (nm) |
|---|---|---|
| Adhesion layer | Al$_2$O$_3$ | 10.0 |
| First layer | Al | 120.0 |
| Second layer | SiO$_2$ | 72.6 |
| Third layer | Ta$_2$O$_5$ | 20.1 |
| Total film thickness | | 222.7 |

Figure 13:
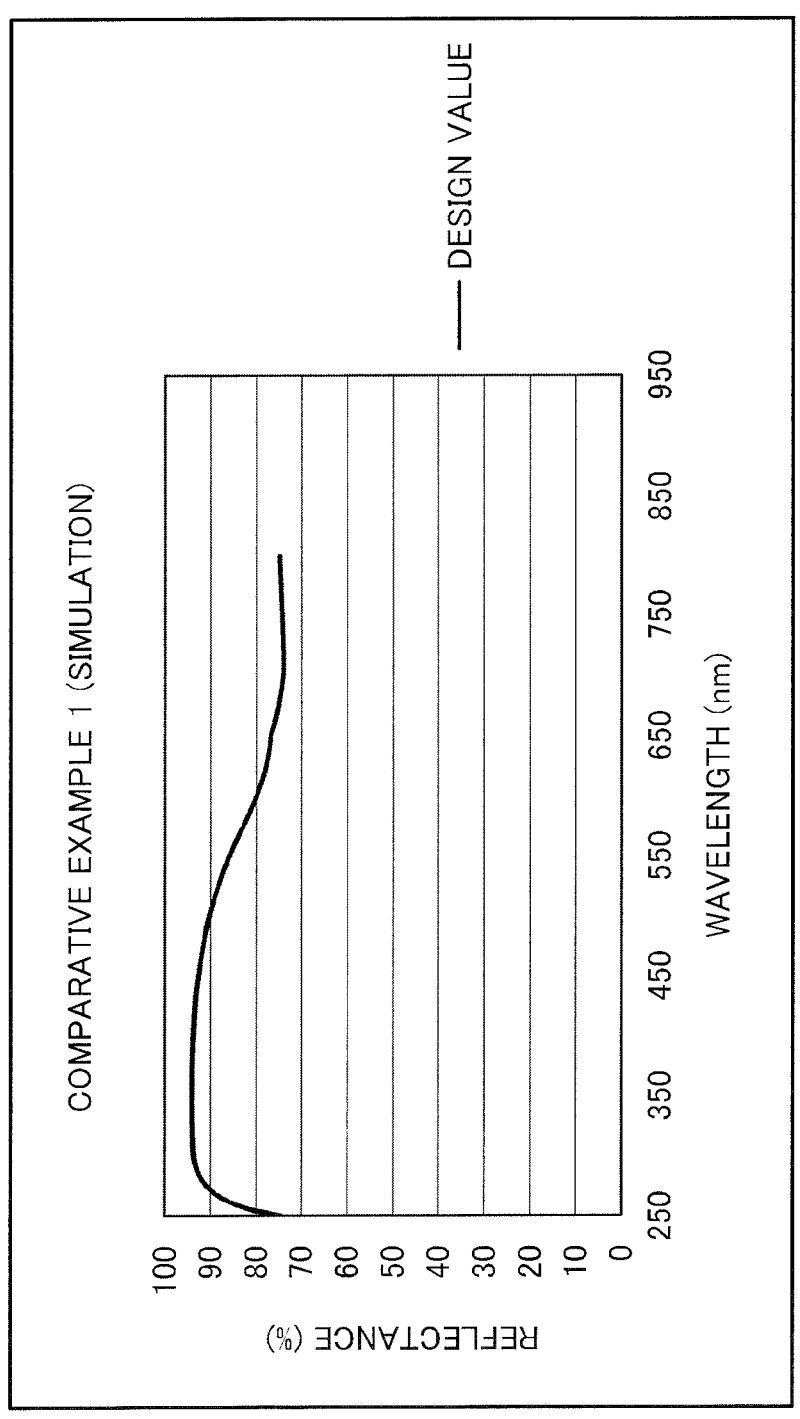
FIG. 13 is a graph of a spectral reflectance distribution, in the visible range and the ranges adjacent thereto, that is related to simulative comparative example 2.

A simulative spectral reflectance distribution (reflection angle δ=65°) of comparative example 2 is shown in FIG. 13. The reflectance in comparative example 2 is high at both 300 to 500 nm and 600 to 800 nm to similar extents, and the IR/UV ratio in comparative example 2 is 0.81 (81%) and is comparatively high. Thus, comparative example 2 can hardly be said to be a cold mirror and is difficult to use for SiPMs.

Further, comparative example 2 was actually produced on a base member by the vapor deposition device 51 on the basis of the design of comparative example 2. Here, as the base member, the same substrate as that for comparative example 1 (PC substrate) was used.

Vapor deposition conditions and conditions of ion cleaning (60 seconds) for comparative example 2 (PC substrate) were set as indicated in the above Table 2 and Table 3.

concentrator in comparative example 2. According to FIG. 15, in this light concentrator, the collection efficiency is higher than about 70% not only at 300 to 500 nm but also at not shorter than 600 nm. In this respect, this light concentrator is not suitable for SiPMs.

As examples 1 to 9, optical products 1 based on the above embodiment (embodiment 1) were designed and subjected to simulation.

Physical film thicknesses other than the physical film thickness of the Al layer 10 as the fifth layer in the optical multilayer film 4 are equal among examples 1 to 9. Also, the physical film thickness of the underlayer 3 is equal thereamong.

Further, comparative example 3 in which the physical film thickness of the Al layer 10 as the fifth layer in the optical multilayer film 4 was set to zero (i.e., the Al layer 10 was not provided) and the physical film thicknesses of the other layers were the same as those in examples 1 to 9, was also designed and subjected to simulation.

Figure 5:
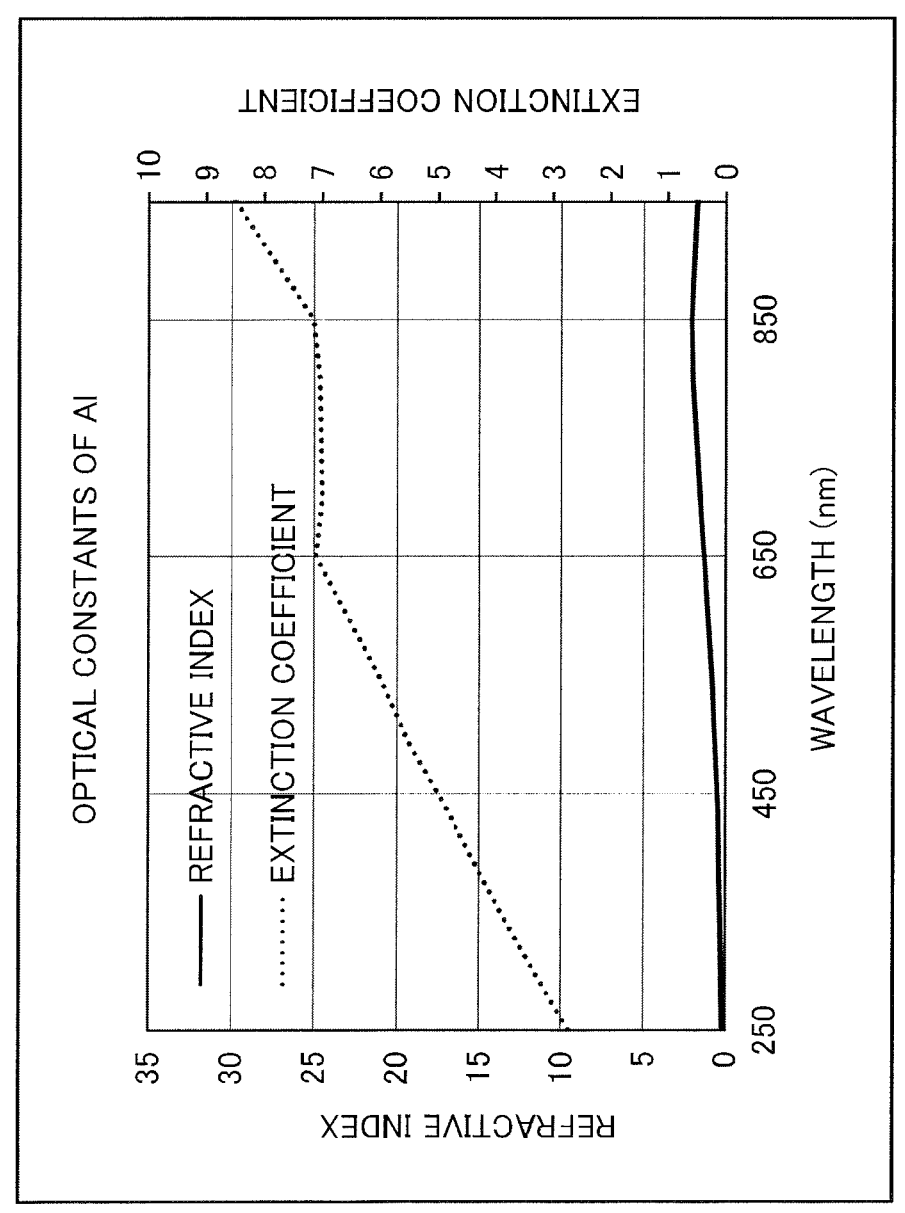
FIG. 5 is a graph related to optical constants of Al.
Figure 6:
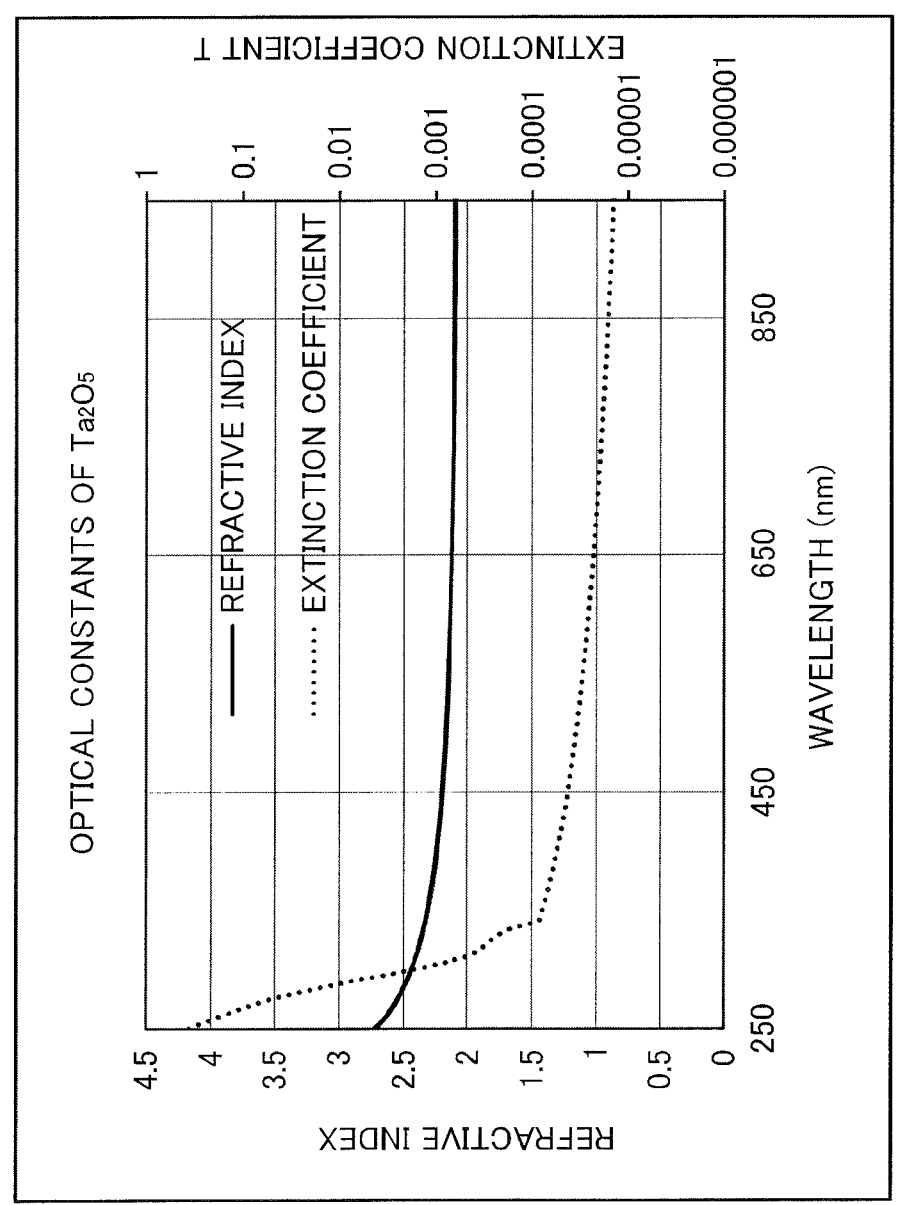
FIG. 6 is a graph related to optical constants of $Ta_2O_5$.
Figure 7:
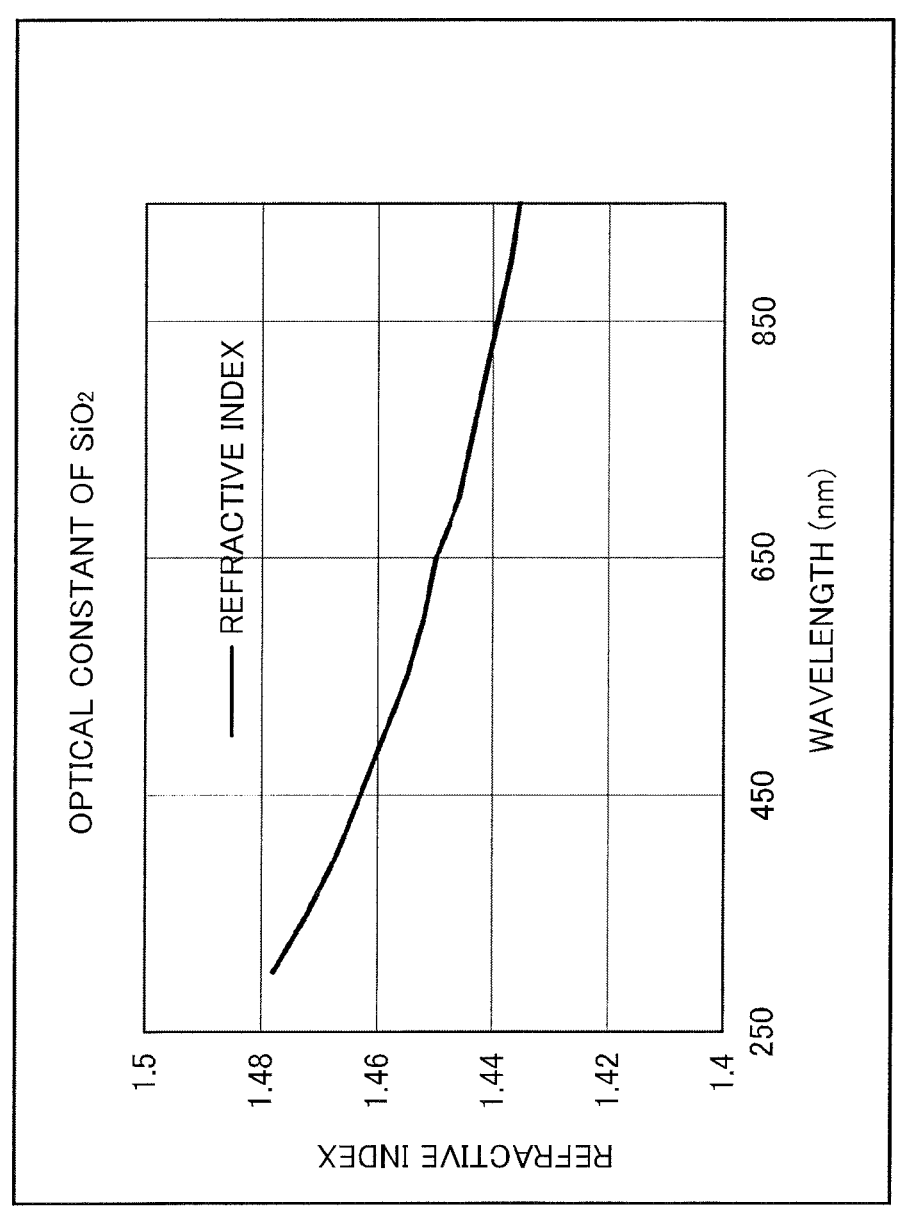
FIG. 7 is a graph related to an optical constant of $SiO_2$.

The ordinal numbers, the materials, and the physical film thicknesses (nm) of the respective layers, the total physical film thicknesses, and the IR/UV ratios in examples 1 to 9 and comparative example 3 are indicated in the following Table 5. Various optical constants used in in designing of examples 1 to 9 and comparative example 3 are as shown in FIG. 5 to FIG. 7.

Figure 16:
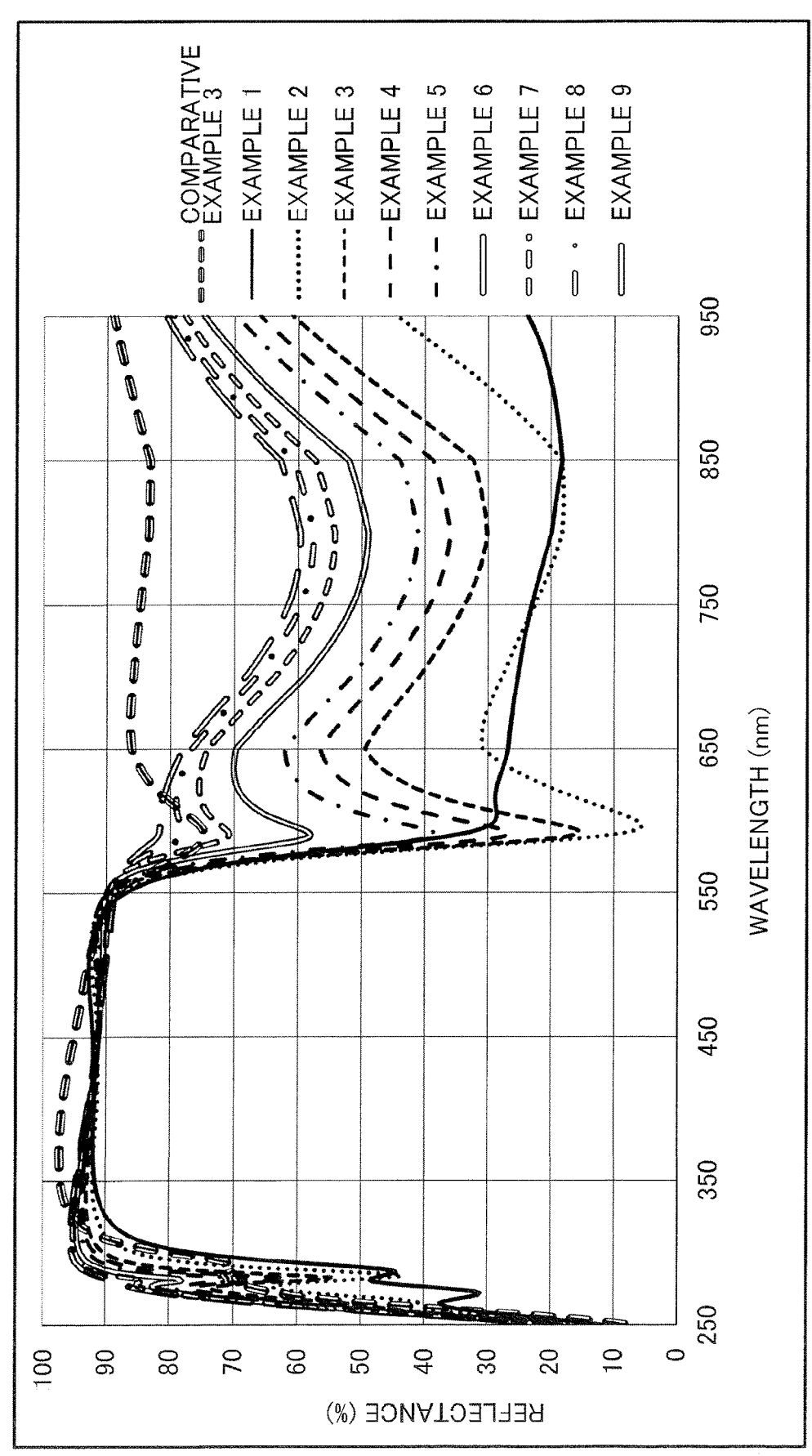
FIG. 16 is a graph of spectral reflectance distributions, in the visible range and the ranges adjacent thereto, that are related to simulative examples 1 to 9 and comparative example 3.

Also, simulative spectral reflectance distributions (reflection angle δ=65°) of examples 1 to 9 and comparative example 3 are shown in FIG. 16.

Figure 17:
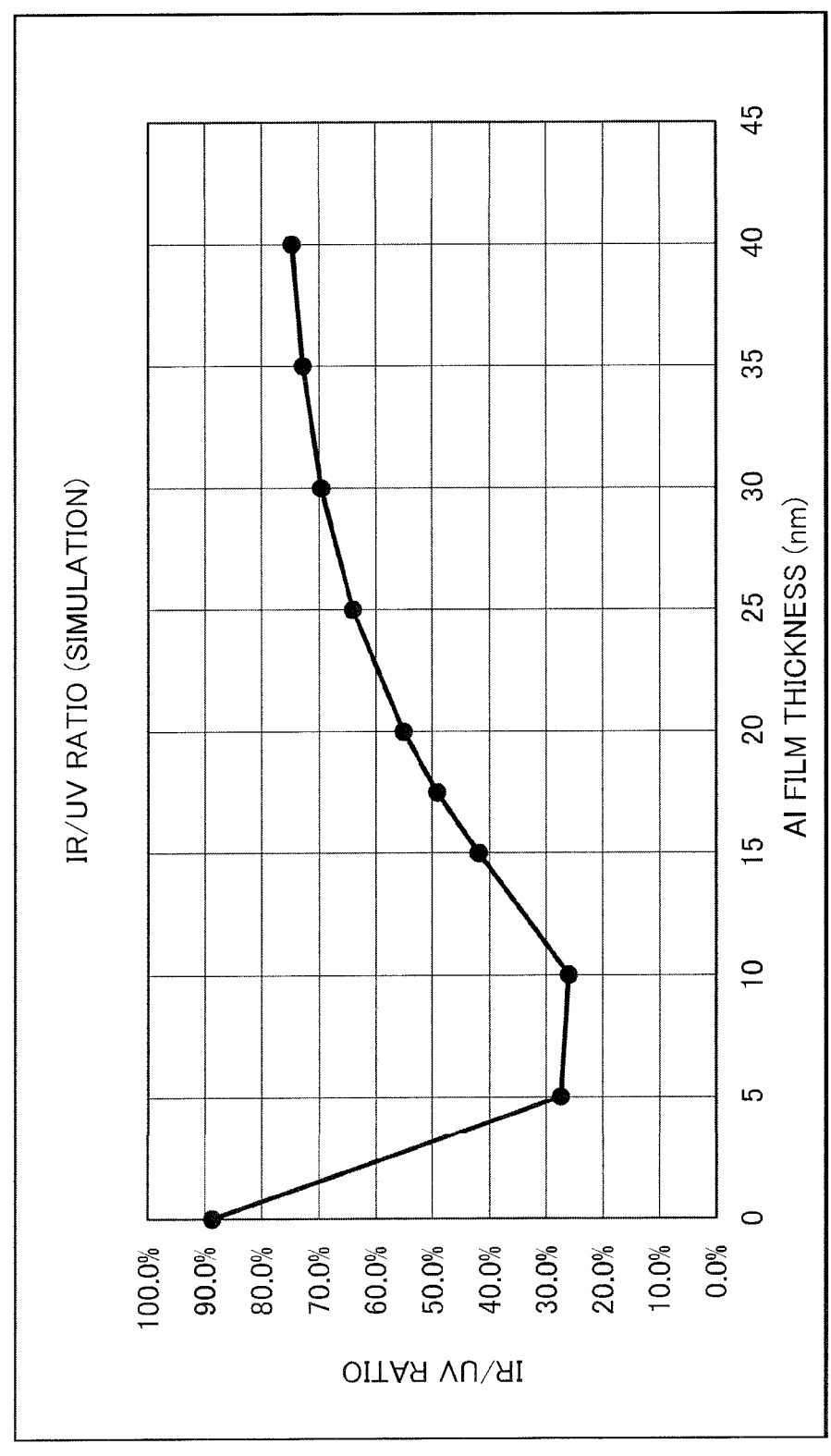
FIG. 17 is a graph related to the relationship between an IR/UV ratio (%) and the physical film thickness (nm) of an Al layer as a fifth layer in a simulation in each of examples 1 to 9 and comparative example 3.

Further, the relationship between the IR/UV ratio (%) and the physical film thickness of the Al layer 10 as the fifth layer (Al film thickness: nm) in a simulation in each of examples 1 to 9 and comparative example 3, is shown in FIG. 17.

TABLE 5

| | Adhesion layer Al$_2$O$_3$ | First layer Al | Second layer SiO$_2$ | Third layer Ta$_2$O$_5$ | Fourth layer SiO$_2$ | Fifth layer Al | Sixth layer SiO$_2$ | Seventh layer Ta$_2$O$_5$ | Eighth layer SiO$_2$ | Total film thickness | IR/UV ratio |
|---|---|---|---|---|---|---|---|---|---|---|---|
| Comparative example 3 | 10.0 | 123.0 | 72.4 | 44.6 | 44.0 | 0.0 | 41.1 | 37.5 | 37.7 | 410.3 | 88.7% |
| Example 1 | 10.0 | 123.0 | 72.4 | 44.6 | 44.0 | 5.0 | 41.1 | 37.5 | 37.7 | 415.3 | 27.4% |
| Example 2 | 10.0 | 123.0 | 72.4 | 44.6 | 44.0 | 10.0 | 41.1 | 37.5 | 37.7 | 420.3 | 26.0% |
| Example 3 | 10.0 | 123.0 | 72.4 | 44.6 | 44.0 | 15.0 | 41.1 | 37.5 | 37.7 | 425.3 | 41.9% |
| Example 4 | 10.0 | 123.0 | 72.4 | 44.6 | 44.0 | 17.5 | 41.1 | 37.5 | 37.7 | 427.8 | 49.1% |
| Example 5 | 10.0 | 123.0 | 72.4 | 44.6 | 44.0 | 20.0 | 41.1 | 37.5 | 37.7 | 430.3 | 55.2% |
| Example 6 | 10.0 | 123.0 | 72.4 | 44.6 | 44.0 | 25.0 | 41.1 | 37.5 | 37.7 | 435.3 | 64.1% |
| Example 7 | 10.0 | 123.0 | 72.4 | 44.6 | 44.0 | 30.0 | 41.1 | 37.5 | 37.7 | 440.3 | 69.6% |
| Example 8 | 10.0 | 123.0 | 72.4 | 44.6 | 44.0 | 35.0 | 41.1 | 37.5 | 37.7 | 445.3 | 72.9% |
| Example 9 | 10.0 | 123.0 | 72.4 | 44.6 | 44.0 | 40.0 | 41.1 | 37.5 | 37.7 | 450.3 | 74.8% |

Figure 14:
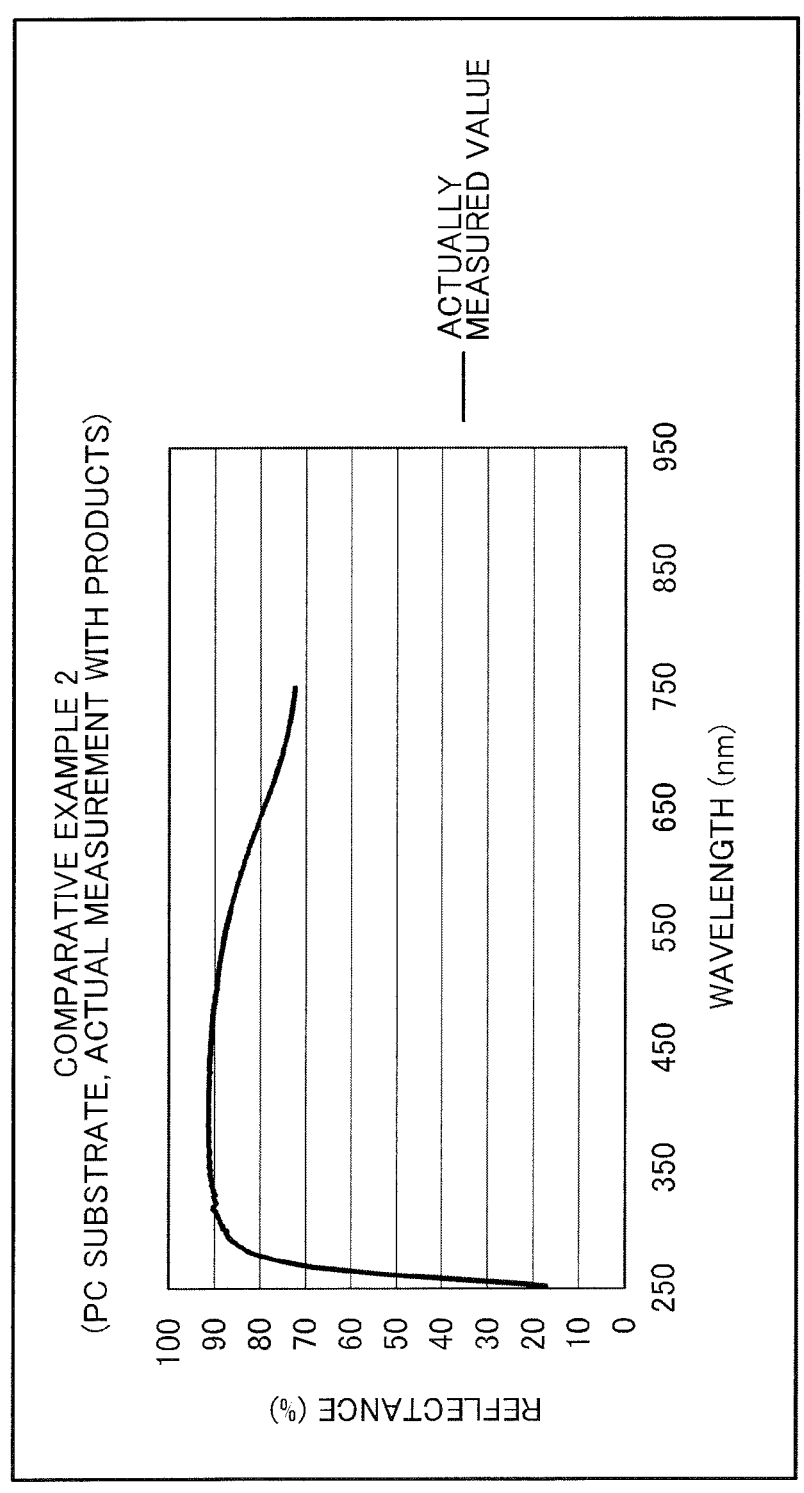
FIG. 14 is a graph of a spectral reflectance distribution, in the visible range and the ranges adjacent thereto, that is related to comparative example 2 actually produced on a PC substrate.

A spectral reflectance distribution (reflection angle δ=65°) of comparative example 2 (PC substrate) having been produced is shown in FIG. 14. This spectral reflectance distribution does not significantly differ from the simulative spectral reflectance distribution of comparative example 2.

In addition, for an article obtained by applying comparative example 2 to the inner surface of a light concentrator, the above incident angle θ and the collection efficiency for each of light having the various wavelengths were simulated in the same manner as that in the case of comparative example 1.

Figure 15:
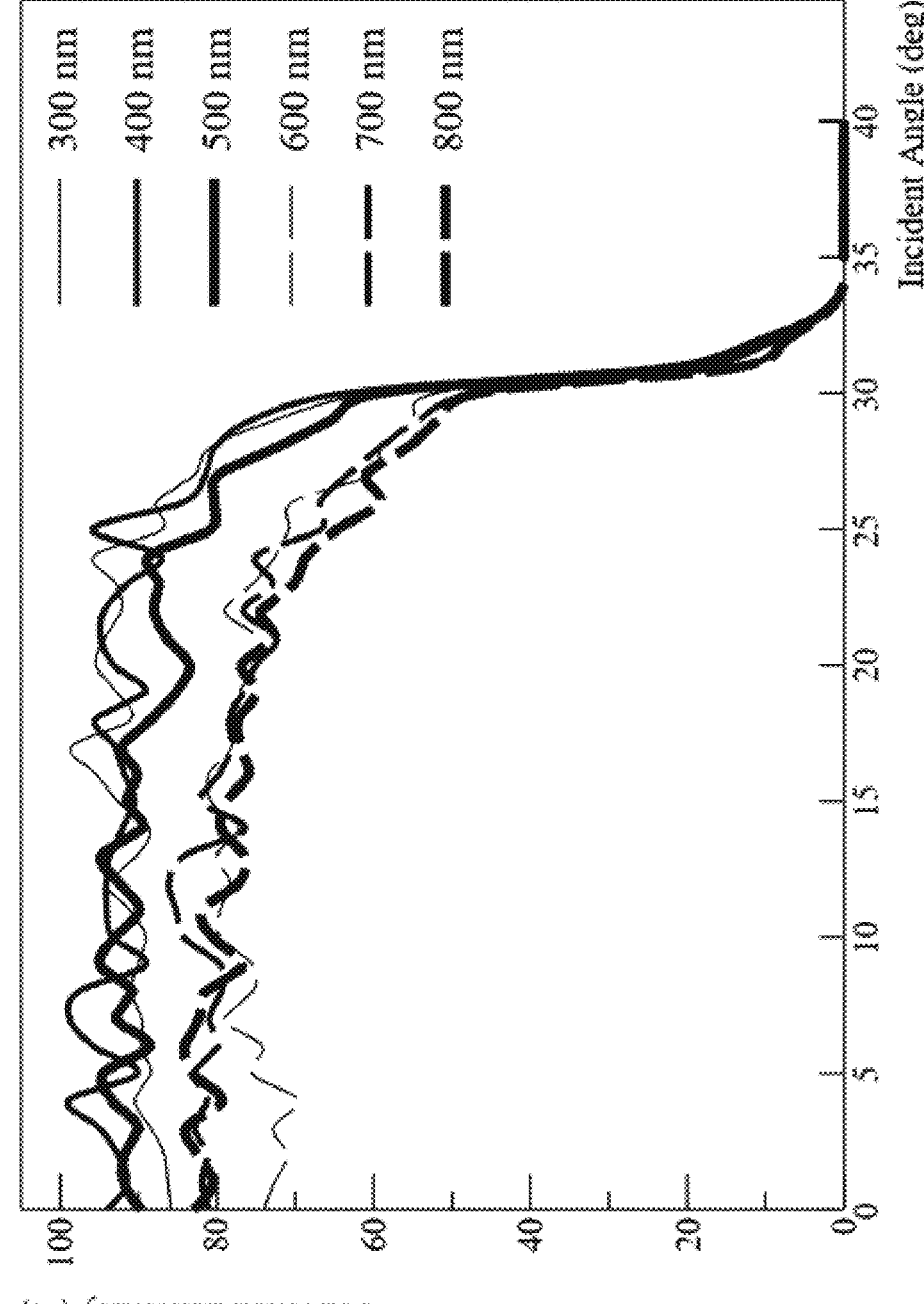
FIG. 15 is a graph related to the relationship between the incident angle θ of, and the collection efficiency for, each of light that had the various wavelengths and that were incident on a light concentrator in simulative comparative example 2.

FIG. 15 is a graph related to the relationship between the incident angle θ (horizontal axis) of, and the collection efficiency (vertical axis) for, each of light that had the various wavelengths and that were incident on the light In comparative example 3 in which the Al layer 10 as the fifth layer is absent, the IR/UV ratio is almost 90%. Meanwhile, in each of examples 1 to 9 in which the Al layer 10 as the fifth layer is present, the IR/UV ratio is not higher than 75%.

In particular, in each of examples 1 to 7 in which the physical film thickness of the Al layer 10 as the fifth layer is not smaller than 5 nm and not larger than 30 nm, the IR/UV ratio is not higher than 70%.

Further, as example 3-1, an article in which the physical film thicknesses of all the low-refractive-index layers 12 formed of SiO$_2$ were set to be 0.95 times those in example 3 and the physical film thicknesses of all the high-refractive-index layers 14 formed of Ta$_2$O$_5$ were set to be 0.95 times those in example 3, was designed and subjected to simulation. Also, as example 3-2, an article in which the physical film thicknesses of all the low-refractive-index layers 12 formed of $SiO_2$ were set to be 1.05 times those in example 3 and the physical film thicknesses of all the high-refractive-index layers 14 formed of $Ta_2O_5$ were set to be 1.05 times those in example 3, was designed and subjected to simulation.

Figure 18:
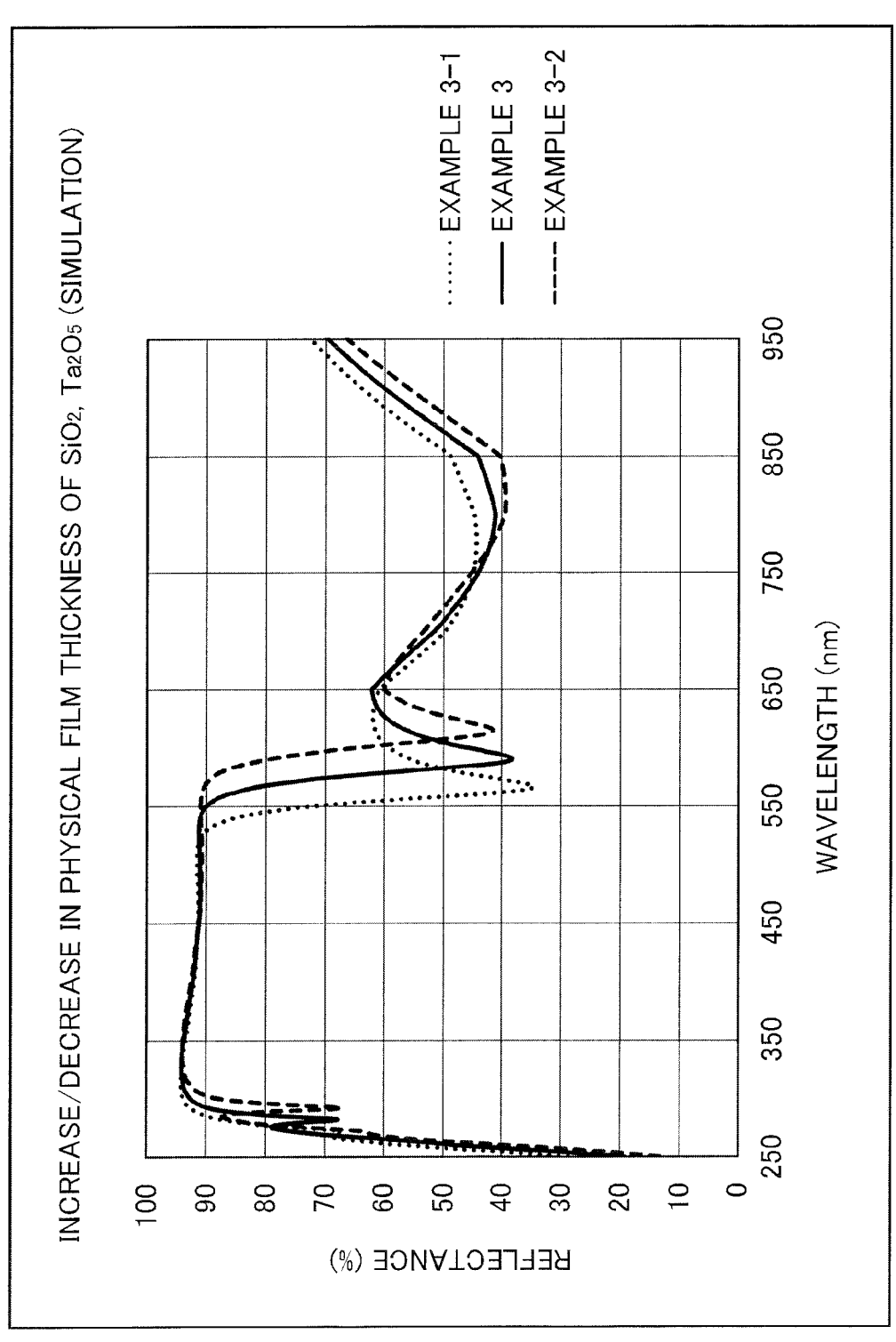
FIG. 18 is a graph of spectral reflectance distributions, in the visible range and the ranges adjacent thereto, that are related to simulative examples 3, 3-1, and 3-2.

FIG. 18 is a graph of spectral reflectance distributions (reflection angle δ=65°), in a visible range and ranges adjacent thereto, that are related to examples 3, 3-1, and 3-2. From the shifts between examples 3-1, 3, and 3-2, it is found that setting of both the low-refractive-index layers 12 and the high-refractive-index layers 14 to have larger physical film thicknesses causes the reflection band to be further shifted to the long wavelength side.

Furthermore, optical multilayer films 4 in examples 2 to 5 were actually produced on base members by the vapor deposition device 51 on the basis of designs of examples 2 to 5. Here, as each of the base members, the same substrate as that for comparative example 1 (PC substrate) was used. Also, test pieces in which the optical multilayer films 4 in examples 2 to 5 were vapor-deposited on respective substrates formed of white glass sheets were produced for spectroscopic measurement.

Vapor deposition conditions and conditions of ion cleaning (60 seconds) for examples 2 to 5 (PC substrates) were set as indicated in the above Table 2 and Table 3.

During formation of each of the optical multilayer films 4 in examples 2 to 5 (PC substrates), rise in the temperature of the corresponding substrate was suppressed such that the temperature was not higher than 80° C., whereby the substrate was not deformed. In addition, since the total physical film thickness was small, stress was suppressed, whereby no crack was generated in the optical multilayer film 4.

Various conditions for examples 2 to 5 (white glass sheet substrates) were set to the same conditions as those for examples 2 to 5 (PC substrates). Also, the states of the optical multilayer films 4 in examples 2 to 5 (white glass sheet substrates) during and after film formation were the same as those in examples 2 to 5 (PC substrates).

Figure 19:
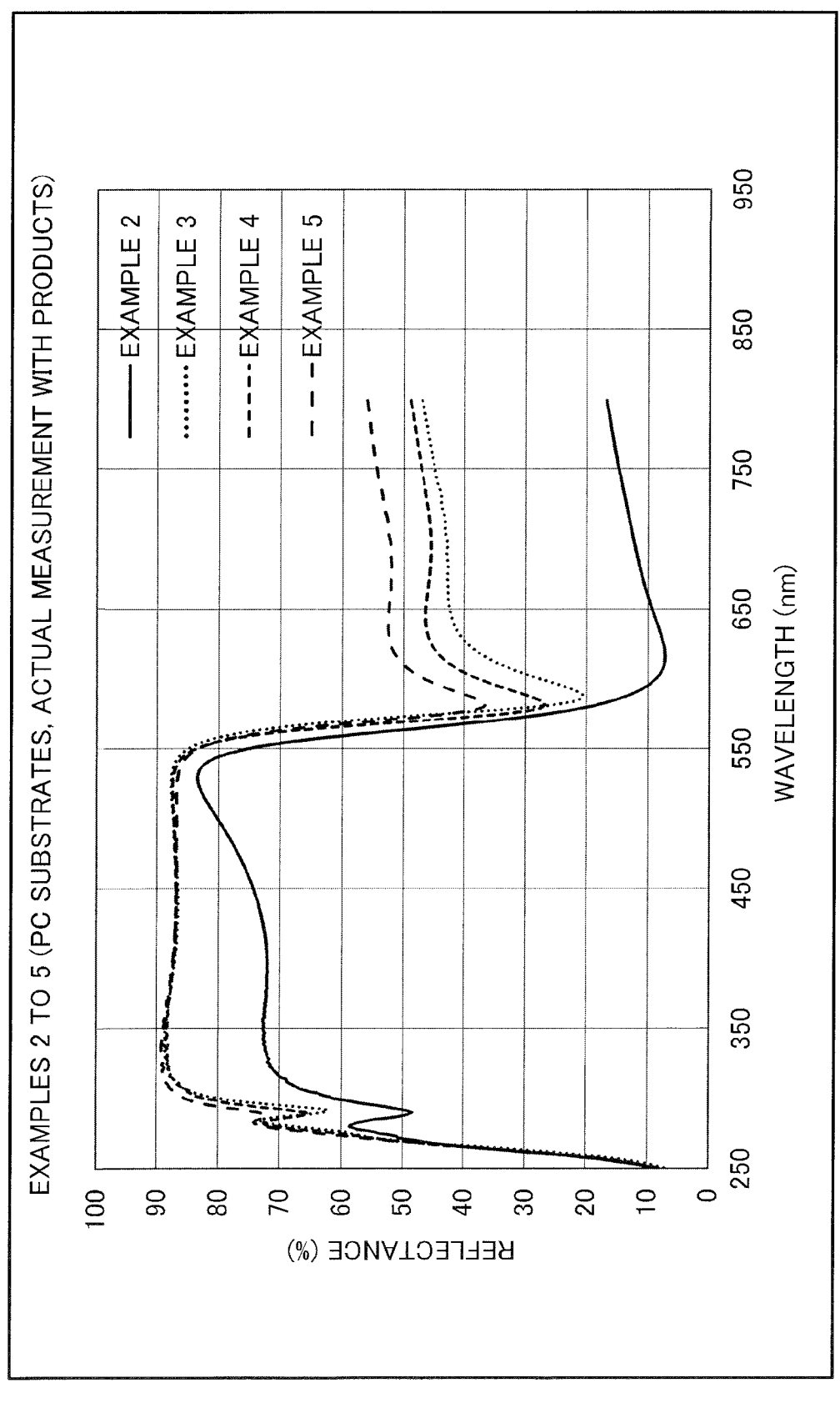
FIG. 19 is a graph of spectral reflectance distributions, in the visible range and the ranges adjacent thereto, that are related to examples 2 to 5 actually produced on PC substrates.

Spectral reflectance distributions (reflection angle δ=65°) of examples 2 to 5 (white glass sheet substrates) having been produced are shown in FIG. 19.

Basically, these spectral reflectance distributions do not significantly differ from simulative spectral reflectance distributions of examples 2 to 5. Examples 2 to 5 (white glass sheet substrates) have comparatively low IR/UV ratios and have higher performances. Also, in examples 2 to 5 (white glass sheet substrates), thermal stresses, deformation of the substrates, film stresses, and cracks are inhibited from occurring unlike in comparative example 1 (PC substrate). Thus, examples 2 to 5 (white glass sheet substrates) have more excellent durabilities and accuracies.

However, in example 2 (white glass sheet substrate) in which the physical film thickness of the Al layer 10 as the fifth layer is 10 nm, the reflectance at 300 to 500 nm is lower than a simulative reflectance.

This is considered to be because the Al layer 10 as the fifth layer had a small physical film thickness and in actuality, was a discontinuous film or a non-uniform film.

If a vapor deposition device 51 having a further improved performance or the like is used or the design of the optical multilayer film 4 is adjusted, the Al layer 10 as the fifth layer having a small physical film thickness as in each of examples 1 and 2 (white glass sheet substrates) and examples 1 and 2 (PC substrates) can be made as a continuous film or uniform film.

Also, the Al layer 10 as the fifth layer is sandwiched between the low-refractive-index layers 12 formed of $SiO_2$ and might become a discontinuous film or a non-uniform film depending on the state of the interfaces between the Al layer 10 and the low-refractive-index layers 12.

Figure 20:
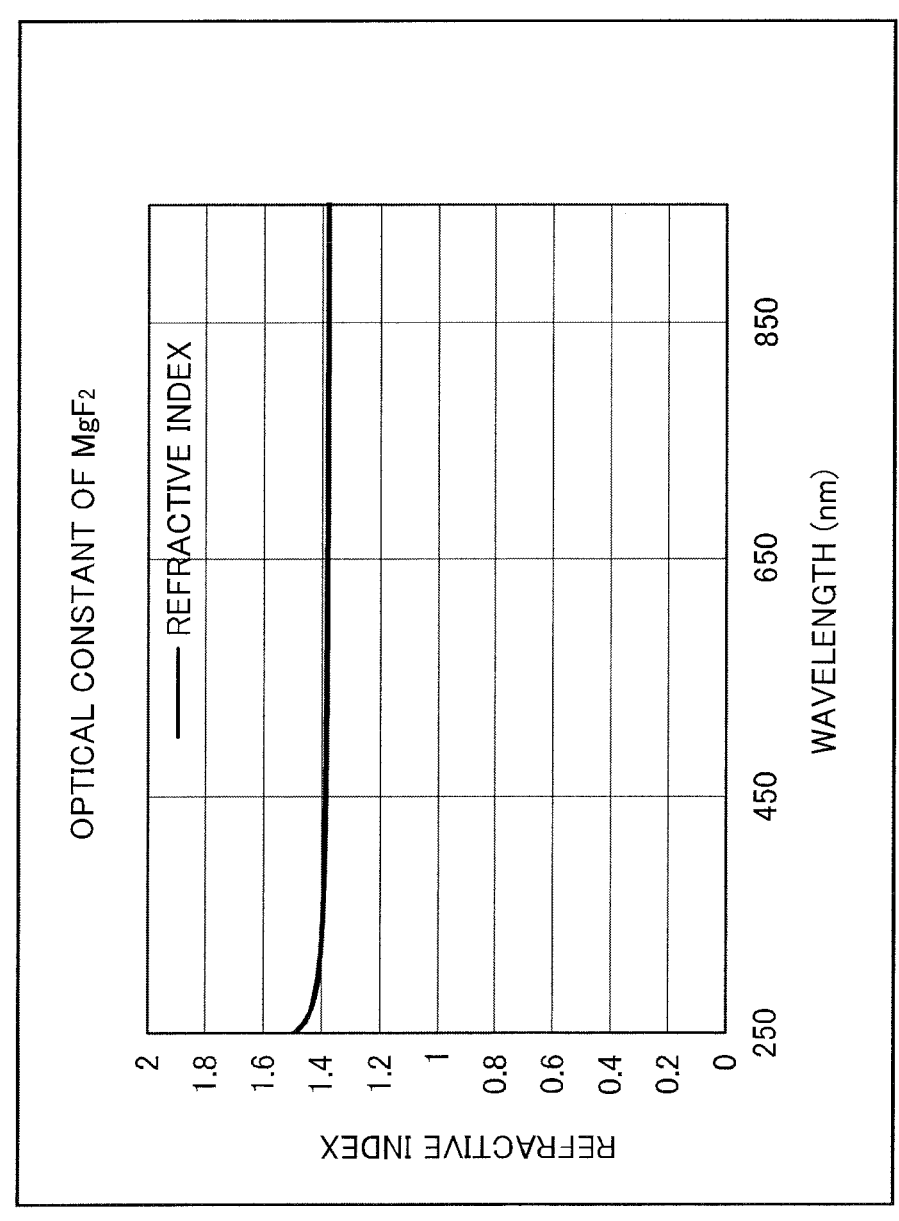
FIG. 20 is a graph related to an optical constant of $MgF_2$.

Considering this, an article in which the low-refractive-index layers 12 of the optical multilayer film 4 in example 2 excluding the eighth layer was replaced with low-refractive-index layers that had unchanged physical film thicknesses and that were formed of $MgF_2$, was further produced as example 2-1 (white glass sheet substrate). An optical constant of $MgF_2$ is shown in FIG. 20. The extinction coefficient of $MgF_2$ is zero over the entire wavelength range (horizontal axis) in FIG. 20.

Figure 21:
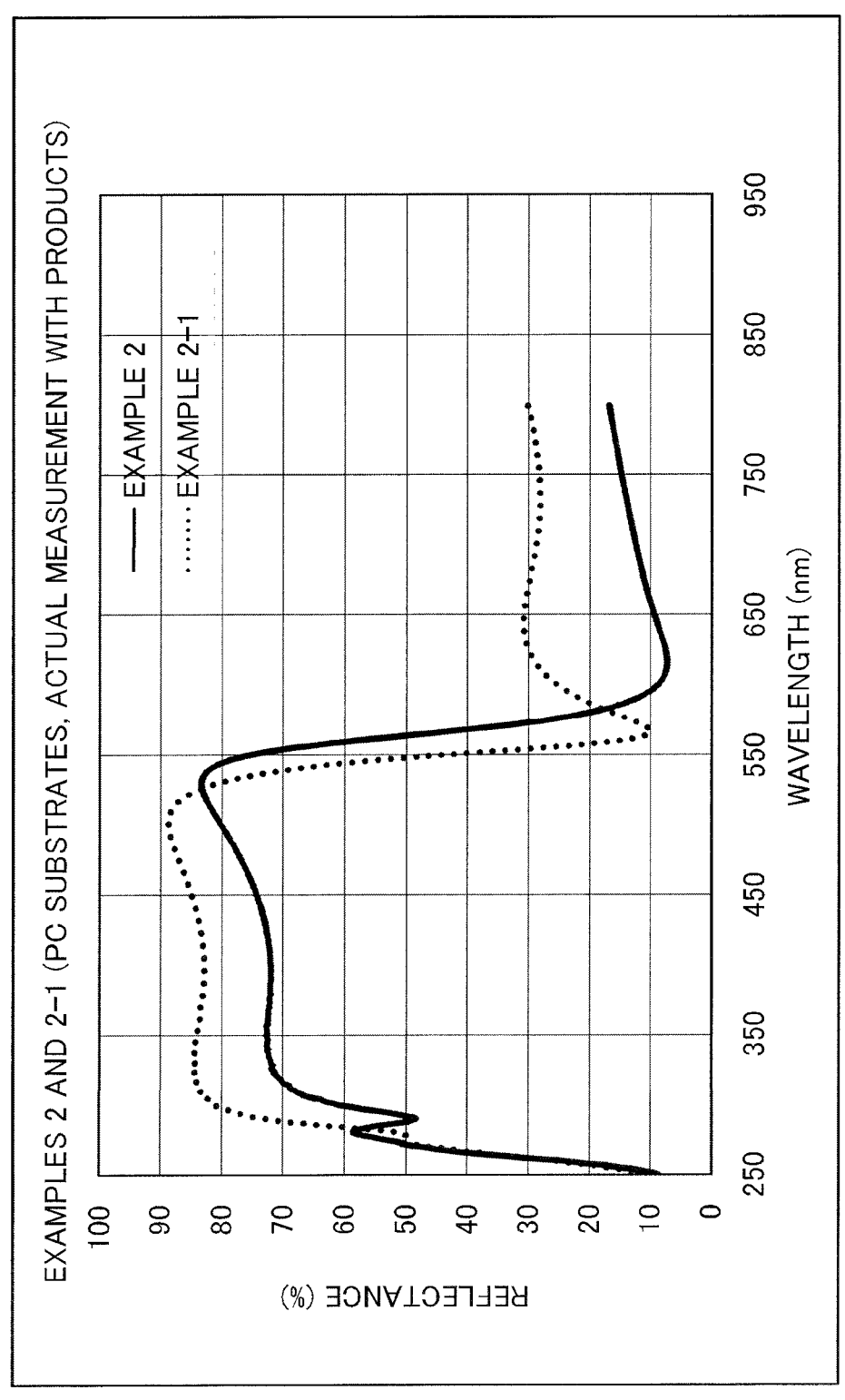
FIG. 21 is a graph of spectral reflectance distributions, in the visible range and the ranges adjacent thereto, that are related to examples 2 and 2-1 actually produced on PC substrates.

Spectral reflectance distributions (reflection angle δ=65°) of examples 2 and 2-1 (white glass sheet substrates) having been produced are shown in FIG. 21.

At 300 to 500 nm, the reflectance in example 2-1 (white glass sheet substrate) is higher than the reflectance in example 2 (white glass sheet substrate) and is approximately equal to the reflectances in examples 3 to 5. Meanwhile, at 600 to 800 nm, the reflectance in example 2-1 (white glass sheet substrate) is slightly higher than the reflectance in example 2 (white glass sheet substrate) but is lower than the reflectances in examples 3 to 5. Therefore, example 2-1 (white glass sheet substrate) has an excellent IR/UV ratio and is a cold mirror having a higher performance.

Further, example 3 (glass substrate) was produced in the same manner as that in comparative example 1 (glass substrate).

Example 3 (glass substrate) did not experience any warp and was flat (maximum height difference H=0).

Therefore, example 3 (glass substrate) can easily be introduced onto a base body by being fixed to the base body, without any significant change in the shape (thickness) of the base body.

In each of examples 1 to 9 (excluding example 3) as well, stress is comparatively low owing to the small total physical film thickness. Thus, it is considered that no warp occurs in the case of a thin glass substrate.

In addition, for an article obtained by applying each of examples 1 to 3 to the inner surface of the light concentrator 101, the above incident angle θ and the collection efficiency for each of light having the various wavelengths were simulated in the same manner as that in the case of comparative example 1.

Figure 22:
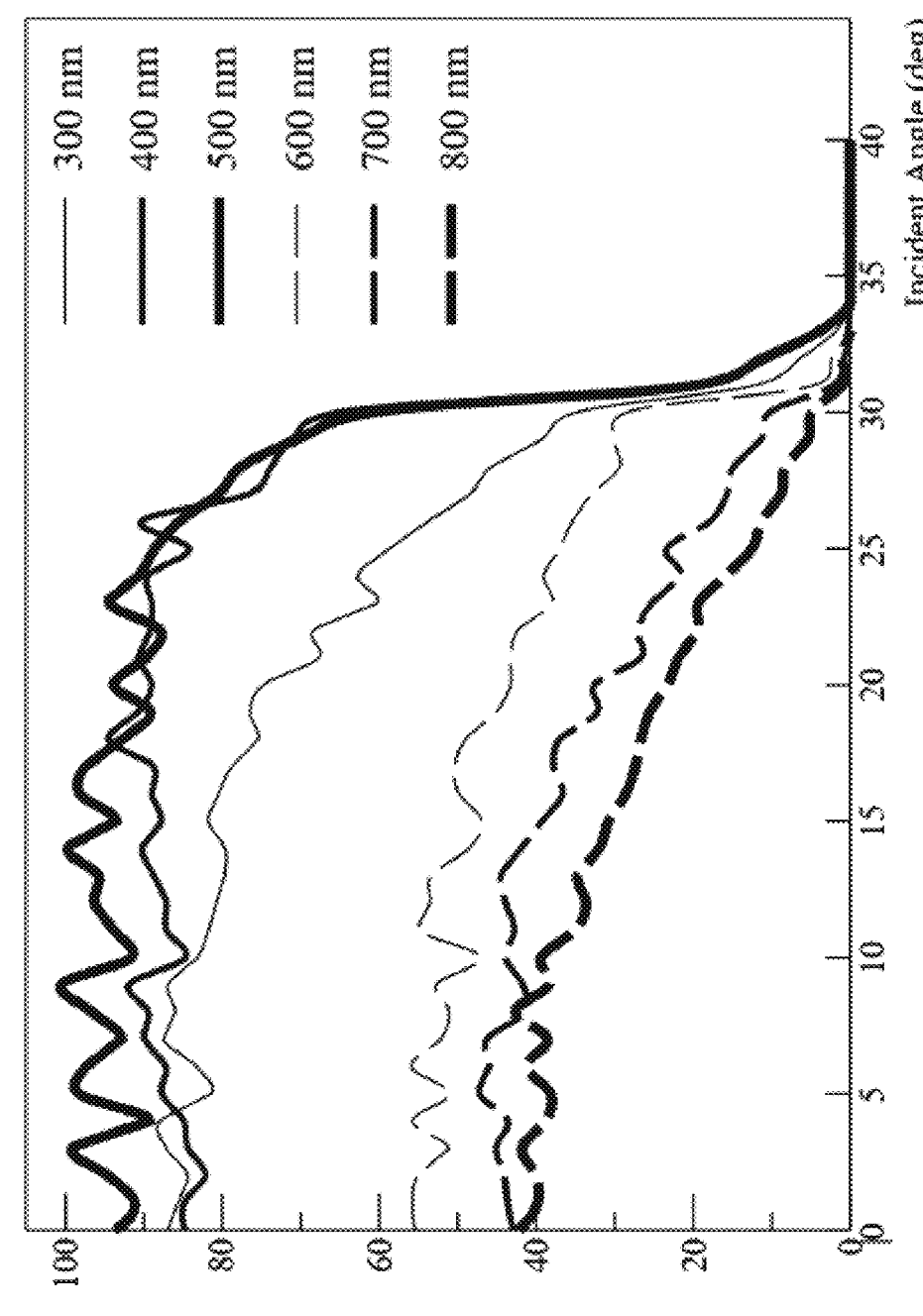
FIG. 22 is a graph related to the relationship between the incident angle θ of, and the collection efficiency for, each of light that had the various wavelengths and that were incident on a light concentrator in simulative example 1.
Figure 23:
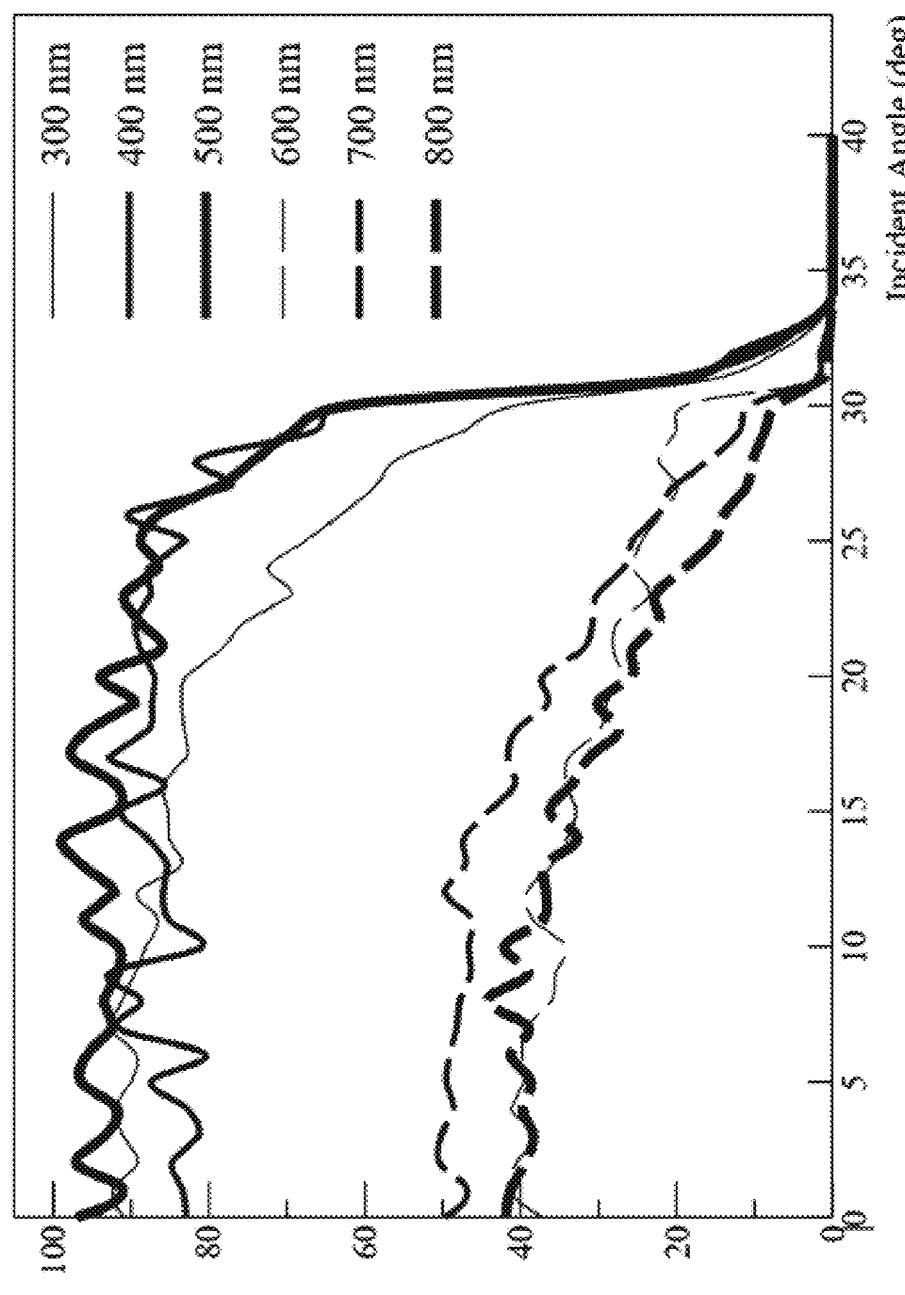
FIG. 23 is a graph related to the relationship between the incident angle θ of, and the collection efficiency for, each of light that had the various wavelengths and that were incident on a light concentrator in simulative example 2.
Figure 24:
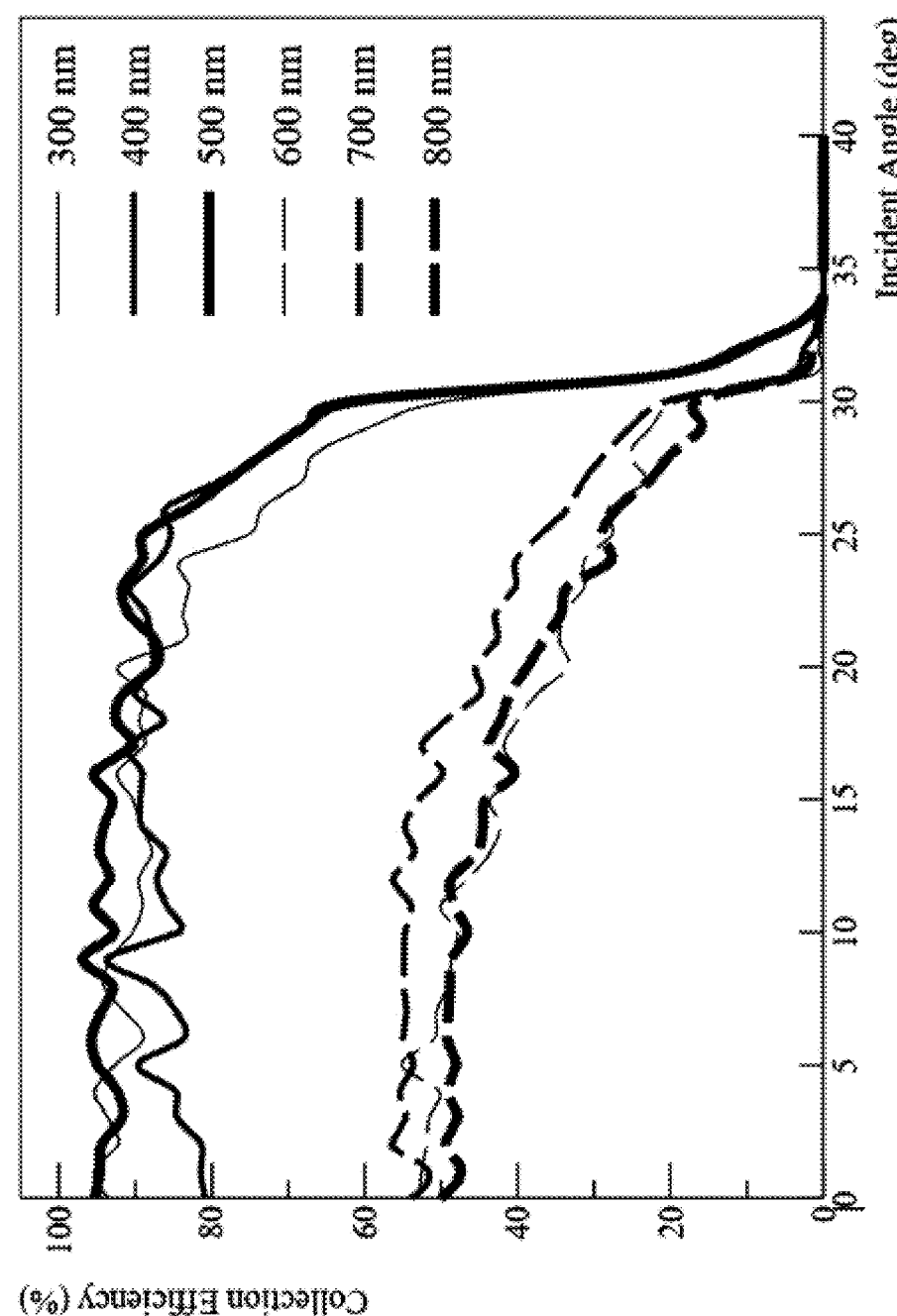
FIG. 24 is a graph related to the relationship between the incident angle θ of, and the collection efficiency for, each of light that had the various wavelengths and that were incident on a light concentrator in simulative example 3.

FIG. 22 to FIG. 24 are graphs related to the relationships between the incident angles θ (horizontal axis) of, and the collection efficiencies (vertical axis) for, each of light that had the various wavelengths and that were incident on the light concentrators 101 in examples 1 to 3, respectively.

According to FIG. 22 to FIG. 24, in each of the light concentrators 101 in examples 1 to 3, unlike in the light concentrator in comparative example 2, the collection efficiency at 300 to 500 nm is increased to about 60% to 80%, whereas the collection efficiency at not shorter than 600 nm is decreased to about 10% to 40%. In this respect, these light concentrators 101 are suitable for SiPMs. That is, with each of the light concentrators 101 in examples 1 to 3, a signal-to-noise ratio of atmospheric Cerenkov light to night-sky-light is improved. This improvement leads to achievement of highly-efficient observation of gamma rays, improvement of the accuracy of determining gamma ray energy, improvement of the accuracy of determining a direction of arrival of gamma rays, and the like. Regarding each of light concentrators 101 in examples 4 to 9 as well, in view of simulation results thereof and the like, improvement of performances as in the light concentrators 101 in examples 1 to 3 can be achieved.

Also, each of the light concentrators 101 in examples 1 to 9 can be said to be as follows. That is, in view of production results and the like of examples 2 to 5 (PC substrates) and examples 2 to 5 (white glass sheet substrates), unlike in the light concentrator in comparative example 1, no crack or the like occurs, the lifespan is elongated, and a comparatively high performance can be maintained for a long period.

Here, various values and the like regarding examples 1 to 9 and comparative examples 1 to 3 are indicated together in the following Table 6.

The optical constants of Al and MgF$_2$ are those shown in FIG. 5 and FIG. 20, respectively.

Figure 26:
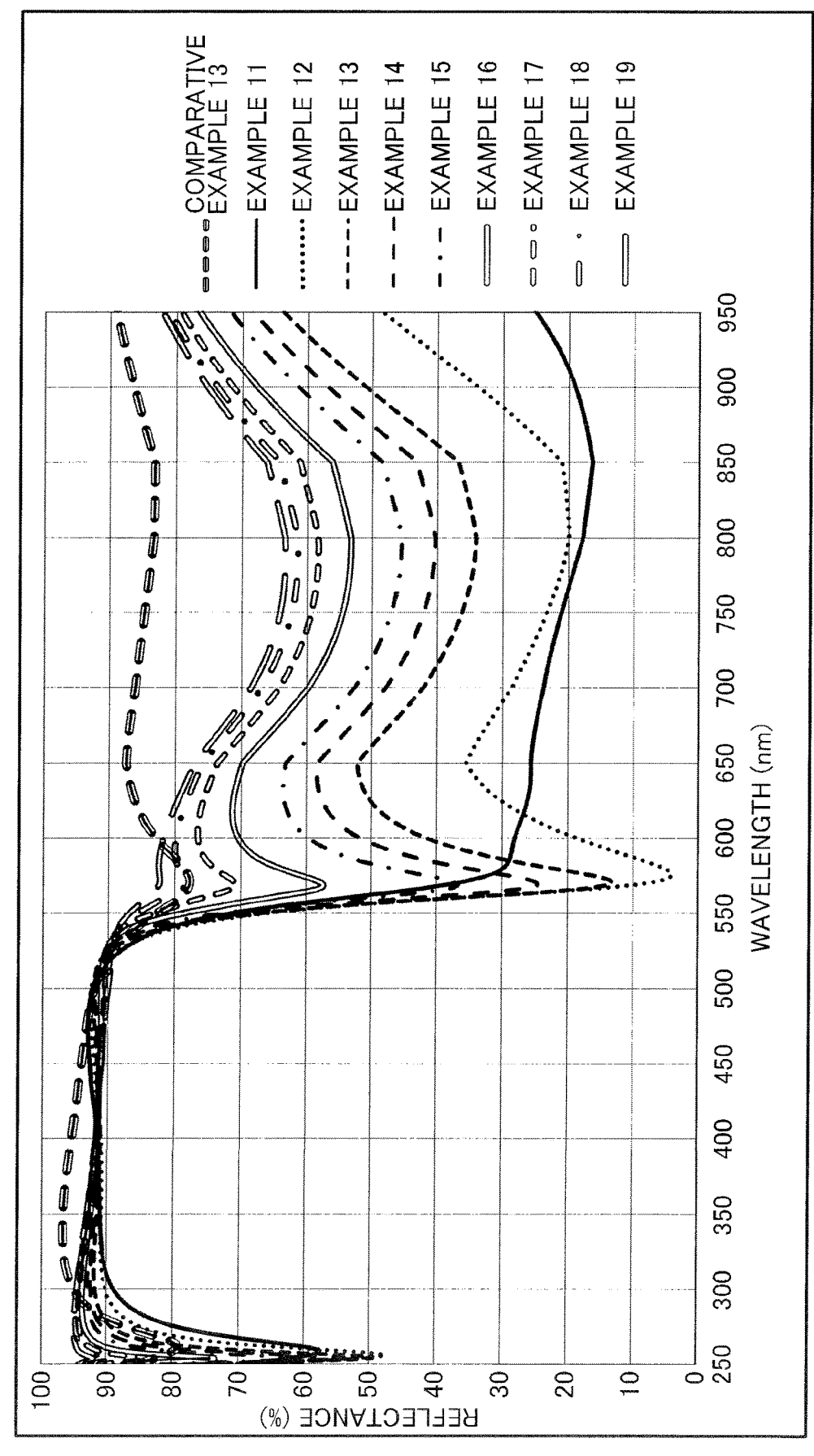
FIG. 26 is a graph of spectral reflectance distributions (reflection angle δ=65°), in the visible range and the ranges adjacent thereto, that are related to simulative examples 11 to 19 and comparative example 13.

Also, simulative spectral reflectance distributions (reflection angle $\delta=65°$) of examples 11 to 19 and comparative example 13 are shown in FIG. 26.

TABLE 6

| | Physical film thickness of Al layer as fifth layer (nm) | Designed reflectance (average value in 300-500 nm) | Actually measured reflectance (average value in 300-500 nm) | Designed reflectance (average value in 600-800 nm) | Actually measured reflectance (average value in 600-800 nm) | (Designed) IR/UV ratio | (Actually measured) IR/UV ratio | Thermal deformation | Crack in film |
|---|---|---|---|---|---|---|---|---|---|
| Comparative example 1 | — | 97.3 | 87.9 | 8.7 | 17.7 | 8.90% | 20.20% | Present | Present |
| Comparative example 2 | — | 93.2 | 90.6 | 75.5 | — | 81.00% | — | Absent | Absent |
| Comparative example 3 | 0 | 95.1 | — | 84.4 | — | 88.70% | — | Absent | Absent |
| Example 1 | 5 | 91.1 | — | 25 | — | 27.40% | — | Absent | Absent |
| Example 2 | 10 | 91.4 | 73 | 23.8 | 12.1 | 26.00% | 16.60% | Absent | Absent |
| Example 2-1 | 10 | — | 84.3 | — | 29.1 | — | 39.50% | Absent | Absent |
| Example 3 | 15 | 92 | 87.1 | 38.5 | 42.6 | 41.90% | 48.80% | Absent | Absent |
| Example 4 | 17.5 | 92.2 | 87.2 | 45.3 | 46.1 | 49.10% | 52.80% | Absent | Absent |
| Example 5 | 20 | 92.4 | 87.6 | 51 | 53 | 55.20% | 60.50% | Absent | Absent |
| Example 6 | 25 | 92. | — | 59.4 | — | 64.10% | — | Absent | Absent |
| Example 7 | 30 | 92.9 | — | 64.6 | — | 69.60% | — | Absent | Absent |
| Example 8 | 35 | 93 | — | 67.8 | — | 72.90% | — | Absent | Absent |
| Example 9 | 40 | 93 | — | 69.6 | — | 74.80% | — | Absent | Absent |

Figure 27:
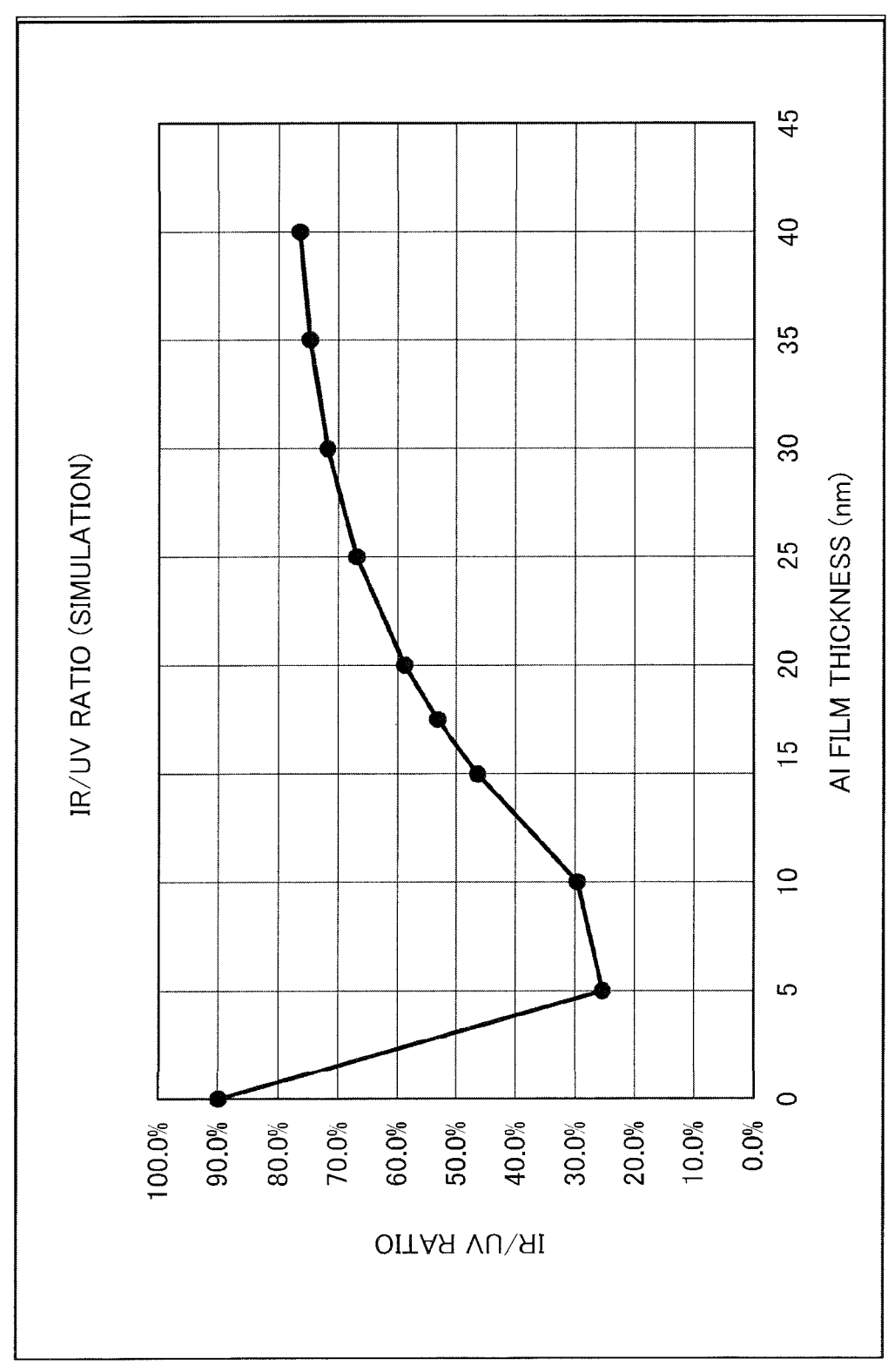
FIG. 27 is a graph related to the relationship between the IR/UV ratio (%) and the physical film thickness (nm) of an Al layer as a fifth layer in a simulation in each of examples 11 to 19 and comparative example 13.

As examples 11 to 19 and comparative example 13, articles obtained by changing some of the materials and the physical film thicknesses in the optical multilayer films 4 in examples 1 to 9 and comparative example 3 were designed Further, the relationship between the IR/UV ratio (%) and the physical film thickness of the Al layer 10 as the fifth layer (Al film thickness: nm) in a simulation in each of examples 11 to 19 and comparative example 13, is shown in FIG. 27.

TABLE 7

| | Adhesion layer Al$_2$O$_3$ | First layer Al | Second layer MgF$_2$ | Third layer HfO$_2$ | Fourth layer MgF$_2$ | Fifth layer Al | Sixth layer MgF$_2$ | Seventh layer HfO$_2$ | Eighth layer MgF$_2$ | Total film thickness | IR/UV ratio |
|---|---|---|---|---|---|---|---|---|---|---|---|
| Comparative example 13 | 10.0 | 123.0 | 78.6 | 42.5 | 47.7 | 0.0 | 44.6 | 35.7 | 41.0 | 423.2 | 89.8% |
| Example 11 | 10.0 | 123.0 | 78.6 | 42.5 | 47.7 | 5.0 | 44.6 | 35.7 | 41.0 | 428.2 | 25.4% |
| Example 12 | 10.0 | 123.0 | 78.6 | 42.5 | 47.7 | 10.0 | 44.6 | 35.7 | 41.0 | 433.2 | 29.7% |
| Example 13 | 10.0 | 123.0 | 78.6 | 42.5 | 47.7 | 15.0 | 44.6 | 35.7 | 41.0 | 438.2 | 46.4% |
| Example 14 | 10.0 | 123.0 | 78.6 | 42.5 | 47.7 | 17.5 | 44.6 | 35.7 | 41.0 | 440.7 | 53.2% |
| Example 15 | 10.0 | 123.0 | 78.6 | 42.5 | 47.7 | 20.0 | 44.6 | 35.7 | 41.0 | 443.2 | 58.8% |
| Example 16 | 10.0 | 123.0 | 78.6 | 42.5 | 47.7 | 25.0 | 44.6 | 35.7 | 41.0 | 448.2 | 66.9% |
| Example 17 | 10.0 | 123.0 | 78.6 | 42.5 | 47.7 | 30.0 | 44.6 | 35.7 | 41.0 | 453.2 | 71.8% |
| Example 18 | 10.0 | 123.0 | 78.6 | 42.5 | 47.7 | 35.0 | 44.6 | 35.7 | 41.0 | 458.2 | 74.7% |
| Example 19 | 10.0 | 123.0 | 78.6 | 42.5 | 47.7 | 40.0 | 44.6 | 35.7 | 41.0 | 463.2 | 76.5% | and subjected to simulation. Numbers for example 10 and comparative examples 4 to 12 have been skipped.

In examples 11 to 19 and comparative example 13, the materials of all the low-refractive-index layers 12 were MgF$_2$, and the materials of all the high-refractive-index layers 14 were HfO$_2$. The physical film thicknesses of the substrates, the underlayers 3, and the Al layers 10 as the fifth layers, and the like, in examples 11 to 19 and comparative example 13 are equal to those in examples 1 to 9 and comparative example 3, respectively.

Figure 25:
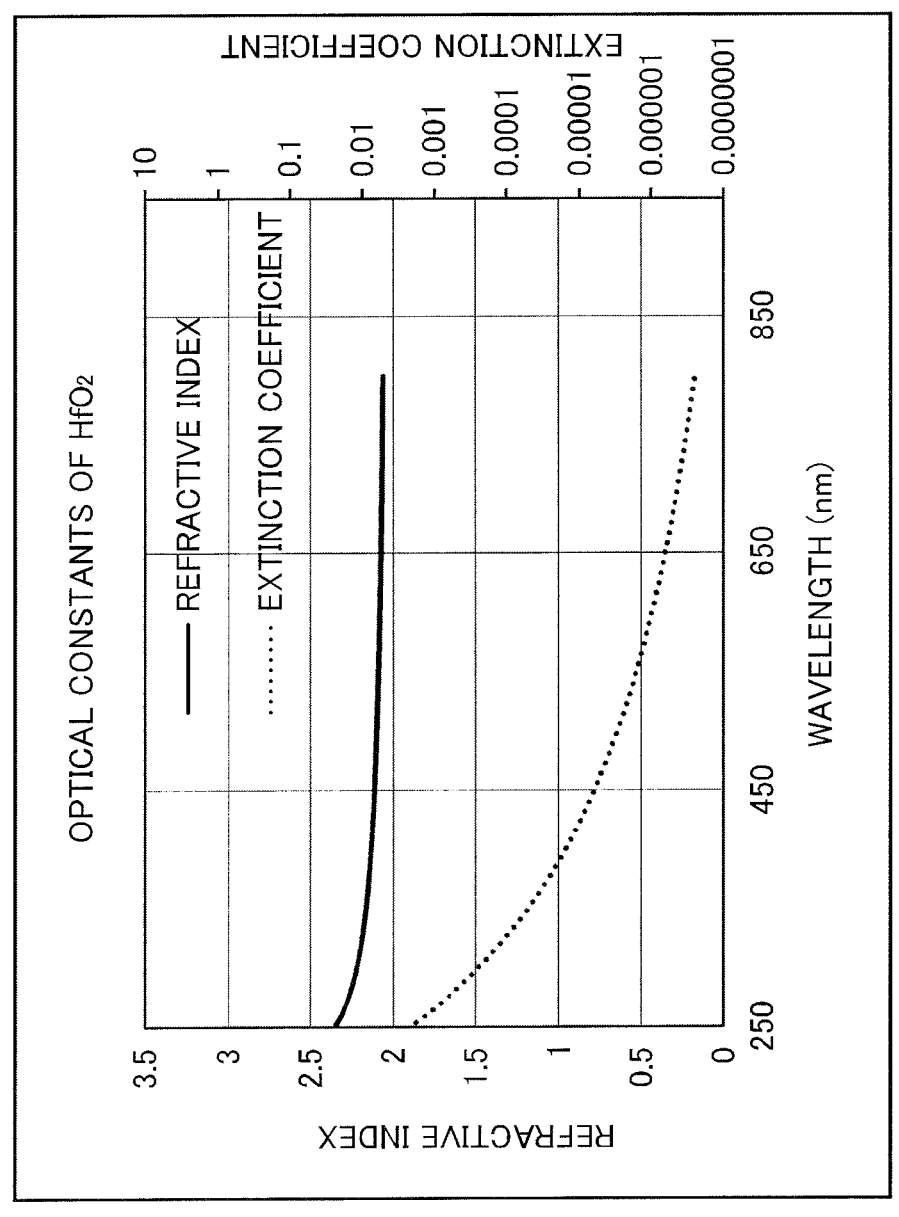
FIG. 25 is a graph related to optical constants of $HfO_2$.

The ordinal numbers, the materials, and the physical film thicknesses (nm) of the respective layers, the total physical film thicknesses, and the IR/UV ratios in examples 11 to 19 and comparative example 13 are indicated in the following Table 7. The optical constants of HfO$_2$ are shown in FIG. 25.

In comparative example 13 in which the Al layer 10 as the fifth layer is absent, the IR/UV ratio is almost 90%. Meanwhile, in each of examples 11 to 19 in which the Al layer 10 as the fifth layer is present, the IR/UV ratio is not higher than 77%.

In particular, in each of examples 11 to 17 in which the physical film thickness of the Al layer 10 as the fifth layer is not smaller than 5 nm and not larger than 30 nm, the IR/UV ratio is not higher than 72%.

With examples 11 to 19, cold mirrors having higher performances are provided, and a light concentrator 101 formed by using at least any of these cold mirrors guides a 300-to-500-nm light, which is to be observed, to a photodetector and suppresses, mainly through absorption, introduction of a 600-nm-or-longer light, which is not to be observed, to the photodetector.

As examples 21 to 29 and comparative example 23, articles obtained by changing some of the materials and the physical film thicknesses in the optical multilayer films 4 in examples 1 to 9 and comparative example 3 were designed and subjected to simulation. Numbers for example 20 and comparative examples 14 to 22 have been skipped.

In examples 21 to 29 and comparative example 23, the materials of all the low-refractive-index layers 12 were SiO$_2$, and the materials of all the high-refractive-index layers 14 were HfO$_2$. The physical film thicknesses of the substrates, the underlayers 3, and the Al layers 10 as the fifth layers, and the like, in examples 21 to 29 and comparative example 23 are equal to those in examples 1 to 9 and comparative example 3, respectively.

The ordinal numbers, the materials, and the physical film thicknesses (nm) of the respective layers, the total physical film thicknesses, and the IR/UV ratios in examples 21 to 29 and comparative example 23 are indicated in the following Table 8. The optical constants of Al, SiO$_2$, and HfO$_2$ are those shown in FIG. 5, FIG. 7, and FIG. 25, respectively.

Figure 28:
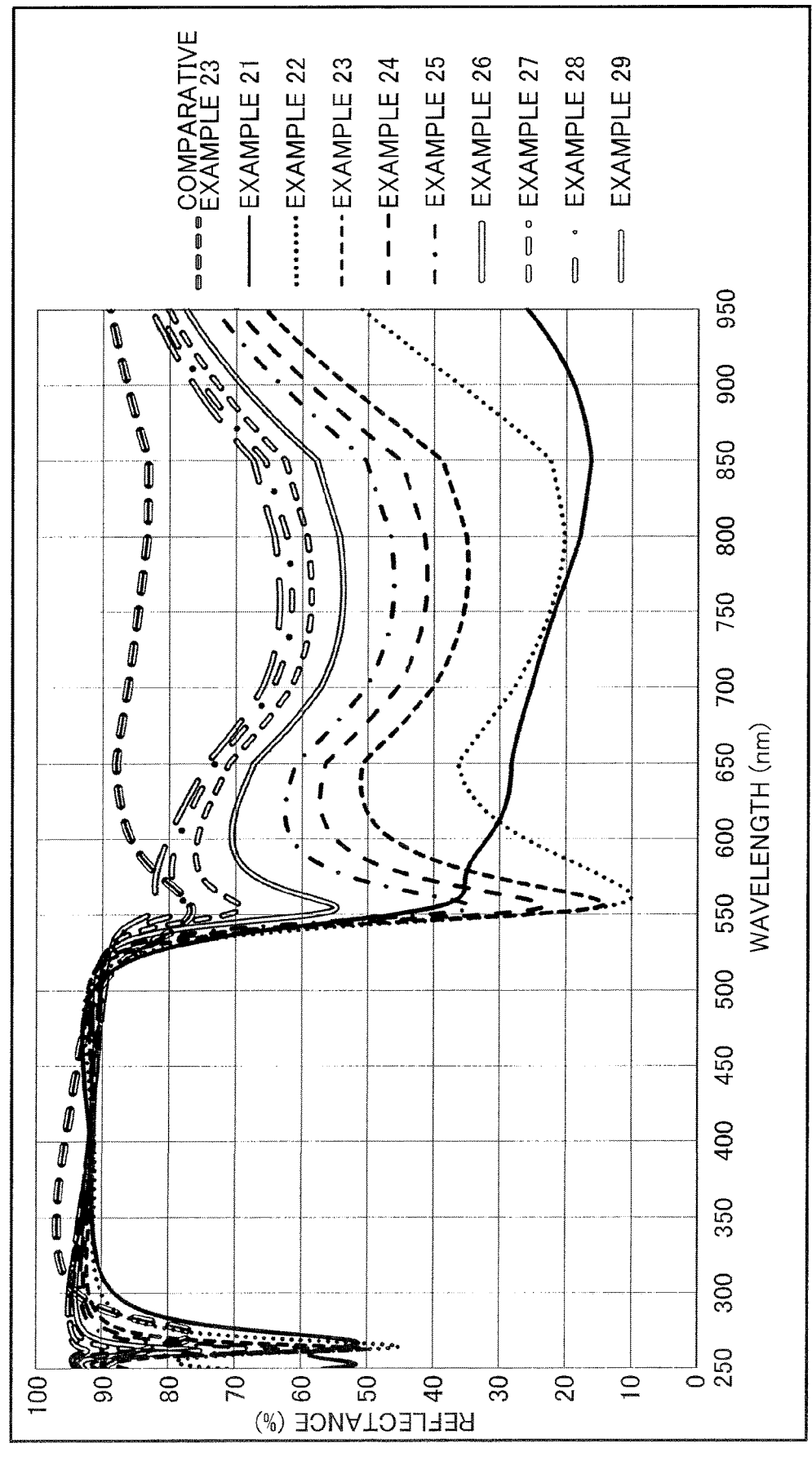
FIG. 28 is a graph of spectral reflectance distributions (reflection angle δ=65°), in the visible range and the ranges adjacent thereto, that are related to simulative examples 21 to 29 and comparative example 23.

Also, simulative spectral reflectance distributions (reflection angle δ=65°) of examples 21 to 29 and comparative example 23 are shown in FIG. 28.

Figure 29:
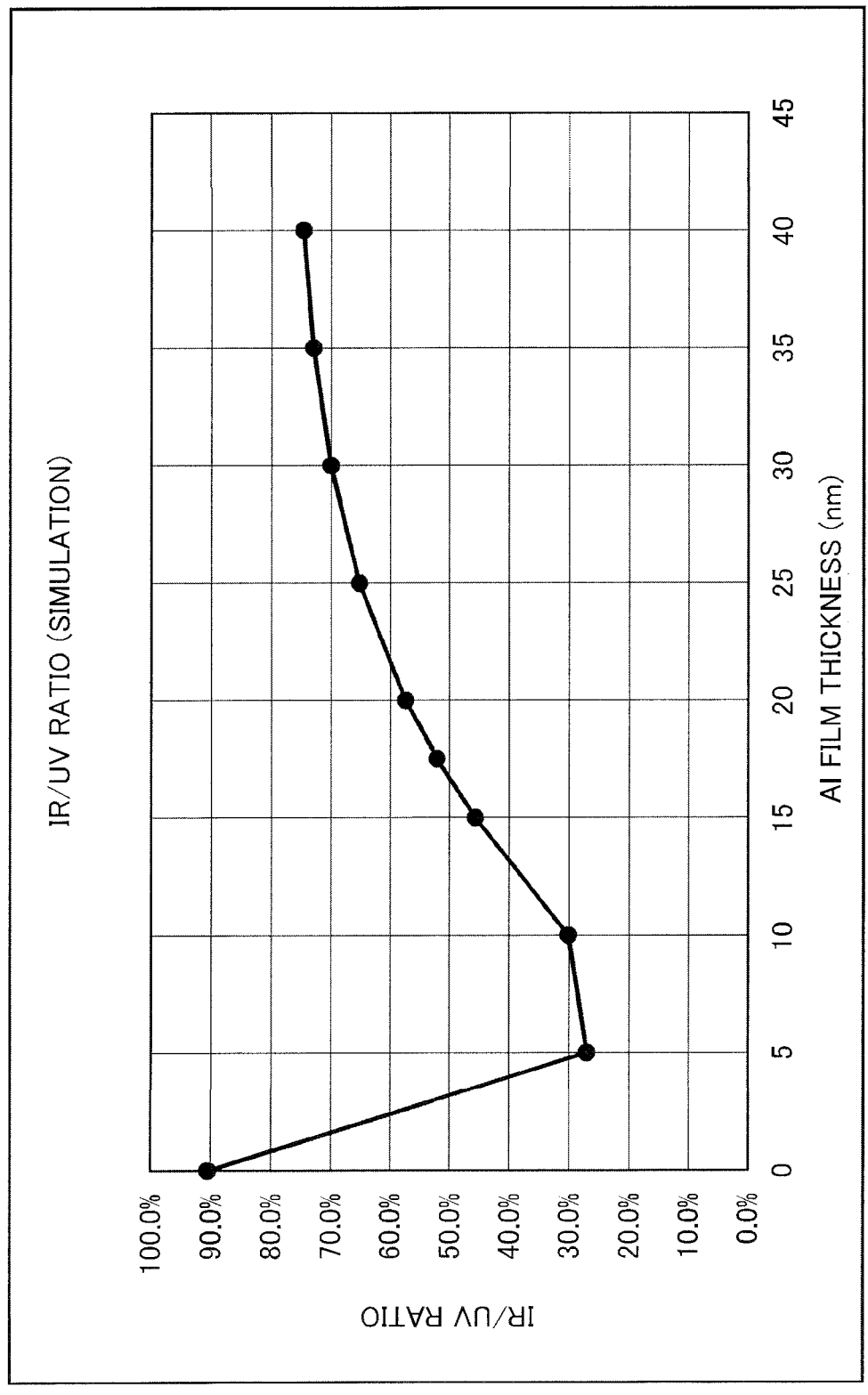
FIG. 29 is a graph related to the relationship between the IR/UV ratio (%) and the physical film thickness (nm) of an Al layer as a fifth layer in a simulation in each of examples 21 to 29 and comparative example 23.

Further, the relationship between the IR/UV ratio (%) and the physical film thickness of the Al layer 10 as the fifth layer (Al film thickness: nm) in a simulation in each of examples 21 to 29 and comparative example 23, is shown in FIG. 29.

formed by using at least any of these cold mirrors guides a 300-to-500-nm light, which is to be observed, to a photodetector and suppresses introduction of a 600-nm-or-longer light, which is not to be observed, to the photodetector.

As examples 31 to 39 and comparative example 33, articles obtained by changing some of the materials and the physical film thicknesses in the optical multilayer films 4 in examples 1 to 9 and comparative example 3 were designed and subjected to simulation. Numbers for example 30 and comparative examples 24 to 32 have been skipped.

In examples 31 to 39 and comparative example 33, the materials of all the low-refractive-index layers 12 were SiO$_2$, and the materials of all the high-refractive-index layers 14 were TiO$_2$. The physical film thicknesses of the substrates, the underlayers 3, and the Al layers 10 as the fifth layers, and the like, in examples 31 to 39 and comparative example 33 are equal to those in examples 1 to 9 and comparative example 3, respectively.

Figure 30:
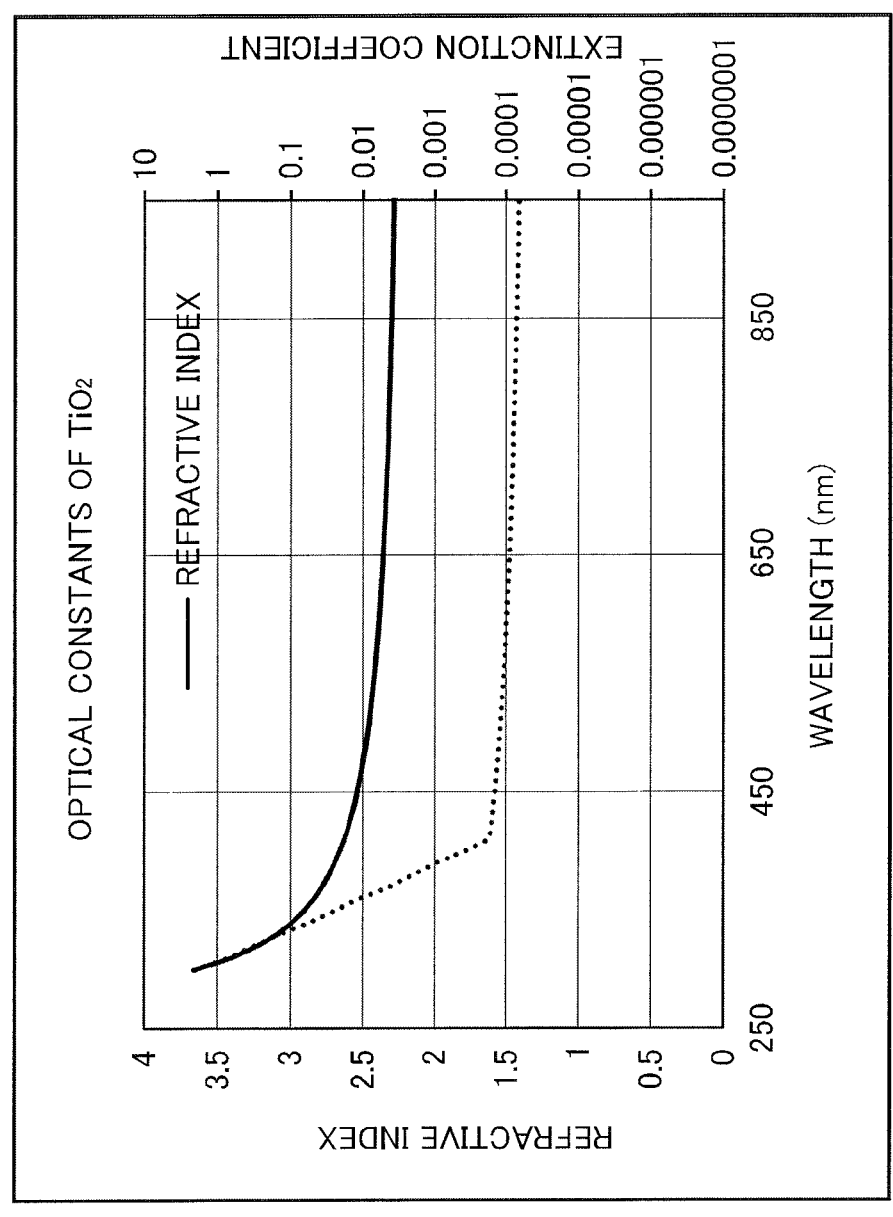
FIG. 30 is a graph related to optical constants of $TiO_2$.

The ordinal numbers, the materials, and the physical film thicknesses (nm) of the respective layers, the total physical film thicknesses, and the IR/UV ratios' in examples 31 to 39 and comparative example 33 are indicated in the following Table 9. The optical constants of TiO$_2$ are shown in FIG. 30. The optical constants of Al and SiO$_2$ are those shown in FIG. 5 and FIG. 7, respectively.

TABLE 8

| | Adhesion layer Al$_2$O$_3$ | First layer Al | Second layer SiO$_2$ | Third layer HfO$_2$ | Fourth layer SiO$_2$ | Fifth layer Al | Sixth layer SiO$_2$ | Seventh layer HfO$_2$ | Eighth layer SiO$_2$ | Total film thickness | IR/UV ratio |
|---|---|---|---|---|---|---|---|---|---|---|---|
| Comparative example 23 | 10.0 | 123.0 | 69.0 | 42.5 | 41.9 | 0.0 | 39.1 | 35.7 | 35.9 | 397.1 | 90.5% |
| Example 21 | 10.0 | 123.0 | 69.0 | 42.5 | 41.9 | 5.0 | 39.1 | 35.7 | 35.9 | 402.1 | 27.0% |
| Example 22 | 10.0 | 123.0 | 69.0 | 42.5 | 41.9 | 10.0 | 39.1 | 35.7 | 35.9 | 407.1 | 30.2% |
| Example 23 | 10.0 | 123.0 | 69.0 | 42.5 | 41.9 | 15.0 | 39.1 | 35.7 | 35.9 | 412.1 | 45.6% |
| Example 24 | 10.0 | 123.0 | 69.0 | 42.5 | 41.9 | 17.5 | 39.1 | 35.7 | 35.9 | 414.6 | 52.1% |
| Example 25 | 10.0 | 123.0 | 69.0 | 42.5 | 41.9 | 20.0 | 39.1 | 35.7 | 35.9 | 417.1 | 57.5% |
| Example 26 | 10.0 | 123.0 | 69.0 | 42.5 | 41.9 | 25.0 | 39.1 | 35.7 | 35.9 | 422.1 | 65.2% |
| Example 27 | 10.0 | 123.0 | 69.0 | 42.5 | 41.9 | 30.0 | 39.1 | 35.7 | 35.9 | 427.1 | 70.1% |
| Example 28 | 10.0 | 123.0 | 69.0 | 42.5 | 41.9 | 35.0 | 39.1 | 35.7 | 35.9 | 432.1 | 72.9% |
| Example 29 | 10.0 | 123.0 | 69.0 | 42.5 | 41.9 | 40.0 | 39.1 | 35.7 | 35.9 | 437.1 | 74.6% |

In comparative example 23 in which the Al layer 10 as the fifth layer is absent, the IR/UV ratio is higher than 90%. Meanwhile, in each of examples 21 to 29 in which the Al layer 10 as the fifth layer is present, the IR/UV ratio is not higher than 75%.

In particular, in each of examples 21 to 27 in which the physical film thickness of the Al layer 10 as the fifth layer is not smaller than 5 nm and not larger than 30 nm, the IR/UV ratio is not higher than 70.1%.

With examples 21 to 29, cold mirrors having higher performances are provided, and a light concentrator 101

Figure 31:
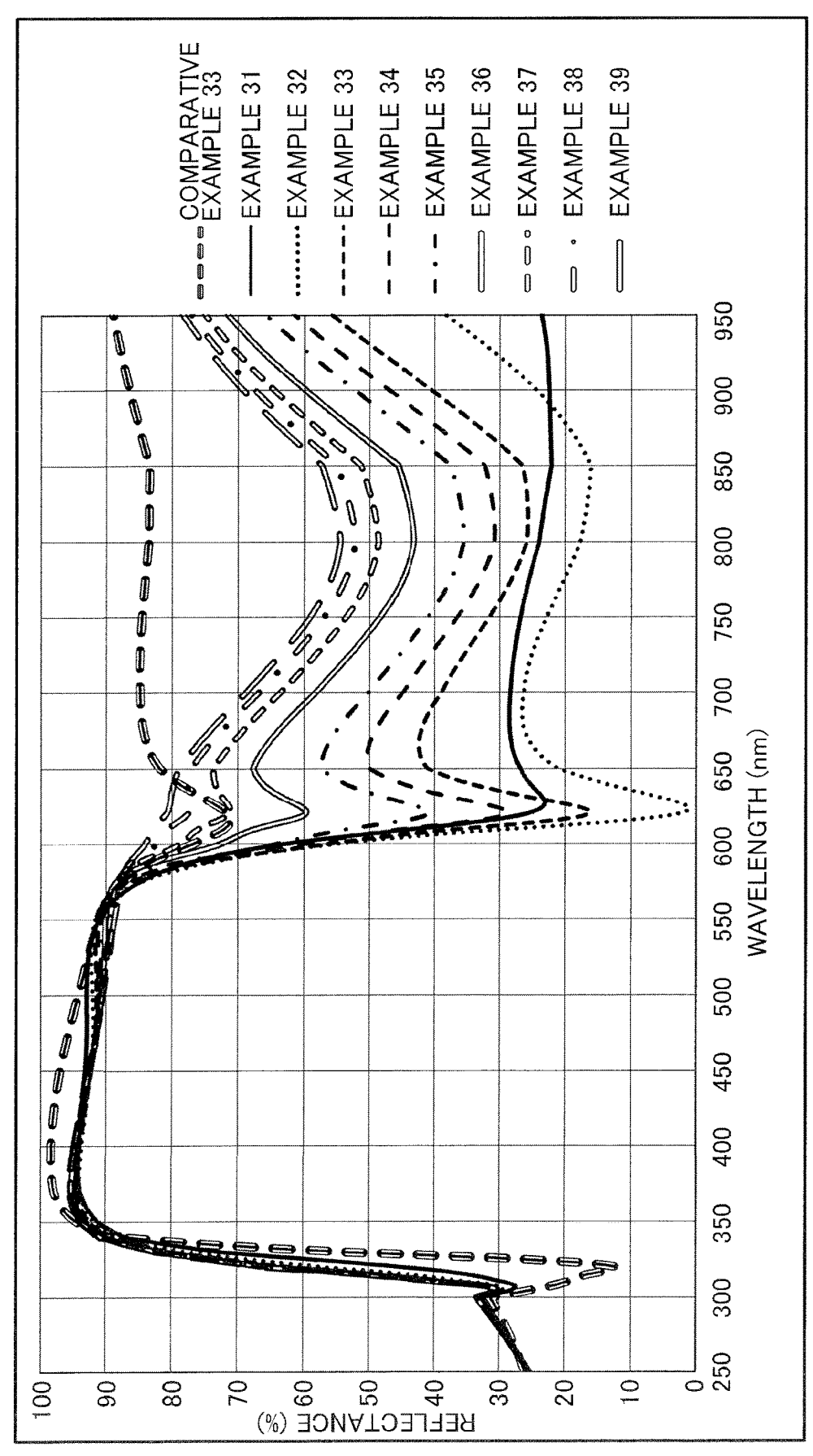
FIG. 31 is a graph of spectral reflectance distributions (reflection angle δ=65°), in the visible range and the ranges adjacent thereto, that are related to simulative examples 31 to 39 and comparative example 33.

Also, simulative spectral reflectance distributions (reflection angle δ=65°) of examples 31 to 39 and comparative example 33 are shown in FIG. 31.

Figure 32:
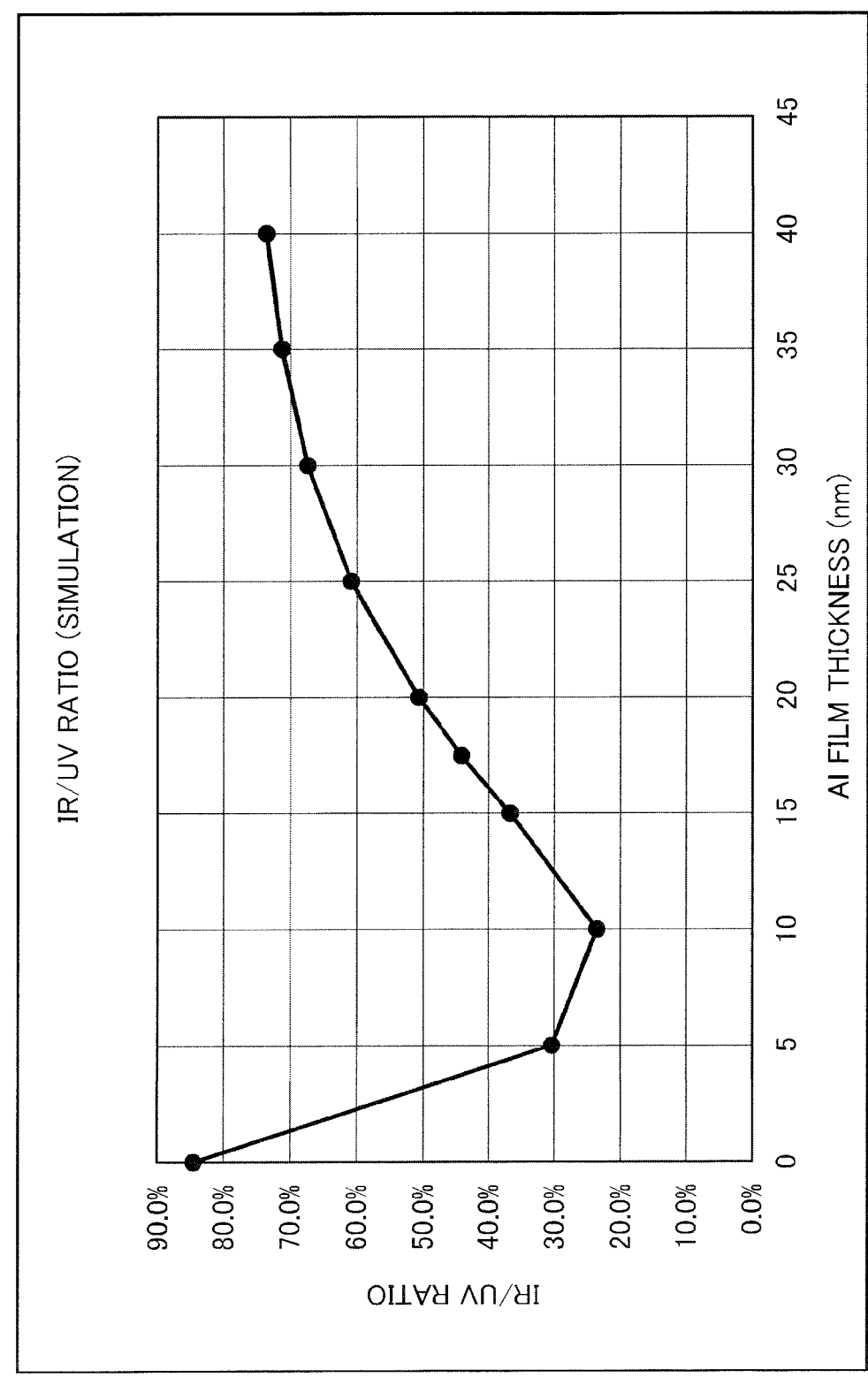
FIG. 32 is a graph related to the relationship between the IR/UV ratio (%) and the physical film thickness (nm) of an Al layer as a fifth layer in a simulation in each of examples 31 to 39 and comparative example 33.

Further, the relationship between the IR/UV ratio' (%) and the physical film thickness of the Al layer 10 as the fifth layer (Al film thickness: nm) in a simulation in each of examples 31 to 39 and comparative example 33, is shown in FIG. 32.

TABLE 9

| | Adhesion layer Al$_2$O$_3$ | First layer Al | Second layer SiO$_2$ | Third layer TiO$_2$ | Fourth layer SiO$_2$ | Fifth layer Al | Sixth layer SiO$_2$ | Seventh layer TiO$_2$ | Eighth layer SiO$_2$ | Total film thickness | IR/UV ratio' |
|---|---|---|---|---|---|---|---|---|---|---|---|
| Comparative example 33 | 10.0 | 123.0 | 69.0 | 42.5 | 41.9 | 0.0 | 39.1 | 35.7 | 35.9 | 397.1 | 84.5% |
| Example 31 | 10.0 | 123.0 | 69.0 | 42.5 | 41.9 | 5.0 | 39.1 | 35.7 | 35.9 | 402.1 | 30.4% |
| Example 32 | 10.0 | 123.0 | 69.0 | 42.5 | 41.9 | 10.0 | 39.1 | 35.7 | 35.9 | 407.1 | 23.5% |
| Example 33 | 10.0 | 123.0 | 69.0 | 42.5 | 41.9 | 15.0 | 39.1 | 35.7 | 35.9 | 412.1 | 36.7% |
| Example 34 | 10.0 | 123.0 | 69.0 | 42.5 | 41.9 | 17.5 | 39.1 | 35.7 | 35.9 | 414.6 | 44.1% |
| Example 35 | 10.0 | 123.0 | 69.0 | 42.5 | 41.9 | 20.0 | 39.1 | 35.7 | 35.9 | 417.1 | 50.7% |
| Example 36 | 10.0 | 123.0 | 69.0 | 42.5 | 41.9 | 25.0 | 39.1 | 35.7 | 35.9 | 422.1 | 60.8% |
| Example 37 | 10.0 | 123.0 | 69.0 | 42.5 | 41.9 | 30.0 | 39.1 | 35.7 | 35.9 | 427.1 | 67.4% |

TABLE 9-continued

| | Adhesion layer $Al_2O_3$ | First layer Al | Second layer $SiO_2$ | Third layer $TiO_2$ | Fourth layer $SiO_2$ | Fifth layer Al | Sixth layer $SiO_2$ | Seventh layer $TiO_2$ | Eighth layer $SiO_2$ | Total film thickness | IR/UV ratio' |
|---|---|---|---|---|---|---|---|---|---|---|---|
| Example 38 | 10.0 | 123.0 | 69.0 | 42.5 | 41.9 | 35.0 | 39.1 | 35.7 | 35.9 | 432.1 | 71.3% |
| Example 39 | 10.0 | 123.0 | 69.0 | 42.5 | 41.9 | 40.0 | 39.1 | 35.7 | 35.9 | 437.1 | 73.5% |

In comparative example 33 in which the Al layer 10 as the fifth layer is absent, the IR/UV ratio' is 84.5%. Meanwhile, in each of examples 31 to 39 in which the Al layer 10 as the fifth layer is present, the IR/UV ratio' is not higher than 74%.

In particular, in each of examples 31 to 37 in which the physical film thickness of the Al layer 10 as the fifth layer is not smaller than 5 nm and not larger than 30 nm, the IR/UV ratio' is not higher than 68%.

With examples 31 to 39, cold mirrors having higher performances are provided, and a light concentrator 101 formed by using at least any of these cold mirrors guides a 350-to-500-nm light, which is to be observed, to a photodetector and suppresses introduction of a 600-nm-or-longer light, which is not to be observed, to the photodetector.

As example 40, an article for reflecting a visible light (mainly light having a wavelength of 400 to 700 nm) and suppressing reflection of near-infrared rays was designed and subjected to simulation.

The ordinal numbers, the materials, and the physical film thicknesses (nm) of the respective layers in example 40 are indicated in the following Table 10. Various optical constants used in designing of example 40 are those shown in FIG. 5 to FIG. 7.

Figure 33:
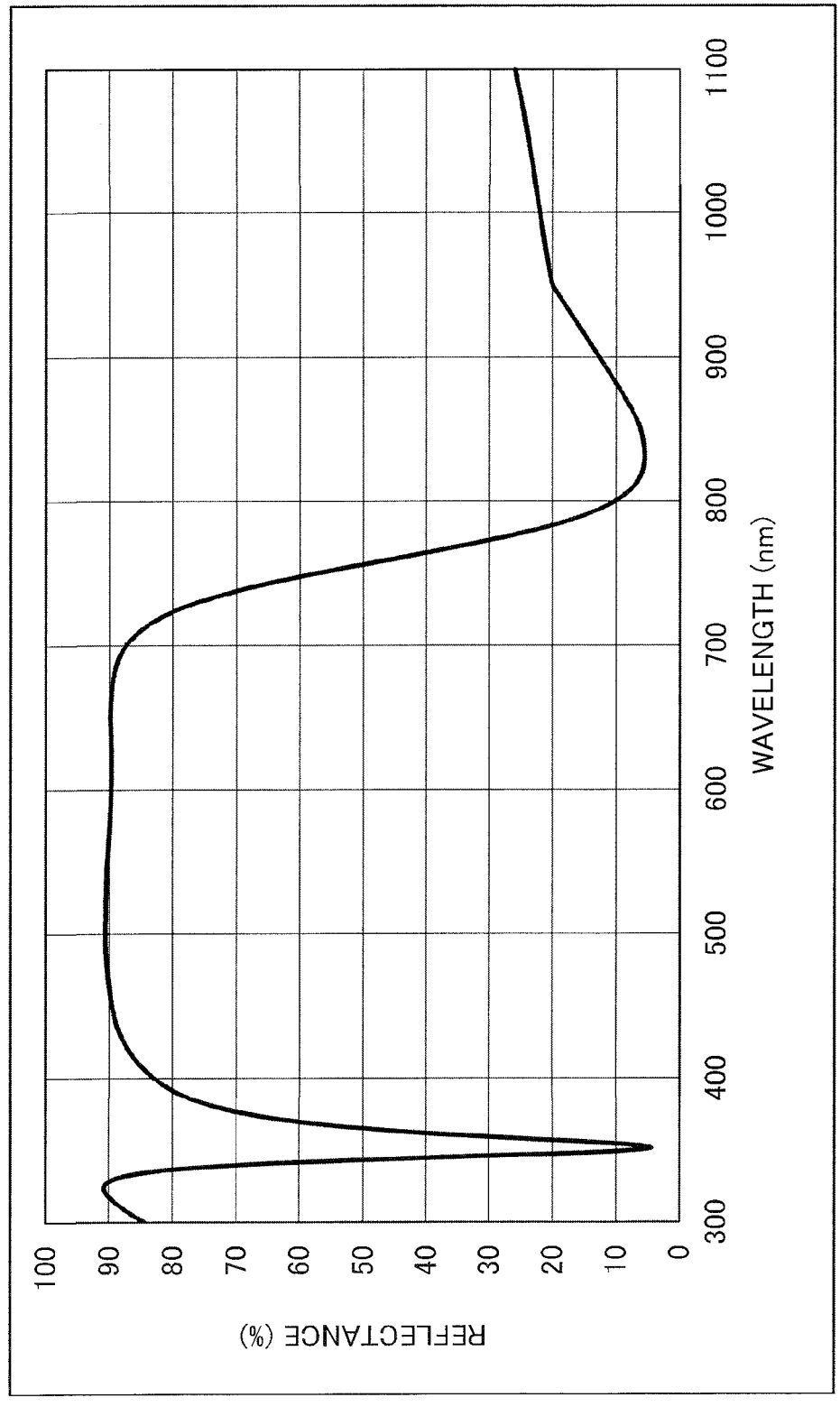
FIG. 33 is a graph of a spectral reflectance distribution, in the visible range and the ranges adjacent thereto, that is related to simulative example 40.

Also, a simulative spectral reflectance distribution regarding light incident in a direction perpendicular to a substrate of example 40 is shown in FIG. 33.

side. The first layer is an Al layer 10 as a first layer formed of Al, the second layer is a low-refractive-index layer 12 as a second layer formed of a low-refractive-index material, the third layer is a high-refractive-index layer 14 as a third layer formed of a high-refractive-index material, the fourth layer is a low-refractive-index layer 12 as a fourth layer formed of a low-refractive-index material, the fifth layer is an Al layer 10 as a fifth layer formed of Al, the sixth layer is a low-refractive-index layer 12 as a sixth layer formed of a low-refractive-index material, the seventh layer is a high-refractive-index layer 14 as a seventh layer formed of a high-refractive-index material, and the eighth layer is a low-refractive-index layer 12 as an eighth layer formed of a low-refractive-index material.

Therefore, a short-wavelength selective reflection type optical product 1 in which deformation at the time of production is suppressed is provided.

Further, in each of examples 1 to 7, 11 to 17, 21 to 27, 31 to 37, and 40, the physical film thickness of the Al layer 10 as the fifth layer is not smaller than 5 nm and not larger than 30 nm. Therefore, an optical product 1 having a more favorable performance is provided.

Also, in each of examples 1 to 39, light on the short wavelength side on which a higher reflectance is obtained than on the long wavelength side is light in a wavelength range of shorter than 600 nm (not shorter than 300 nm and not longer than 500 nm). Therefore, these examples are more

TABLE 10

| | Substrate | Underlayer | First layer | Second layer | Third layer | Fourth layer | Fifth layer | Sixth layer | Seventh layer | Eighth layer |
|---|---|---|---|---|---|---|---|---|---|---|
| Material | PC | $Al_2O_3$ | Al | $SiO_2$ | $Ta_2O_5$ | $SiO_2$ | Al | $SiO_2$ | $Ta_2O_5$ | $SiO_2$ |
| Film thickness (nm) | | 10.0 | 123.0 | 82.8 | 51.0 | 50.3 | 6.5 | 47.0 | 42.9 | 43.1 |

45

With example 40 (wavelength range on short wavelength side with high reflectance: visible range, wavelength range on long wavelength side with low reflectance: near-infrared range), a cold mirror that has a high performance and a long lifespan and that is intended for a band different from those in examples 1 to 39 (short wavelength side: 300 to 500 nm, long wavelength side: 600 to 800 nm), is provided.

That is, at least either of the shape and use regarding the film configuration of the present invention is not limited to the shape and/or use of a Cherenkov light concentrator, and the present invention is applicable to various shapes and uses, as in example 40.

Each of examples 1 to 40 includes a base member 2 and an optical multilayer film 4 formed indirectly above a film formation surface F of the base member 2. The optical multilayer film 4 reflects light on a short wavelength side and suppresses reflection of light on a longer wavelength side than the light on the short wavelength side. The optical multilayer film 4 has a first layer, a second layer, a third layer, a fourth layer, a fifth layer, a sixth layer, a seventh layer, and an eighth layer counted from the base member 2 suitable for light concentrators 101 intended for a gamma ray observation apparatus such as the CTA.

In addition, in example 40, light on the short wavelength side on which a higher reflectance is obtained than on the long wavelength side is light in a wavelength range of not shorter than 400 nm and not longer than 700 nm. Therefore, this example is more suitable for a cold mirror or the like intended for visible light.

Furthermore, in each of examples 1 to 40, an underlayer 3 for increasing the adhesiveness of the Al layer 10 as the first layer to the base member 2 is provided between the base member 2 and the Al layer 10 as the first layer. Therefore, the optical multilayer film 4 is more stably provided, and the performance of the optical product 1 is more stably exhibited.

In addition, in each of examples 1 to 40, each of the low-refractive-index materials is at least any of $SiO_2$, $CaF_2$, and $MgF_2$, and each of the high-refractive-index materials is at least any of $Ta_2O_5$, $ZrO_2$, $TiO_2$, $Nb_2O_5$, $HfO_2$, $CeO_2$, $Al_2O_3$, and $YO_2$, whereby the optical product 1 is more easily formed.

Also, if any of examples 1 to 40 is used for a light concentrator 101, a light concentrator 101 capable of increasing the sensitivity of detecting light in a predetermined wavelength range such as Cherenkov light is provided.

Further, if a light concentrator 101 includes a light concentrator body 102 having a tubular shape or a shape that is a part of the tubular shape, and the optical multilayer films 4 in any of examples 1 to 40 are disposed on the inner surface of the light concentrator body 102, it becomes possible to more easily provide a light concentrator 101 capable of increasing the sensitivity of detecting light in the predetermined wavelength range.

In addition, a light concentrator 101 in which the optical multilayer films 4 in any of examples 1 to 39 are disposed is for a gamma ray observation apparatus, and thus a light concentrator 101, for a gamma ray observation apparatus, that has a more excellent performance is provided.

As examples 51 to 56, optical products based on the above embodiment 2-1 were designed for reflection of UV and transmission of IR (for a light concentrator or the like) and were subjected to simulation. Numbers for examples 41 to 50 and comparative examples 34 to 52 have been skipped.

Physical film thicknesses other than the physical film thickness of the metal layer (first Al layer) as the first layer in the optical multilayer film (MLHALH) in embodiment 2-1 are equal among examples 51 to 56. Also, the physical film thickness of the underlayer 3 is equal (10 nm) thereamong.

Further, comparative examples 53 and 54 in which the physical film thicknesses of the first Al layers as the first layers in the optical multilayer films were respectively set to be 0 and 10 nm and the physical film thicknesses of the other layers were set to be equal to those in examples 51 to 56, were also designed and subjected to simulation.

The ordinal numbers, the materials, and the physical film thicknesses (nm) of the respective layers, the total physical film thicknesses, and the IR/UV ratios in examples 51 to 56 and comparative examples 53 and 54 are indicated in the following Table 11.

Figure 34:
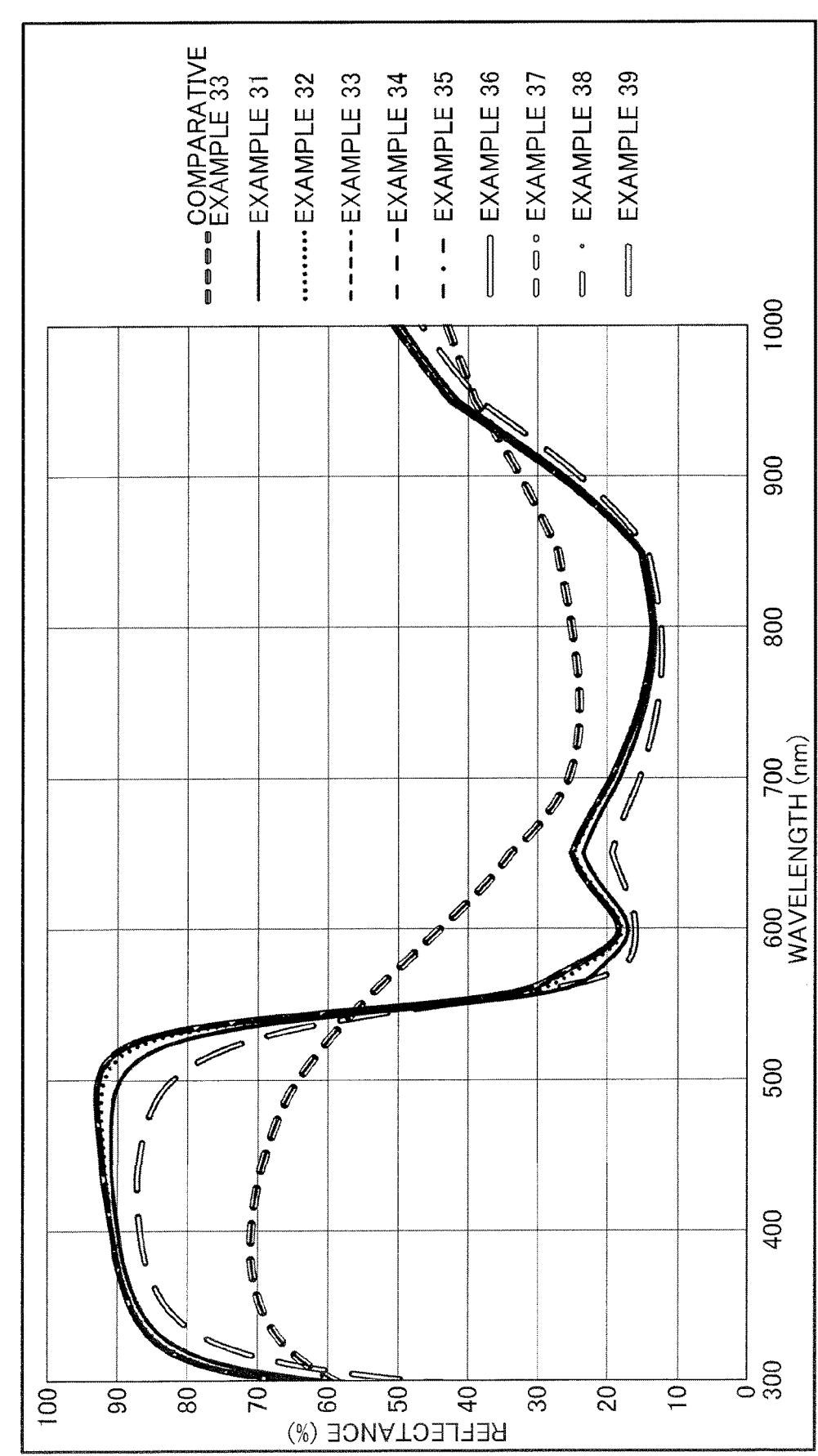
FIG. 34 is a graph of spectral reflectance distributions (reflection angle δ=65°), in the visible range and the ranges adjacent thereto, that are related to simulative examples 51 to 56 and comparative examples 53 and 54.

Also, simulative spectral reflectance distributions (reflection angle δ=65°) of examples 51 to 56 and comparative examples 53 and 54 are shown in FIG. 34.

Figure 35:
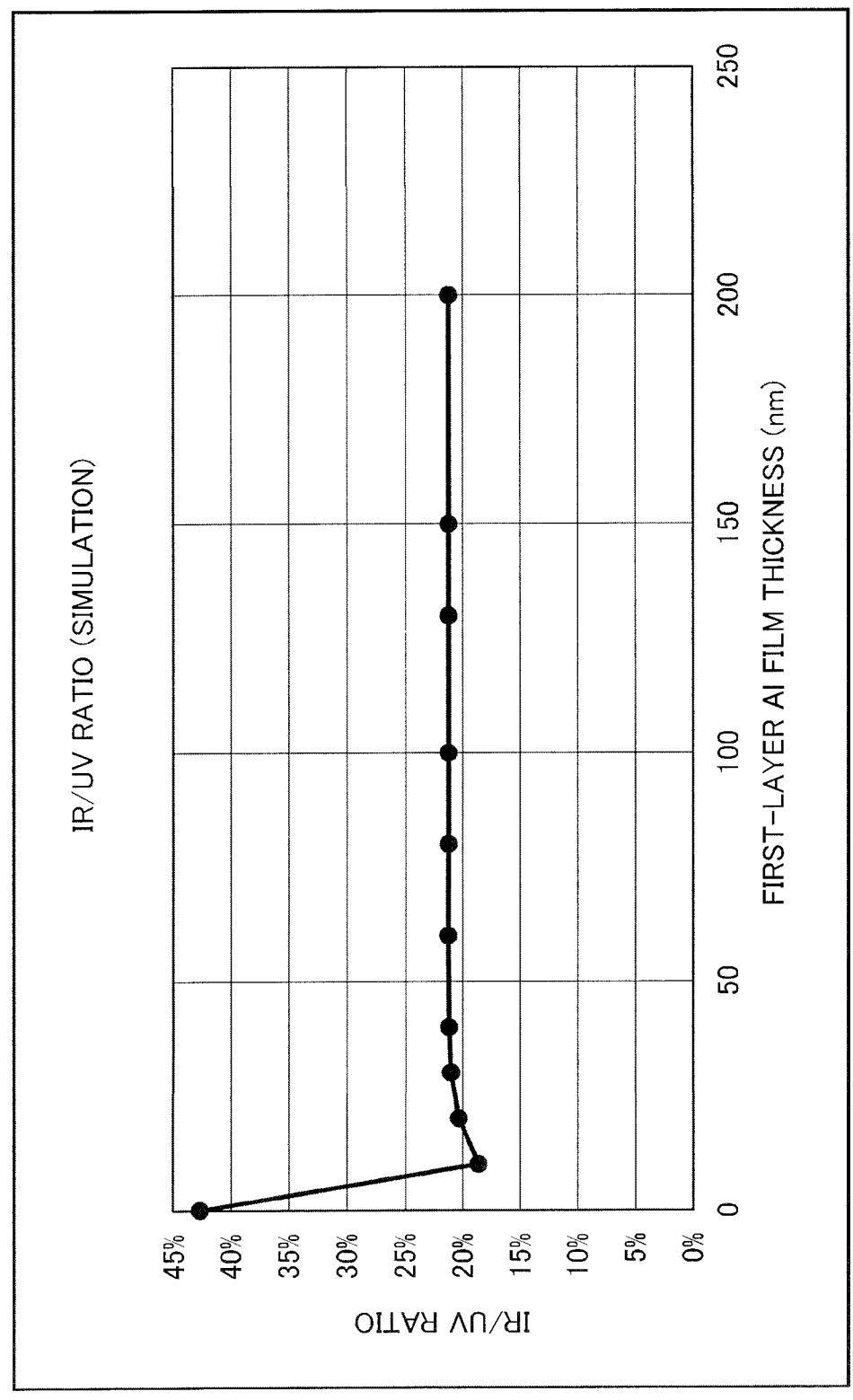
FIG. 35 is a graph related to the relationship between the IR/UV ratio (%) and the physical film thickness (nm) of a first Al layer as a first layer in a simulation in each of examples 51 to 56 and comparative examples 53 and 54.

Further, the relationship between the IR/UV ratio (%) and the physical film thickness of the first Al layer as the first layer (first-layer Al film thickness: nm) in a simulation in each of examples 51 to 56 and comparative examples 53 and 54, is shown in FIG. 35. In FIG. 35, the IR/UV ratios in examples with first layers having physical film thicknesses of 130, 150, and 200 nm are also shown.

In comparative example 53 in which the first Al layer as the first layer is absent, the IR/UV ratio is not lower than 40%. Meanwhile, in each of examples 51 to 56 in which the physical film thickness of the first Al layer as the first layer is not smaller than 20 nm and comparative example 54 in which the physical film thickness of the first Al layer as the first layer is 10 nm, the IR/UV ratio is not higher than 25%.

Also, in each of comparative examples 53 and 54, a sufficient reflectance is not obtained in the short wavelength range.

From these circumstances, it is found that the physical film thickness of the first Al layer (metal layer) is preferably not smaller than 20 nm.

As examples 61 to 67, optical products based on the above embodiment 2-2 were designed for reflection of UV and transmission of IR (for a light concentrator or the like) and were subjected to simulation. Numbers for examples 57 to 60 and comparative examples 55 to 62 have been skipped.

Physical film thicknesses other than the physical film thickness of the second Al layer as the fourth layer in the optical multilayer film (MLHALH) in embodiment 2-2 are equal among examples 61 to 67. Also, the physical film thickness of the underlayer 3 is equal (10 nm) thereamong.

Further, comparative example 63 in which the physical film thickness of the second Al layer as the fourth layer in the optical multilayer film was set to 0 nm and the physical film thicknesses of the other layers were set to be equal to those in examples 61 to 67, was also designed and subjected to simulation.

The ordinal numbers, the materials, and the physical film thicknesses (nm) of the respective layers, the total physical film thicknesses, and the IR/UV ratios in examples 61 to 67 and comparative example 63 are indicated in the following Table 12.

Figure 36:
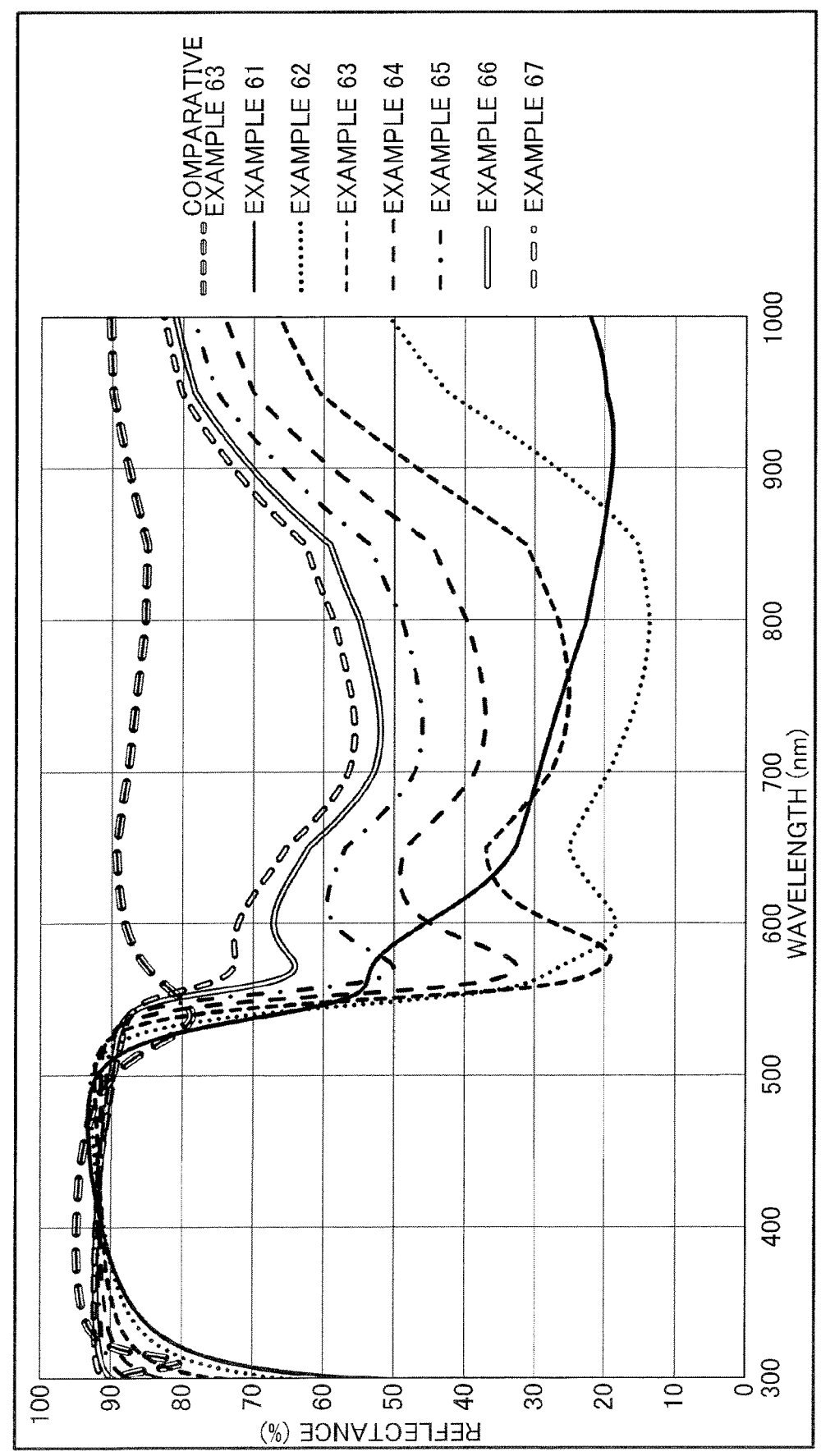
FIG. 36 is a graph of spectral reflectance distributions (reflection angle δ=65°), in the visible range and the ranges adjacent thereto, that are related to simulative examples 61 to 67 and comparative example 63.

Also, simulative spectral reflectance distributions (reflection angle δ=65°) of examples 61 to 67 and comparative example 63 are shown in FIG. 36.

Figure 37:
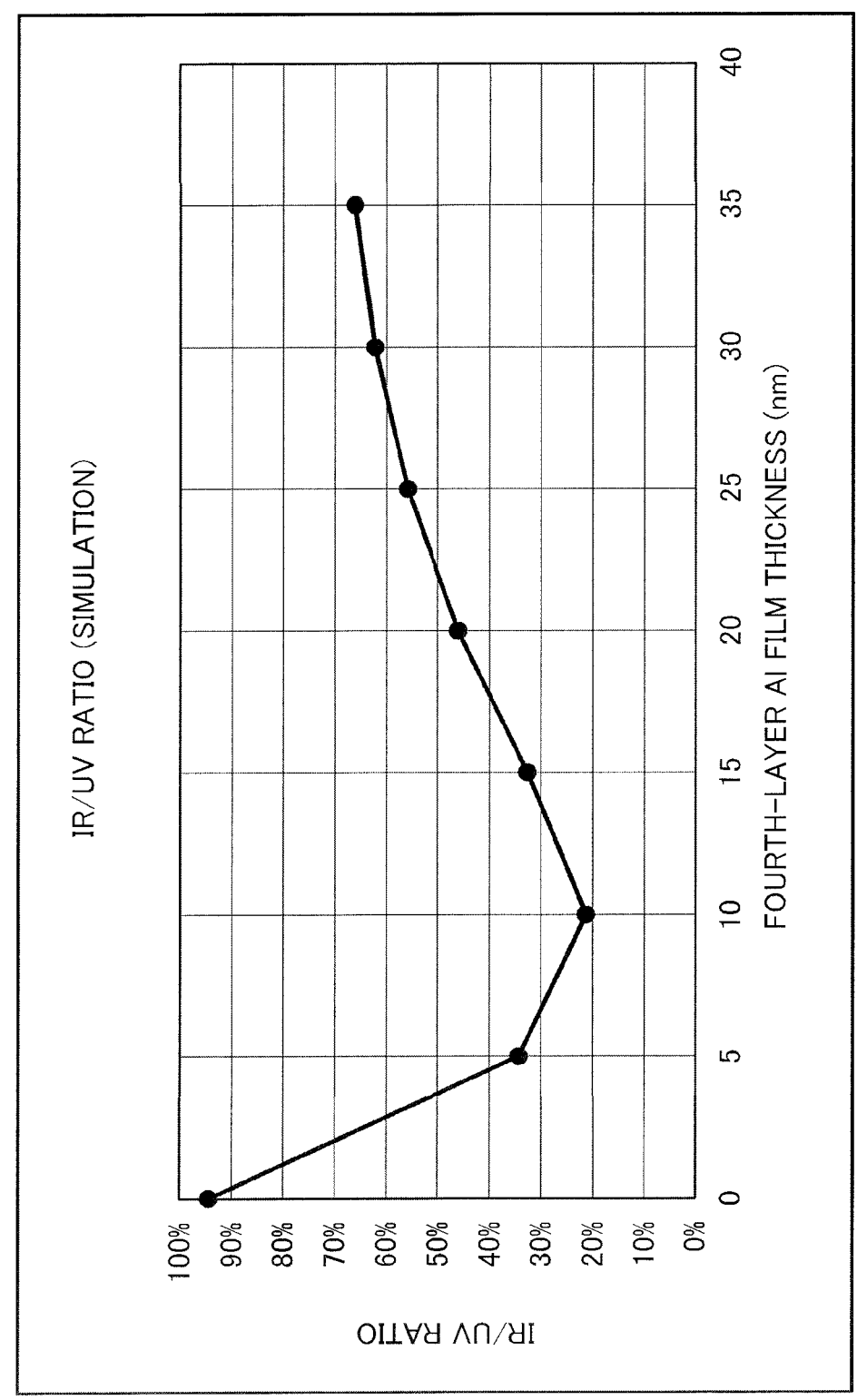
FIG. 37 is a graph related to the relationship between the IR/UV ratio (%) and the physical film thickness (nm) of a second Al layer as a fourth layer in a simulation in each of examples 61 to 67 and comparative example 63.

Further, the relationship between the IR/UV ratio (%) and the physical film thickness of the second Al layer as the fourth layer (fourth-layer Al film thickness: nm) in a simulation in each of examples 61 to 67 and comparative example 63, is shown in FIG. 37.

TABLE 11

|  | Underlayer $Al_2O_3$ | M First layer Al | L Second layer $SiO_2$ | H Third layer $HfO_2$ | A Fourth layer Al | L Fifth layer $SiO_2$ | H Sixth layer $HfO_2$ | Total film thickness | IR/UV ratio |
|---|---|---|---|---|---|---|---|---|---|
| Comparative example 53 | 10.0 | 0.0 | 52.0 | 84.0 | 10.0 | 14.9 | 65.0 | 225.9 | 42.7% |
| Comparative example 54 | 10.0 | 10.0 | 52.0 | 84.0 | 10.0 | 14.9 | 65.0 | 235.9 | 18.6% |
| Example 51 | 10.0 | 20.0 | 52.0 | 84.0 | 10.0 | 14.9 | 65.0 | 245.9 | 20.3% |
| Example 52 | 10.0 | 30.0 | 52.0 | 84.0 | 10.0 | 14.9 | 65.0 | 255.9 | 21.0% |
| Example 53 | 10.0 | 40.0 | 52.0 | 84.0 | 10.0 | 14.9 | 65.0 | 265.9 | 21.2% |
| Example 54 | 10.0 | 60.0 | 52.0 | 84.0 | 10.0 | 14.9 | 65.0 | 285.9 | 21.2% |
| Example 55 | 10.0 | 80.0 | 52.0 | 84.0 | 10.0 | 14.9 | 65.0 | 305.9 | 21.2% |
| Example 56 | 10.0 | 100.0 | 52.0 | 84.0 | 10.0 | 14.9 | 65.0 | 325.9 | 21.2% |

TABLE 12

|  | Underlayer Al$_2$O$_3$ | M First layer Al | L Second layer SiO$_2$ | H Third layer HfO$_2$ | A Fourth layer Al | L Fifth layer SiO$_2$ | H Sixth layer HfO$_2$ | Total film thickness | IR/UV ratio |
|---|---|---|---|---|---|---|---|---|---|
| Comparative example 63 | 10.0 | 130.0 | 52.0 | 84.0 | 0.0 | 14.9 | 65.0 | 345.9 | 94.4% |
| Example 61 | 10.0 | 130.0 | 52.0 | 84.0 | 5.0 | 14.9 | 65.0 | 350.9 | 34.3% |
| Example 62 | 10.0 | 130.0 | 52.0 | 84.0 | 10.0 | 14.9 | 65.0 | 355.9 | 21.2% |
| Example 63 | 10.0 | 130.0 | 52.0 | 84.0 | 15.0 | 14.9 | 65.0 | 360.9 | 32.7% |
| Example 64 | 10.0 | 130.0 | 52.0 | 84.0 | 20.0 | 14.9 | 65.0 | 365.9 | 46.0% |
| Example 65 | 10.0 | 130.0 | 52.0 | 84.0 | 25.0 | 14.9 | 65.0 | 370.9 | 55.8% |
| Example 66 | 10.0 | 130.0 | 52.0 | 84.0 | 30.0 | 14.9 | 65.0 | 375.9 | 62.2% |
| Example 67 | 10.0 | 130.0 | 52.0 | 84.0 | 35.0 | 14.9 | 65.0 | 380.9 | 66.1% |

In comparative example 63 in which the second Al layer as the fourth layer is absent, the IR/UV ratio is not lower than 90%. Meanwhile, in each of examples 61 to 67 in which the physical film thickness of the second Al layer as the fourth layer is not smaller than 5 nm and not larger than 35 nm, the IR/UV ratio is not higher than 70%. In particular, in each of examples 61 to 66 in which the physical film thickness of the second Al layer as the fourth layer is not smaller than 5 nm and not larger than 30 nm, the IR/UV ratio is not higher than 65%.

From these circumstances, it is found that the physical film thickness of the second Al layer (the Al layer that is closest to the air side) is preferably not smaller than 5 nm and not larger than 35 nm and more preferably not smaller than 5 nm and not larger than 30 nm.

As examples 71 to 78, optical products based on the above embodiment 2-3 were designed for reflection of VL and transmission of IR (for a periscope camera or the like) and were subjected to simulation. Embodiment 2-3 is obtained by changing the first layer (metal layer) of the optical The ordinal numbers, the materials, and the physical film thicknesses (nm) of the respective layers, the total physical film thicknesses, and the IR/VL ratios in examples 71 to 78 and comparative example 73 are indicated in the following Table 13.

Figure 38:
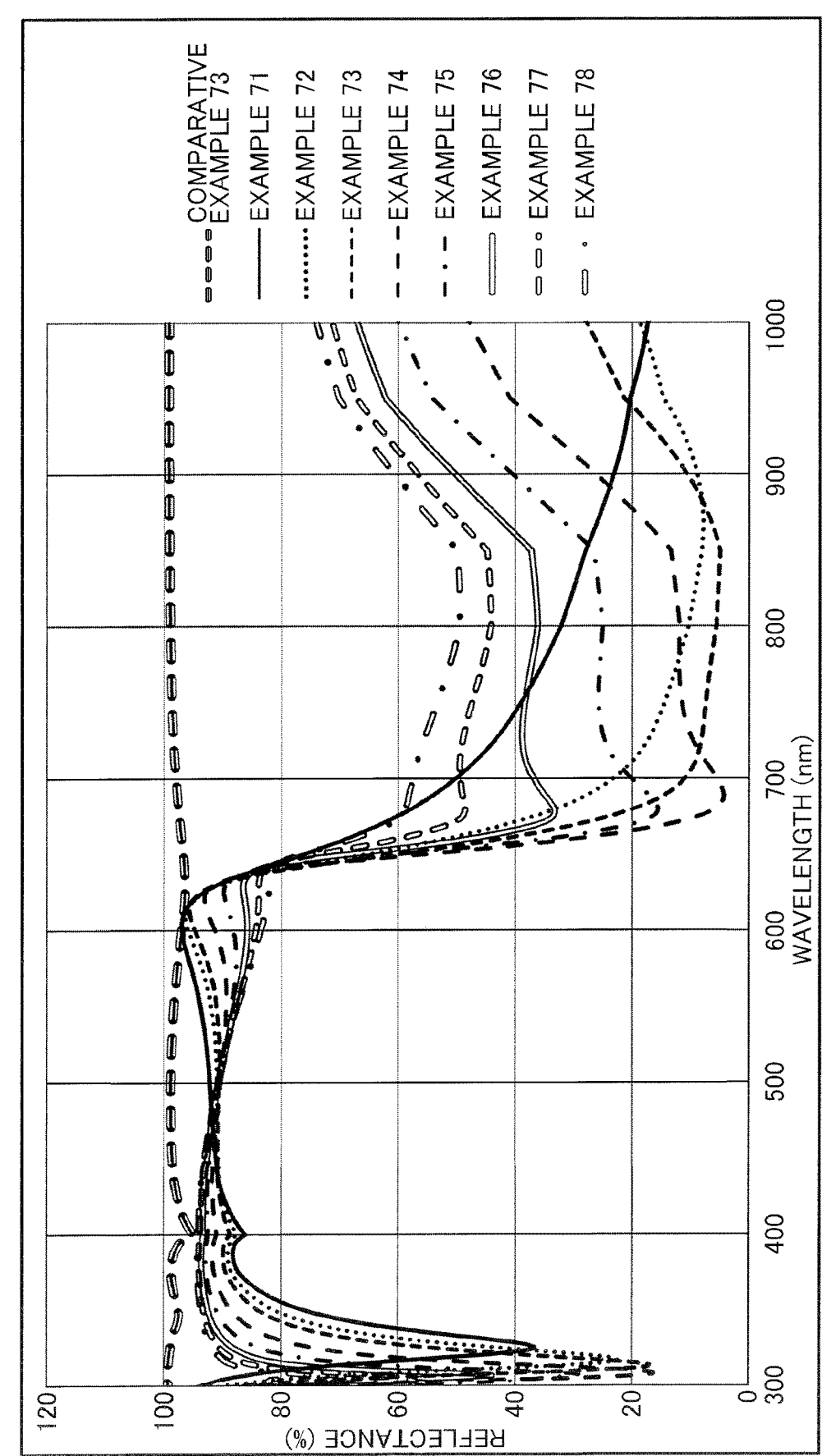
FIG. 38 is a graph of spectral reflectance distributions (reflection angle δ=45°), in the visible range and the ranges adjacent thereto, that are related to simulative examples 71 to 78 and comparative example 73.

Also, simulative spectral reflectance distributions (reflection angle δ=45°) of examples 71 to 78 and comparative example 73 are shown in FIG. 38.

Figure 39:
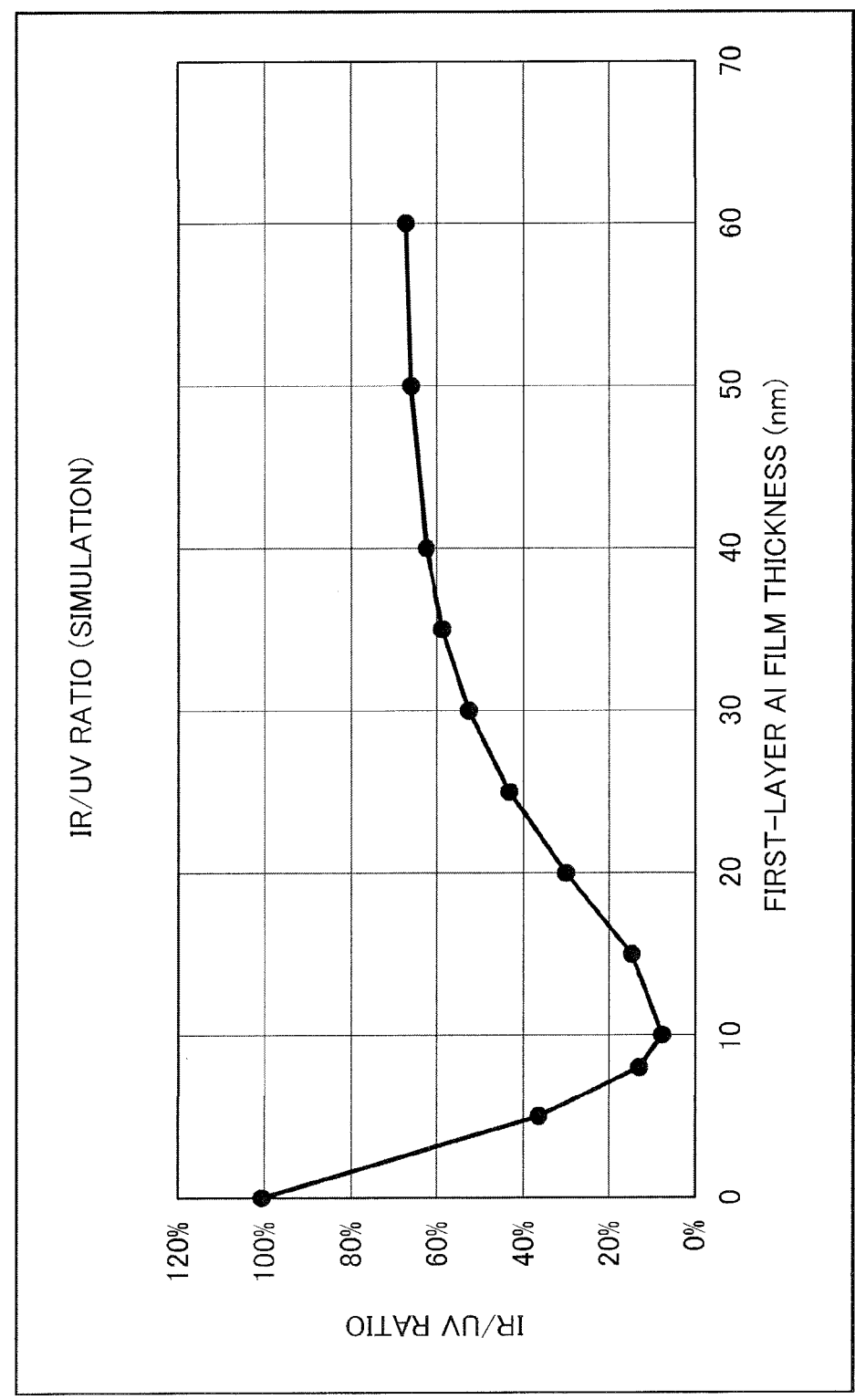
FIG. 39 is a graph related to the relationship between an IR/VL ratio (%) and the physical film thickness (nm) of a second Al layer as a fourth layer in a simulation in each of examples 71 to 78 and comparative example 73.

Further, the relationship between the IR/VL ratio (%) and the physical film thickness of the second Al layer as the fourth layer (fourth-layer Al film thickness: nm) in a simulation in each of examples 71 to 78 and comparative example 73, is shown in FIG. 39. In FIG. 39, the IR/VL ratios in examples with fourth layers having physical film thicknesses of 40, 50, and 60 nm are also shown.

Figure 40:
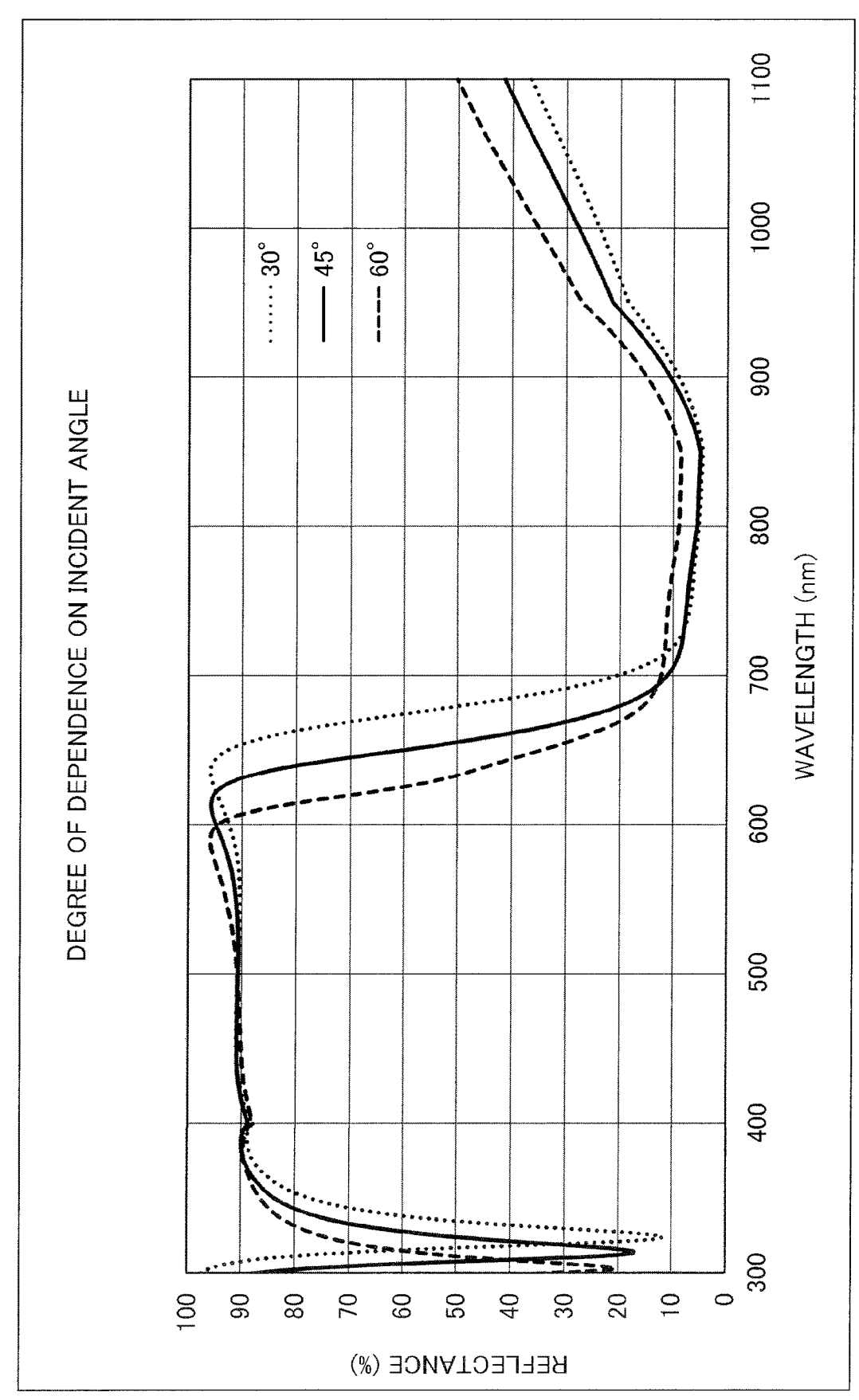
FIG. 40 is a graph related to simulative spectral reflectance distributions, of example 72 (fourth-layer Al film thickness: 10 nm), that correspond to three types of reflection angles δ=30°, 45°, and 60°.

In addition, in order to ascertain the degree of dependence on the incident angle, simulative spectral reflectance distributions, of example 72 (fourth-layer Al film thickness: 10 nm), that correspond to three types of reflection angles δ=30°, 45°, and 60° are shown in FIG. 40.

TABLE 13

|  | Underlayer Al$_2$O$_3$ | M First layer Ag | L Second layer SiO$_2$ | H Third layer HfO$_2$ | A Fourth layer Al | L Fifth layer SiO$_2$ | H Sixth layer HfO$_2$ | Total film thickness | IR/VL ratio |
|---|---|---|---|---|---|---|---|---|---|
| Comparative example 73 | 10.0 | 100.0 | 56.8 | 92.0 | 0.0 | 16.3 | 71.2 | 336.3 | 100.7% |
| Example 71 | 10.0 | 100.0 | 56.8 | 92.0 | 5.0 | 16.3 | 71.2 | 341.3 | 36.5% |
| Example 72 | 10.0 | 100.0 | 56.8 | 92.0 | 8.0 | 16.3 | 71.2 | 344.3 | 13.0% |
| Example 73 | 10.0 | 100.0 | 56.8 | 92.0 | 10.0 | 16.3 | 71.2 | 346.3 | 7.6% |
| Example 74 | 10.0 | 100.0 | 56.8 | 92.0 | 15.0 | 16.3 | 71.2 | 351.3 | 14.7% |
| Example 75 | 10.0 | 100.0 | 56.8 | 92.0 | 20.0 | 16.3 | 71.2 | 356.3 | 30.1% |
| Example 76 | 10.0 | 100.0 | 56.8 | 92.0 | 25.0 | 16.3 | 71.2 | 361.3 | 43.2% |
| Example 77 | 10.0 | 100.0 | 56.8 | 92.0 | 30.0 | 16.3 | 71.2 | 366.3 | 52.6% |
| Example 78 | 10.0 | 100.0 | 56.8 | 92.0 | 35.0 | 16.3 | 71.2 | 371.3 | 58.7% | multilayer film in embodiment 2-2 from the first Al layer to the Ag layer. Numbers for examples 68 to 70 and comparative examples 64 to 72 have been skipped.

Physical film thicknesses other than the physical film thickness of the second Al layer as the fourth layer in the optical multilayer film (MLHALH) in embodiment 2-3 are equal among examples 71 to 78. Also, the physical film thickness of the underlayer 3 is equal (10 nm) thereamong.

Further, comparative example 73 in which the physical film thickness of the second Al layer as the fourth layer in the optical multilayer film was set to 0 nm and the physical film thicknesses of the other layers were set to be equal to those in examples 71 to 78, was also designed and subjected to simulation.

In comparative example 73 in which the second Al layer as the fourth layer is absent, the IR/VL ratio is higher than 100%. Meanwhile, in each of examples 71 to 78 in which the physical film thickness of the second Al layer as the fourth layer is not smaller than 5 nm and not larger than 35 nm, the IR/VL ratio is not higher than 60%. In particular, in each of examples 71 to 77 in which the physical film thickness of the second Al layer as the fourth layer is not smaller than 5 nm and not larger than 30 nm, the IR/VL ratio is not higher than 55%.

From these circumstances, it is found that the physical film thickness of the second Al layer (the Al layer that is closest to the air side) is preferably not smaller than 5 nm and not larger than 35 nm and more preferably not smaller than 5 nm and not larger than 30 nm.

In, for example, a mirror for a periscope camera, an imaging element has a spread, and thus it is preferable that the basic reflection angle δ is set to, for example, 45°, and spectral reflection (transmission) performances on the short wavelength side and the long wavelength side are stable also over a certain range of reflection angles δ (for example, 45°±15°). In this respect, if focus is placed on the short wavelength side (400 to 600 nm) and the long wavelength side (700 to 900 nm) in FIG. 40, it is found that a spectral reflectance distribution with the reflection angle δ being 45−15=30°, a spectral reflectance distribution with the reflection angle δ being 45°, and a spectral reflectance distribution with the reflection angle δ being 45±15=60° are similar to one another in example 72. That is, the degree of dependence, on the incident angle, of the spectral reflectance distribution of example 72 is low, thereby realizing a mirror having a more favorable performance. Similar to example 72, the degrees of dependence, on the incident angle, of the spectral reflectance distributions of examples 71 and 73 to 77 are also low.

As examples 81 to 87, optical products based on the above embodiment 2-4 were designed for reflection of UV and transmission of IR (for a light concentrator or the like) and were subjected to simulation. Numbers for examples 79 and 80 and comparative examples 74 to 82 have been skipped.

Physical film thicknesses other than the physical film thickness of the second Al layer as the fourth layer in the optical multilayer film (MLHAH) in embodiment 2-4 are equal among examples 81 to 87. Also, the physical film thickness of the underlayer 3 is equal (10 nm) thereamong.

Further, comparative example 83 in which the physical film thickness of the second Al layer as the fourth layer in the optical multilayer film was set to 0 nm and the physical film thicknesses of the other layers were set to be equal to those in examples 81 to 87, was also designed and subjected to simulation.

The ordinal numbers, the materials, and the physical film thicknesses (nm) of the respective layers, the total physical film thicknesses, and the IR/UV ratios in examples 81 to 87 and comparative example 83 are indicated in the following Table 14.

Figure 41:
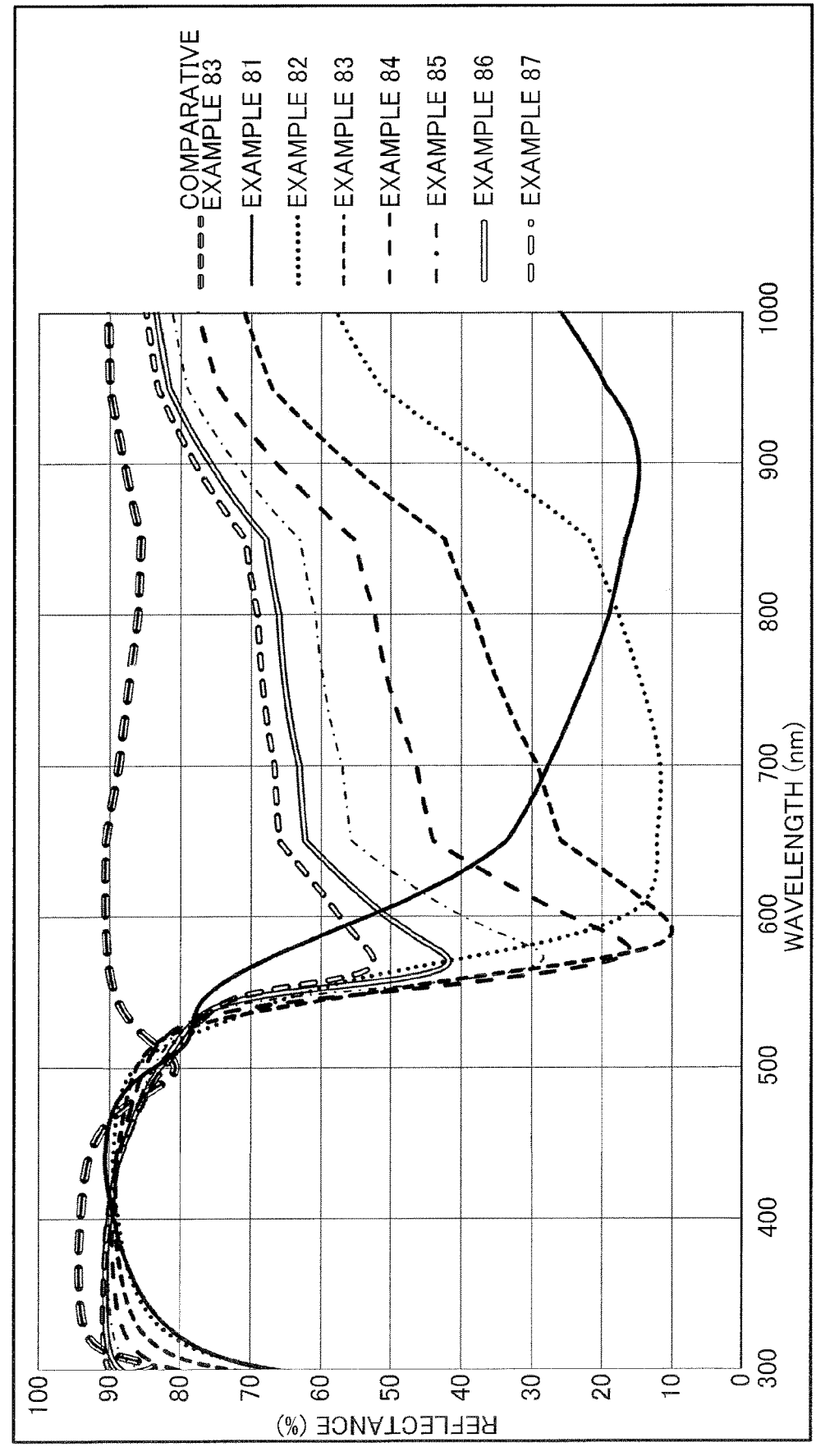
FIG. 41 is a graph of spectral reflectance distributions (reflection angle δ=65°), in the visible range and the ranges adjacent thereto, that are related to simulative examples 81 to 87 and comparative example 83.

Also, simulative spectral reflectance distributions (reflection angle δ=65°) of examples 81 to 87 and comparative example 83 are shown in FIG. 41.

Figure 42:
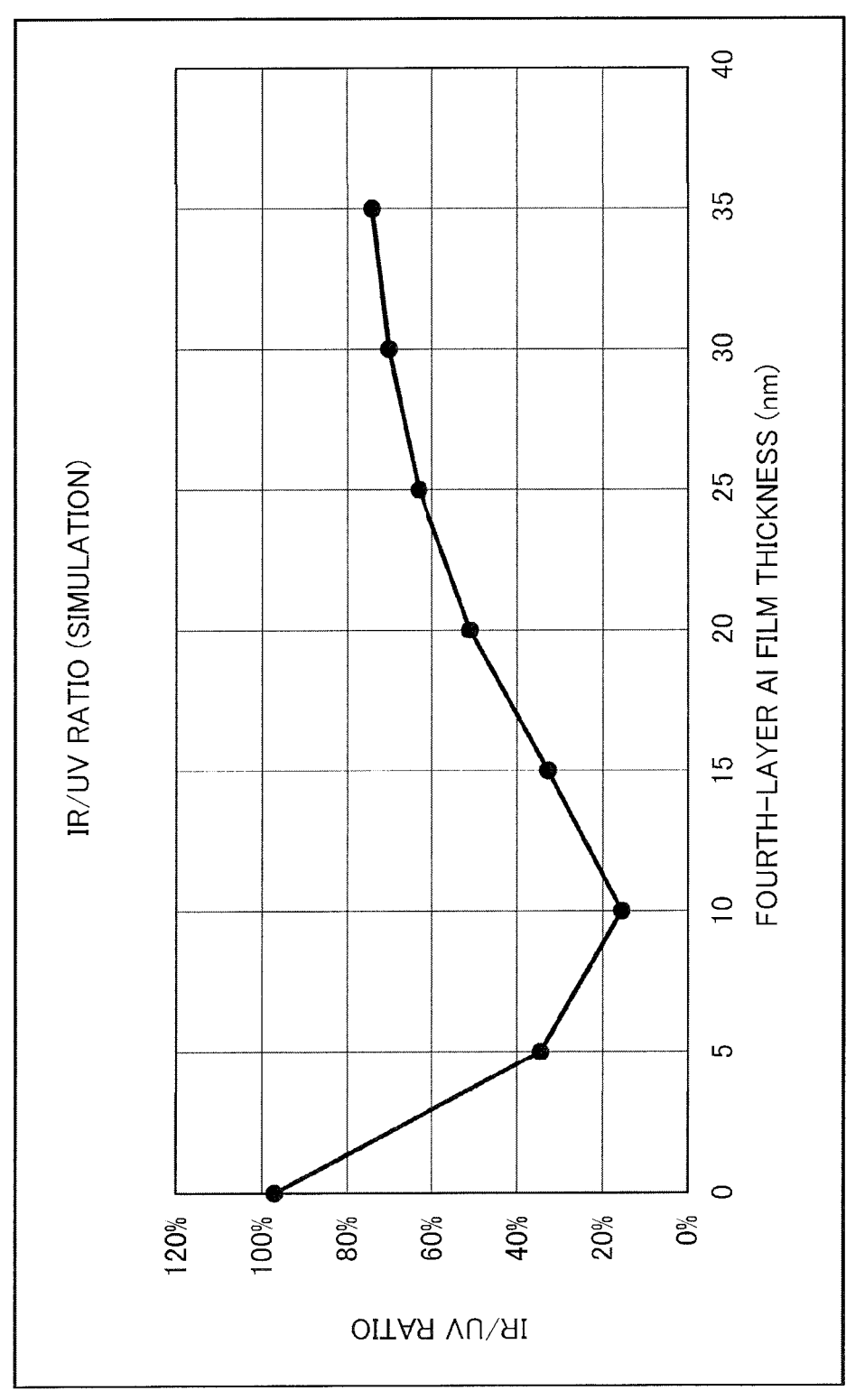
FIG. 42 is a graph related to the relationship between the IR/UV ratio (%) and the physical film thickness (nm) of a second Al layer as a fourth layer in a simulation in each of examples 81 to 87 and comparative example 83.

Further, the relationship between the IR/UV ratio (%) and the physical film thickness of the second Al layer as the fourth layer (fourth-layer Al film thickness: nm) in a simulation in each of examples 81 to 87 and comparative example 83, is shown in FIG. 42.

In comparative example 83 in which the second Al layer as the fourth layer is absent, the IR/UV ratio is not lower than 95%. Meanwhile, in each of examples 81 to 87 in which the physical film thickness of the second Al layer as the fourth layer is not smaller than 5 nm and not larger than 35 nm, the IR/UV ratio is not higher than 75%. In particular, in each of examples 81 to 86 in which the physical film thickness of the second Al layer as the fourth layer is not smaller than 5 nm and not larger than 30 nm, the IR/UV ratio is not higher than 70.2%.

From these circumstances, it is found that the physical film thickness of the second Al layer (the Al layer that is closest to the air side) is preferably not smaller than 5 nm and not larger than 35 nm and more preferably not smaller than 5 nm and not larger than 30 nm.

As examples 91 to 97, optical products based on the above embodiment 2-5 were designed for reflection of UV and transmission of IR (for a light concentrator or the like) and were subjected to simulation. Numbers for examples 88 to 90 and comparative examples 84 to 92 have been skipped.

Physical film thicknesses other than the physical film thickness of the third Al layer as the seventh layer in the optical multilayer film (MLHALHALH) in embodiment 2-5 are equal among examples 91 to 97. Also, the physical film thickness of the underlayer 3 is equal (10 nm) thereamong.

Further, comparative example 93 in which the physical film thickness of the third Al layer as the seventh layer in the optical multilayer film was set to 0 nm and the physical film thicknesses of the other layers were set to be equal to those in examples 91 to 97, was also designed and subjected to simulation.

The ordinal numbers, the materials, and the physical film thicknesses (nm) of the respective layers and the IR/UV ratios in examples 91 to 97 and comparative example 93 are indicated in the following Table 15. Considering the space, the physical film thickness of the underlayer 3 and the total physical film thickness are not indicated, "Example" is indicated as "Ex.", and "Comparative example" is indicated as "Com." in Table 15 and subsequent tables.

Figure 43:
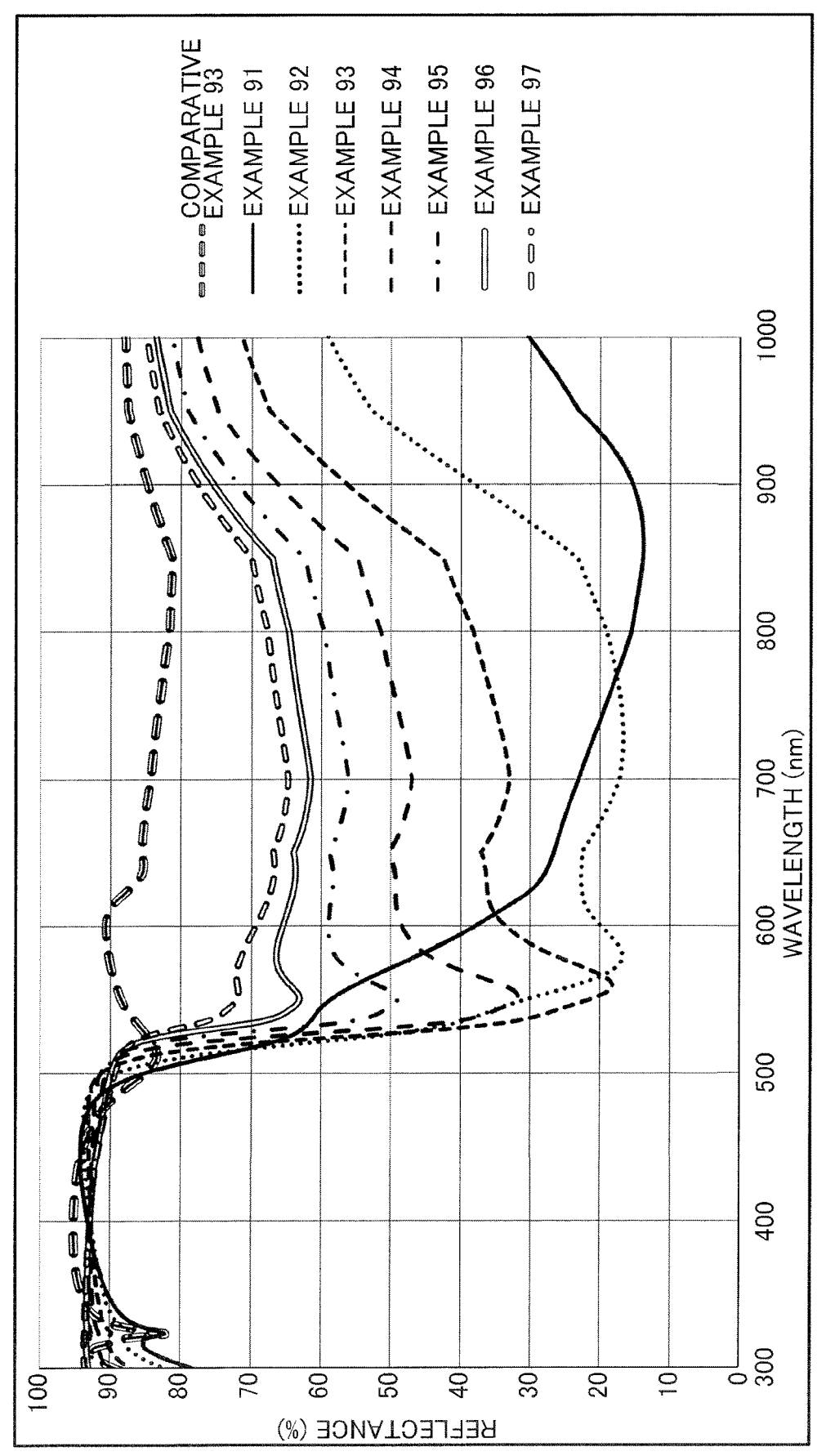
FIG. 43 is a graph of spectral reflectance distributions (reflection angle δ=65°), in the visible range and the ranges adjacent thereto, that are related to simulative examples 91 to 97 and comparative example 93.

Also, simulative spectral reflectance distributions (reflection angle δ=65°) of examples 91 to 97 and comparative example 93 are shown in FIG. 43.

Figure 44:
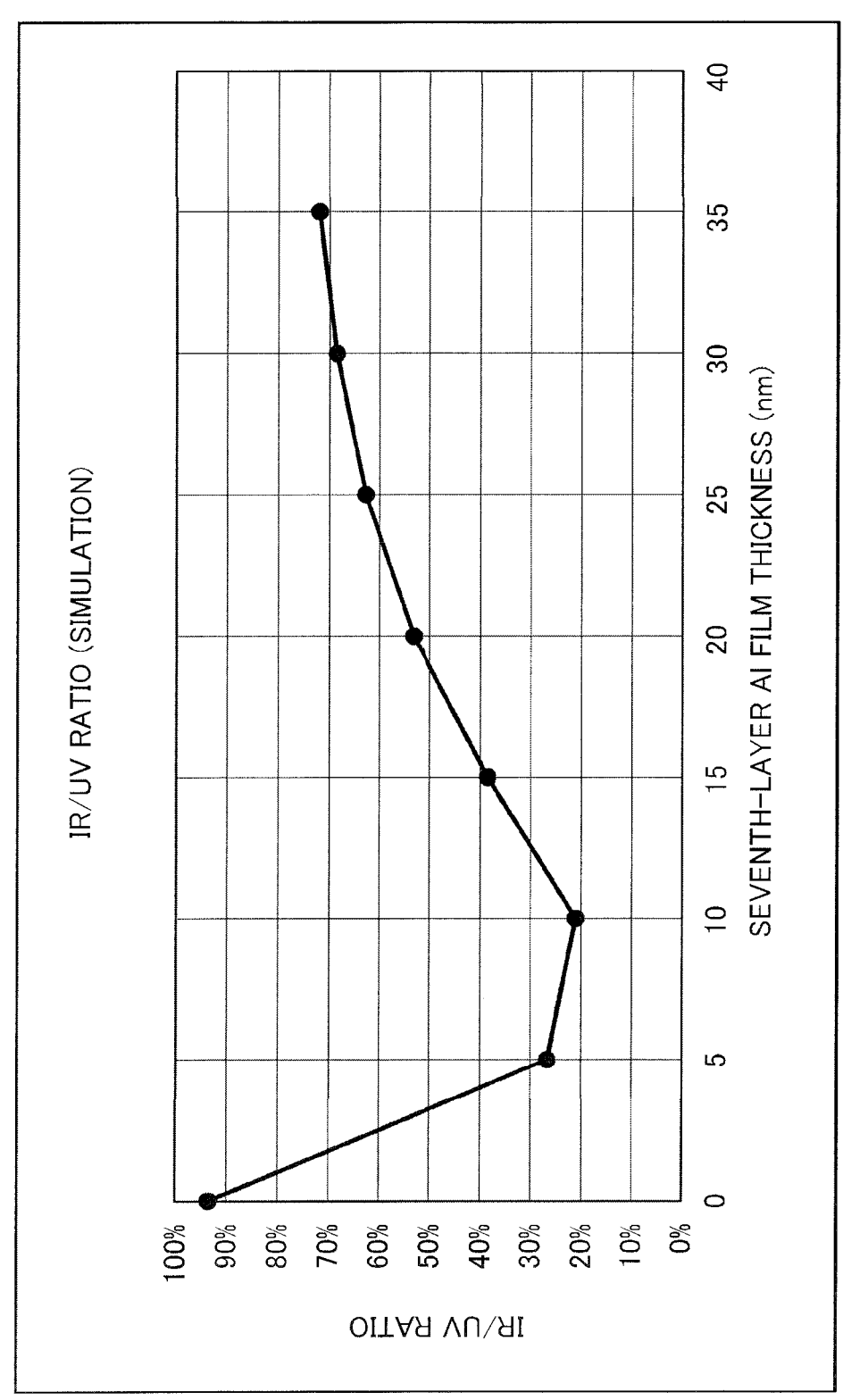
FIG. 44 is a graph related to the relationship between the IR/UV ratio (%) and the physical film thickness (nm) of a second Al layer as a seventh layer in a simulation in each of examples 91 to 97 and comparative example 93.

Further, the relationship between the IR/UV ratio (%) and the physical film thickness of the third Al layer as the seventh layer (seventh-layer Al film thickness: nm) in a simulation in each of examples 91 to 97 and comparative example 93, is shown in FIG. 44.

TABLE 14

| | Underlayer Al₂O₃ | M First layer Al | L Second layer SiO₂ | H Third layer HfO₂ | A Fourth layer Al | H Fifth layer HfO₂ | Total film thickness | IR/UV ratio |
|---|---|---|---|---|---|---|---|---|
| Comparative example 83 | 10.0 | 130.0 | 52.0 | 84.0 | 0.0 | 65.0 | 331.0 | 97.0% |
| Example 81 | 10.0 | 130.0 | 52.0 | 84.0 | 5.0 | 65.0 | 336.0 | 34.4% |
| Example 82 | 10.0 | 130.0 | 52.0 | 84.0 | 10.0 | 65.0 | 341.0 | 15.5% |
| Example 83 | 10.0 | 130.0 | 52.0 | 84.0 | 15.0 | 65.0 | 346.0 | 32.8% |
| Example 84 | 10.0 | 130.0 | 52.0 | 84.0 | 20.0 | 65.0 | 351.0 | 51.0% |
| Example 85 | 10.0 | 130.0 | 52.0 | 84.0 | 25.0 | 65.0 | 356.0 | 63.0% |
| Example 86 | 10.0 | 130.0 | 52.0 | 84.0 | 30.0 | 65.0 | 361.0 | 70.2% |
| Example 87 | 10.0 | 130.0 | 52.0 | 84.0 | 35.0 | 65.0 | 366.0 | 74.3% |

TABLE 15

| | M First layer Al | L Second layer SiO$_2$ | H Third layer HfO$_2$ | A Fourth layer Al | L Fifth layer SiO$_2$ | H Sixth layer HfO$_2$ | A Seventh layer Al | L Eighth layer SiO$_2$ | H Ninth layer HfO$_2$ | IR/UV ratio |
|---|---|---|---|---|---|---|---|---|---|---|
| Com. 93 | 130.0 | 58.3 | 112.1 | 50.0 | 62.7 | 72.9 | 0.0 | 32.3 | 44.4 | 93.6% |
| Ex. 91 | 130.0 | 58.3 | 112.1 | 50.0 | 62.7 | 72.9 | 5.0 | 32.3 | 44.4 | 26.6% |
| Ex. 92 | 130.0 | 58.3 | 112.1 | 50.0 | 62.7 | 72.9 | 10.0 | 32.3 | 44.4 | 21.1% |
| Ex. 93 | 130.0 | 58.3 | 112.1 | 50.0 | 62.7 | 72.9 | 15.0 | 32.3 | 44.4 | 38.5% |
| Ex. 94 | 130.0 | 58.3 | 112.1 | 50.0 | 62.7 | 72.9 | 20.0 | 32.3 | 44.4 | 53.2% |
| Ex. 95 | 130.0 | 58.3 | 112.1 | 50.0 | 62.7 | 72.9 | 25.0 | 32.3 | 44.4 | 62.7% |
| Ex. 96 | 130.0 | 58.3 | 112.1 | 50.0 | 62.7 | 72.9 | 30.0 | 32.3 | 44.4 | 68.5% |
| Ex. 97 | 130.0 | 58.3 | 112.1 | 50.0 | 62.7 | 72.9 | 35.0 | 32.3 | 44.4 | 71.9% |

Figure 45:
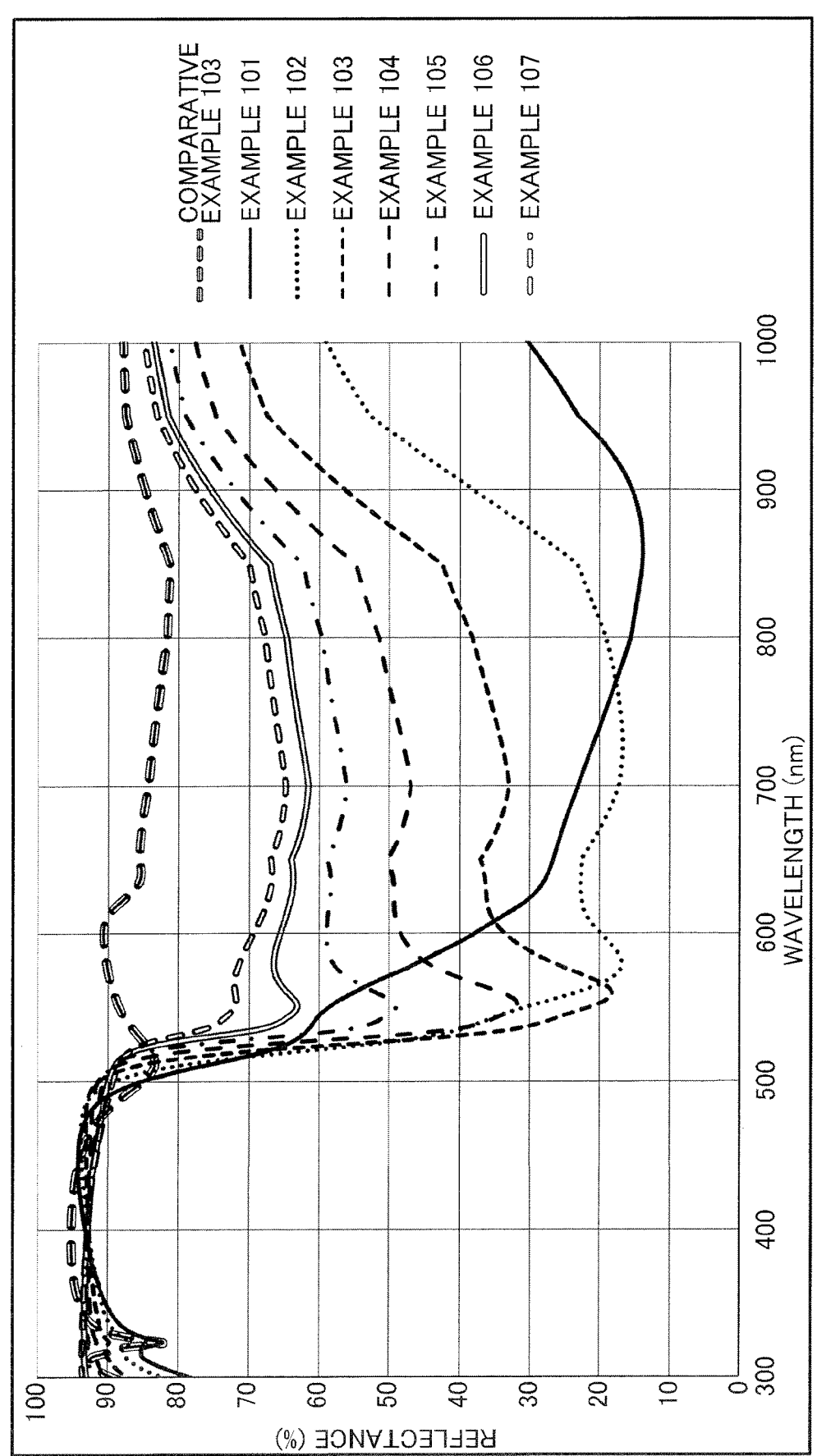
FIG. 45 is a graph of spectral reflectance distributions (reflection angle δ=65°), in the visible range and the ranges adjacent thereto, that are related to simulative examples 101 to 107 and comparative example 103.

In comparative example 93 in which the third Al layer as the seventh layer is absent, the IR/UV ratio is not lower than 90%. Meanwhile, in each of examples 91 to 97 in which the physical film thickness of the third Al layer as the seventh layer is not smaller than 5 nm and not larger than 35 nm, the IR/UV ratio is not higher than 72%. In particular, in each of examples 91 to 96 in which the physical film thickness of the Also, simulative spectral reflectance distributions (reflection angle δ=65°) of examples 101 to 107 and comparative example 103 are shown in FIG. 45.

Figure 46:
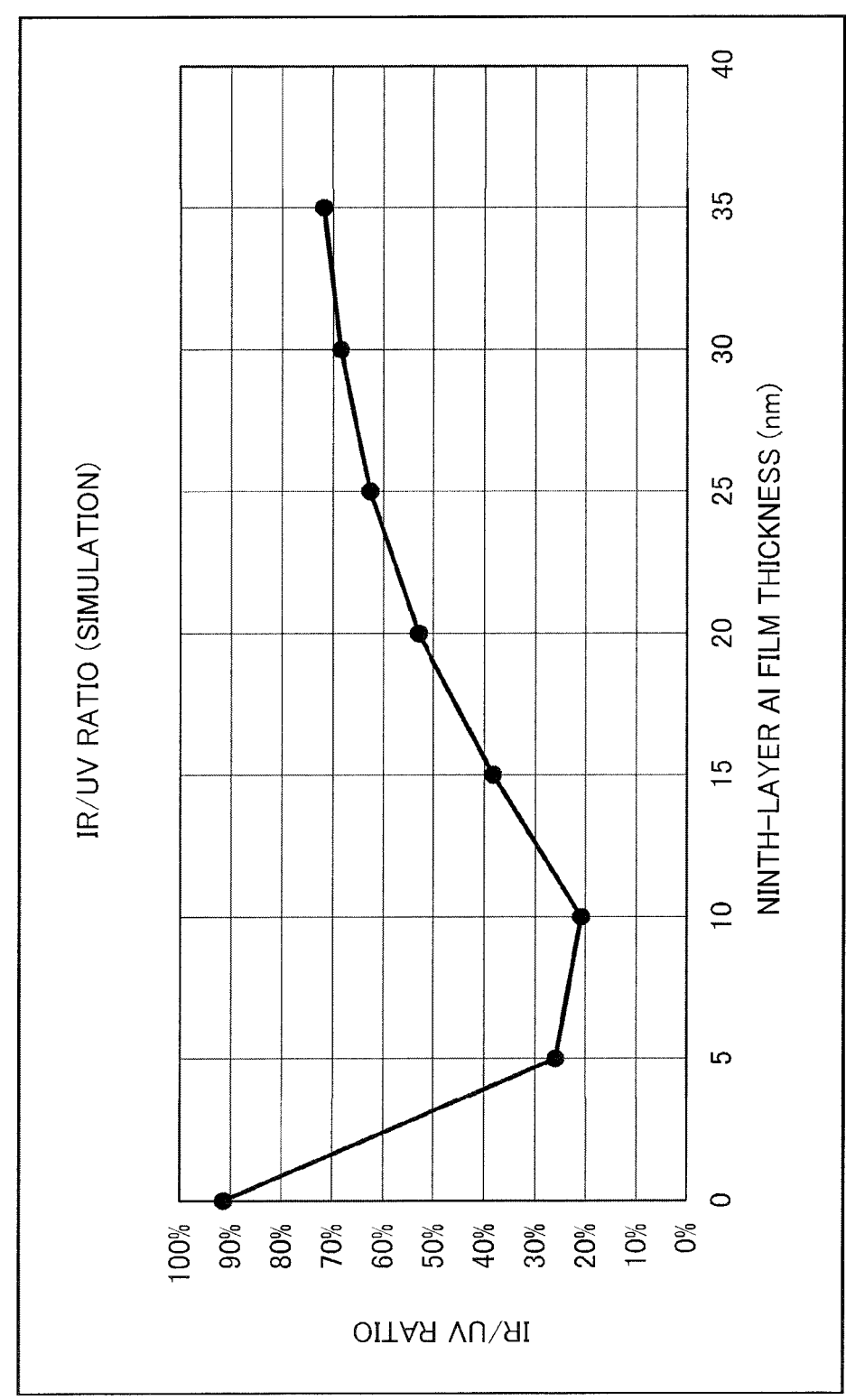
FIG. 46 is a graph related to the relationship between the IR/UV ratio (%) and the physical film thickness (nm) of a second Al layer as a ninth layer in a simulation in each of examples 101 to 107 and comparative example 103.

Further, the relationship between the IR/UV ratio (%) and the physical film thickness of the third Al layer as the ninth layer (ninth-layer Al film thickness: nm) in a simulation in each of examples 101 to 107 and comparative example 103, is shown in FIG. 46.

TABLE 16

| | M First layer Al | L Second layer SiO$_2$ | H Third layer HfO$_2$ | L Fourth layer SiO$_2$ | H Fifth layer HfO$_2$ | A Sixth layer Al | L Seventh layer SiO$_2$ | H Eighth layer HfO$_2$ | A Ninth layer Al | L Tenth layer SiO$_2$ | H Eleventh layer HfO$_2$ | IR/UV ratio |
|---|---|---|---|---|---|---|---|---|---|---|---|---|
| Com. 103 | 130.0 | 53.8 | 33.0 | 13.0 | 60.3 | 34.5 | 62.7 | 72.9 | 0.0 | 31.5 | 45.0 | 91.4% |
| Ex. 101 | 130.0 | 53.8 | 33.0 | 13.0 | 60.3 | 34.5 | 62.7 | 72.9 | 5.0 | 31.5 | 45.0 | 25.9% |
| Ex. 102 | 130.0 | 53.8 | 33.0 | 13.0 | 60.3 | 34.5 | 62.7 | 72.9 | 10.0 | 31.5 | 45.0 | 20.9% |
| Ex. 103 | 130.0 | 53.8 | 33.0 | 13.0 | 60.3 | 34.5 | 62.7 | 72.9 | 15.0 | 31.5 | 45.0 | 38.3% |
| Ex. 104 | 130.0 | 53.8 | 33.0 | 13.0 | 60.3 | 34.5 | 62.7 | 72.9 | 20.0 | 31.5 | 45.0 | 53.0% |
| Ex. 105 | 130.0 | 53.8 | 33.0 | 13.0 | 60.3 | 34.5 | 62.7 | 72.9 | 25.0 | 31.5 | 45.0 | 62.6% |
| Ex. 106 | 130.0 | 53.8 | 33.0 | 13.0 | 60.3 | 34.5 | 62.7 | 72.9 | 30.0 | 31.5 | 45.0 | 68.4% |
| Ex. 107 | 130.0 | 53.8 | 33.0 | 13.0 | 60.3 | 34.5 | 62.7 | 72.9 | 35.0 | 31.5 | 45.0 | 71.8% | third Al layer as the seventh layer is not smaller than 5 nm and not larger than 30 nm, the IR/UV ratio is not higher than 70%.

From these circumstances, it is found that the physical film thickness of the third Al layer (the Al layer that is closest to the air side) is preferably not smaller than 5 nm and not larger than 35 nm and more preferably not smaller than 5 nm and not larger than 30 nm.

As examples 101 to 107, optical products based on the above embodiment 2-6 were designed for reflection of UV and transmission of IR (for a light concentrator or the like) and were subjected to simulation. Numbers for examples 98 to 100 and comparative examples 94 to 102 have been skipped.

Physical film thicknesses other than the physical film thickness of the third Al layer as the ninth layer in the optical multilayer film (MLHLHALHALH) in embodiment 2-6 are equal among examples 101 to 107. Also, the physical film thickness of the underlayer 3 is equal (10 nm) thereamong.

Further, comparative example 103 in which the physical film thickness of the third Al layer as the ninth layer in the optical multilayer film was set to 0 nm and the physical film thicknesses of the other layers were set to be equal to those in examples 101 to 107, was also designed and subjected to simulation.

The ordinal numbers, the materials, and the physical film thicknesses (nm) of the respective layers and the IR/UV ratios in examples 101 to 107 and comparative example 103 are indicated in the following Table 16.

In comparative example 103 in which the third Al layer as the ninth layer is absent, the IR/UV ratio is not lower than 90%. Meanwhile, in each of examples 101 to 107 in which the physical film thickness of the third Al layer as the ninth layer is not smaller than 5 nm and not larger than 35 nm, the IR/UV ratio is not higher than 72%. In particular, in each of examples 101 to 106 in which the physical film thickness of the third Al layer as the ninth layer is not smaller than 5 nm and not larger than 30 nm, the IR/UV ratio is not higher than 70%.

From these circumstances, it is found that the physical film thickness of the third Al layer (the Al layer that is closest to the air side) is preferably not smaller than 5 nm and not larger than 35 nm and more preferably not smaller than 5 nm and not larger than 30 nm.

As examples 111 to 117, optical products based on the above embodiment 2-7 were designed for reflection of VL and transmission of IR (for a periscope camera or the like) and were subjected to simulation. Numbers for examples 108 to 110 and comparative examples 104 to 112 have been skipped.

Physical film thicknesses other than the physical film thickness of the fourth Al layer as the ninth layer in the optical multilayer film (MHALHALHALH) in embodiment 2-7 are equal among examples 111 to 117. Also, the physical film thickness of the underlayer 3 is equal (10 nm) thereamong.

Further, comparative example 113 in which the physical film thickness of the fourth Al layer as the ninth layer in the optical multilayer film was set to 0 nm and the physical film thicknesses of the other layers were set to be equal to those in examples 111 to 117, was also designed and subjected to simulation.

The ordinal numbers, the materials, and the physical film thicknesses (nm) of the respective layers and the IR/VL ratios in examples 111 to 117 and comparative example 113 are indicated in the following Table 17.

Figure 47:
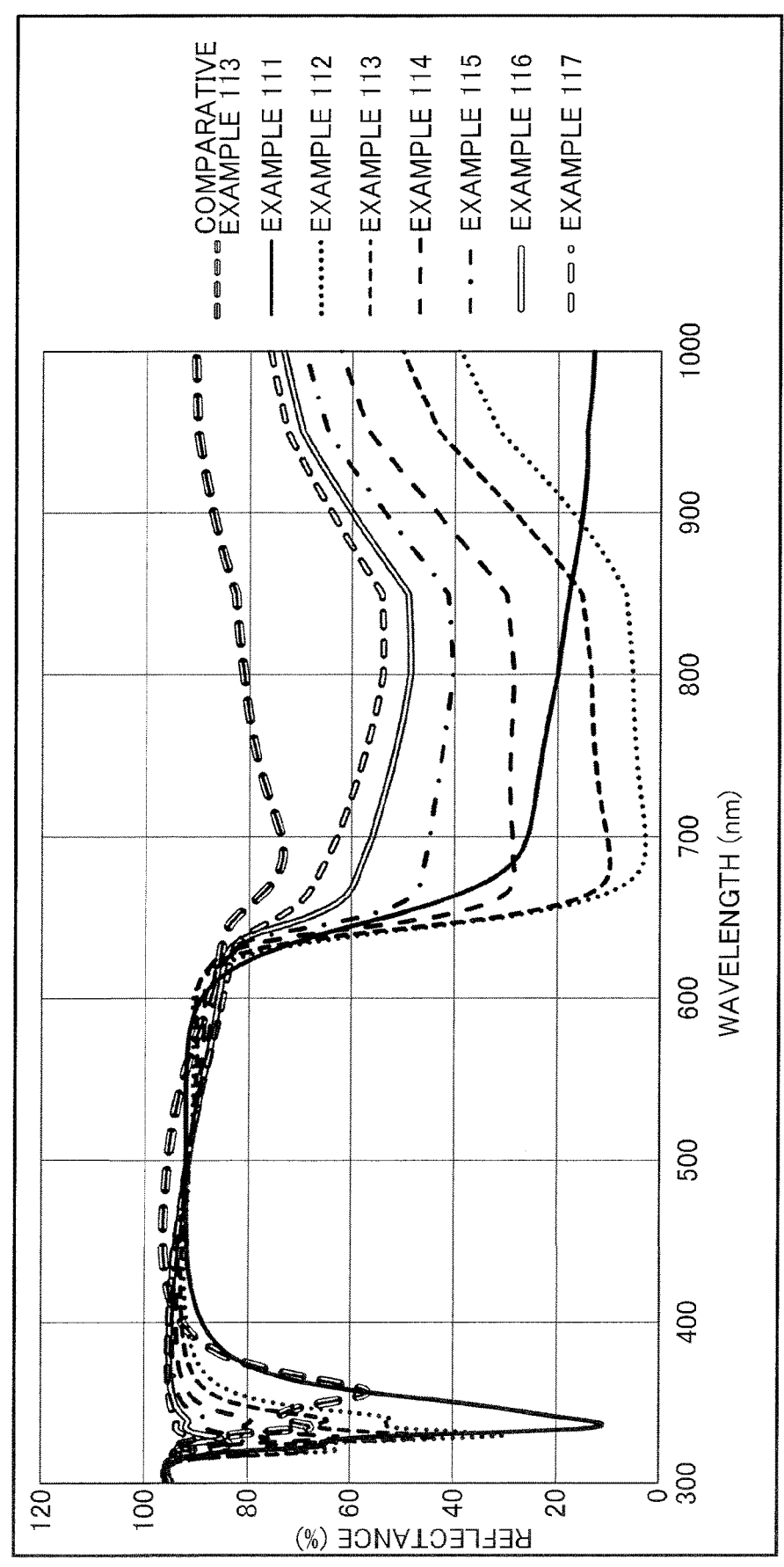
FIG. 47 is a graph of spectral reflectance distributions (reflection angle δ=45°), in the visible range and the ranges adjacent thereto, that are related to simulative examples 111 to 117 and comparative example 113.

Also, simulative spectral reflectance distributions (reflection angle δ=45°) of examples 111 to 117 and comparative example 113 are shown in FIG. 47.

Figure 48:
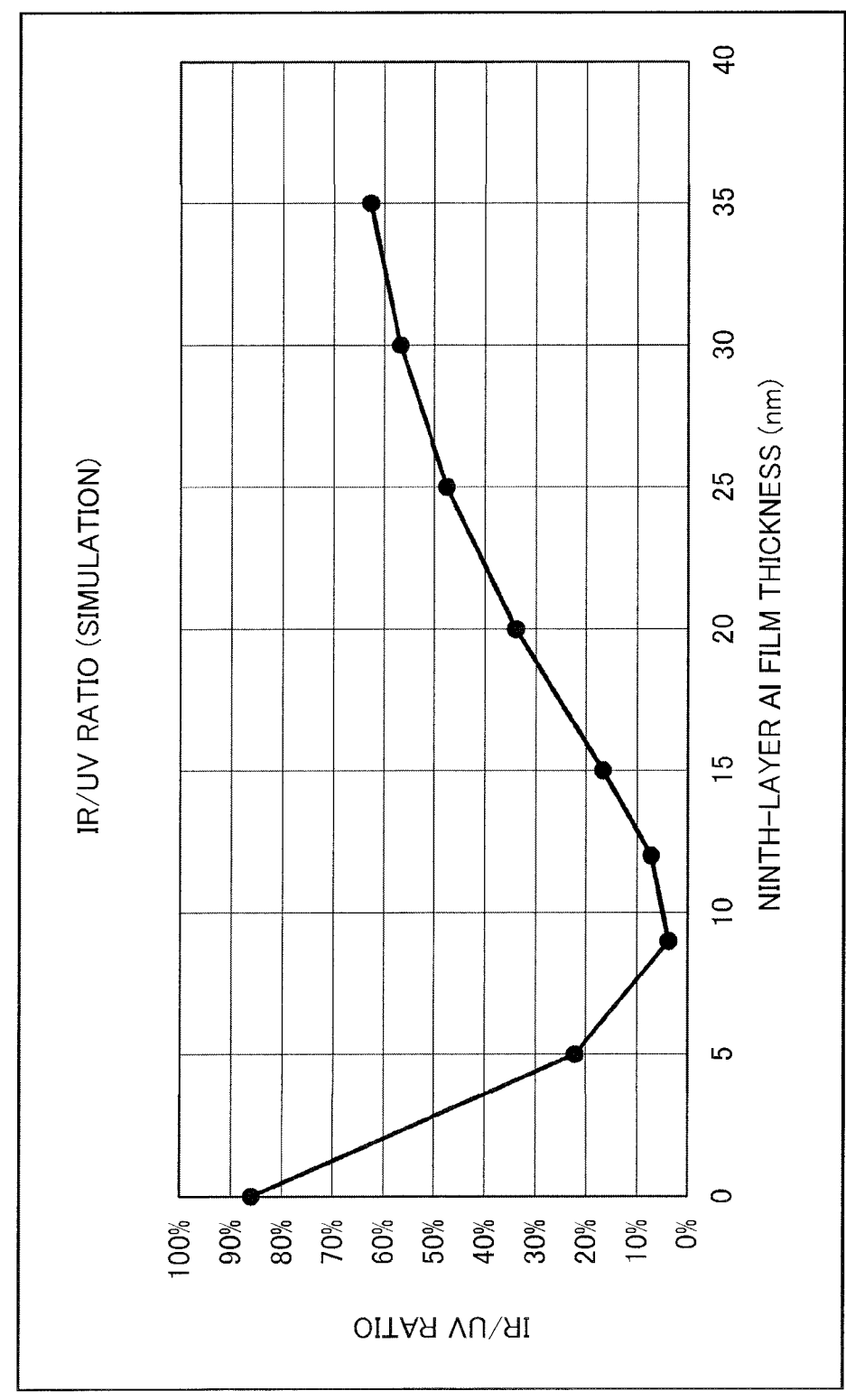
FIG. 48 is a graph related to the relationship between the IR/VL ratio (%) and the physical film thickness (nm) of a fourth Al layer as a ninth layer in a simulation in each of examples 111 to 117 and comparative example 113.

Further, the relationship between the IR/VL ratio (%) and the physical film thickness of the fourth Al layer as the ninth layer (ninth-layer Al film thickness: nm) in a simulation in each of examples 111 to 117 and comparative example 113, is shown in FIG. 48. In FIG. 48, the IR/VL ratio in an example in which the physical film thickness of the ninth layer is 9 nm is also shown.

Figure 49:
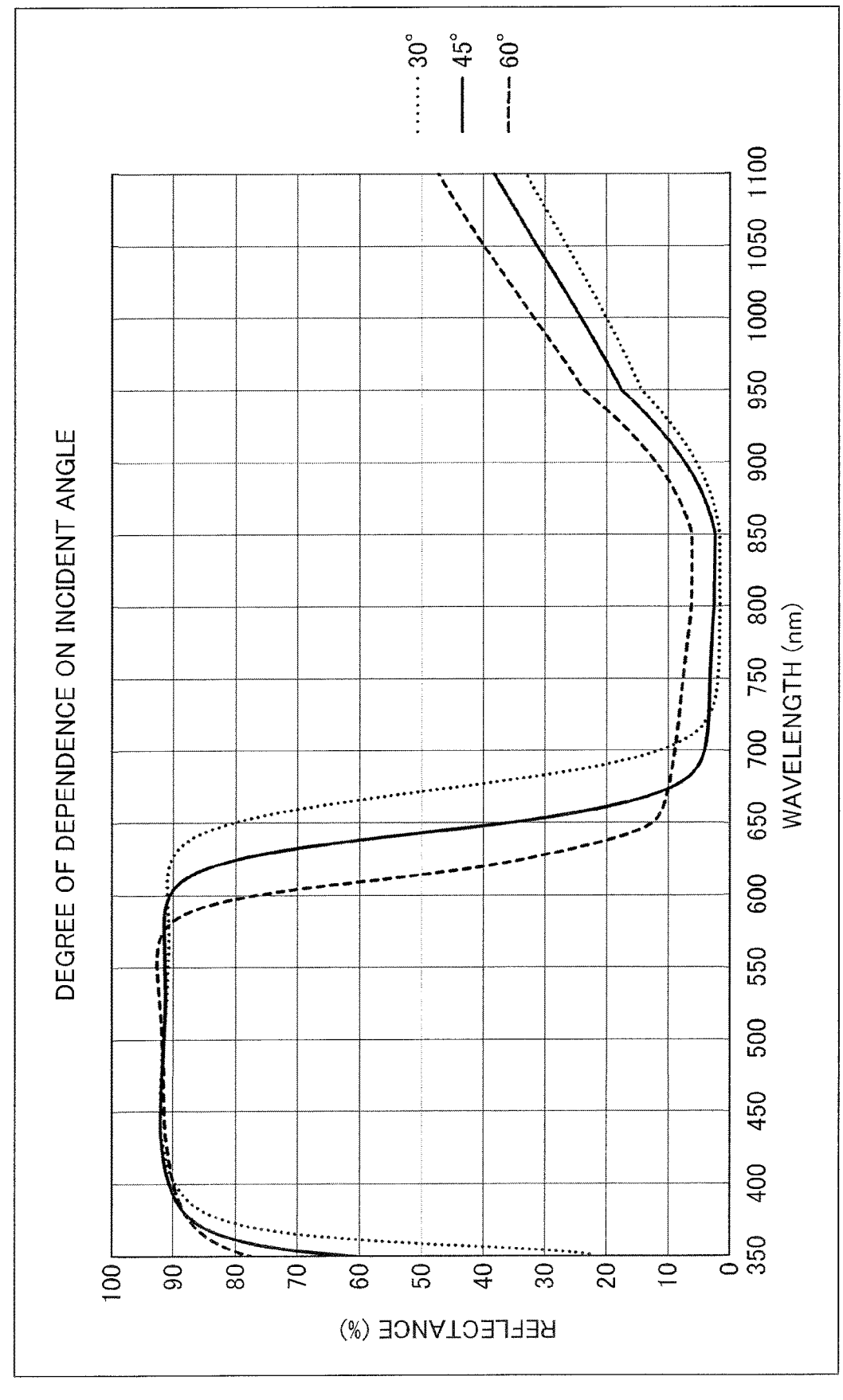
FIG. 49 is a graph related to simulative spectral reflectance distributions, of a modification (ninth-layer Al film thickness: 7 nm) of example 111, that correspond to three types of reflection angles δ=30°, 45°, and 60°.

In addition, in order to ascertain the degree of dependence on the incident angle, simulative spectral reflectance distributions, of a modification (ninth-layer Al film thickness: 7 nm) of example 111, that correspond to three types of reflection angles δ=30°, 45°, and 60° are shown in FIG. 49.

Regarding the degree of dependence on the incident angle, if focus is placed on the short wavelength side (400 to 600 nm) and the long wavelength side (700 to 900 nm) in FIG. 49, it is found that a spectral reflectance distribution with the reflection angle δ being 45−15=30°, a spectral reflectance distribution with the reflection angle δ being 45°, and a spectral reflectance distribution with the reflection angle δ being 45+15=60° are similar to one another in the modification of example 111. That is, the degree of dependence, on the incident angle, of the spectral reflectance distribution of the modification of example 111 is low, thereby realizing a mirror having a more favorable performance. Similar to the modification of example 111, the degrees of dependence, on the incident angle, of the spectral reflectance distributions of examples 111 to 117 are also low.

As examples 121 to 128, optical products respectively based on the above embodiments 3-1 to 3-8 were designed for reflection of UV and transmission of IR (for a light concentrator or the like) and were subjected to simulation. Numbers for examples 118 to 120 have been skipped.

In each of examples 121 to 127, the physical film thickness of the Al layer that is closest to the air side is 10 nm.

TABLE 17

|  | M First layer Al | H Second layer HfO$_2$ | A Third layer Al | L Fourth layer SiO$_2$ | H Fifth layer HfO$_2$ | A Sixth layer Al | L Seventh layer SiO$_2$ | H Eighth layer HfO$_2$ | A Ninth layer Al | L Tenth layer SiO$_2$ | H Eleventh layer HfO$_2$ | IR/VL ratio |
|---|---|---|---|---|---|---|---|---|---|---|---|---|
| Com. 113 | 130.0 | 89.1 | 17.1 | 97.2 | 78.1 | 28.2 | 95.2 | 78.0 | 0.0 | 35.4 | 54.6 | 86.0% |
| Ex. 111 | 130.0 | 89.1 | 17.1 | 97.2 | 78.1 | 28.2 | 95.2 | 78.0 | 5.0 | 35.4 | 54.6 | 22.2% |
| Ex. 112 | 130.0 | 89.1 | 17.1 | 97.2 | 78.1 | 28.2 | 95.2 | 78.0 | 12.0 | 35.4 | 54.6 | 7.2% |
| Ex. 113 | 130.0 | 89.1 | 17.1 | 97.2 | 78.1 | 28.2 | 95.2 | 78.0 | 15.0 | 35.4 | 54.6 | 16.7% |
| Ex. 114 | 130.0 | 89.1 | 17.1 | 97.2 | 78.1 | 28.2 | 95.2 | 78.0 | 20.0 | 35.4 | 54.6 | 33.9% |
| Ex. 115 | 130.0 | 89.1 | 17.1 | 97.2 | 78.1 | 28.2 | 95.2 | 78.0 | 25.0 | 35.4 | 54.6 | 47.5% |
| Ex. 116 | 130.0 | 89.1 | 17.1 | 97.2 | 78.1 | 28.2 | 95.2 | 78.0 | 30.0 | 35.4 | 54.6 | 56.8% |
| Ex. 117 | 130.0 | 89.1 | 17.1 | 97.2 | 78.1 | 28.2 | 95.2 | 78.0 | 35.0 | 35.4 | 54.6 | 62.7% |

In comparative example 113 in which the fourth Al layer as the ninth layer is absent, the IR/VL ratio is higher than 85%. Meanwhile, in each of examples 111 to 117 in which the physical film thickness of the fourth Al layer as the ninth layer is not smaller than 5 nm and not larger than 35 nm, the IR/VL ratio is not higher than 63%. In particular, in each of examples 111 to 116 in which the physical film thickness of the fourth Al layer as the ninth layer is not smaller than 5 nm and not larger than 30 nm, the IR/VL ratio is not higher than 60%.

From these circumstances, it is found that the physical film thickness of the fourth Al layer (the Al layer that is closest to the air side) is preferably not smaller than 5 nm and not larger than 35 nm and more preferably not smaller than 5 nm and not larger than 30 nm.

In example 128, the physical film thickness of the Al layer that is closest to the air side is 5 nm. The physical film thickness of the underlayer 3 is equal (10 nm) among examples 121 to 128.

The ordinal numbers, the materials, and the physical film thicknesses (nm) of the respective layers in examples 121 to 128 are indicated in the following Table 18.

Figure 50:
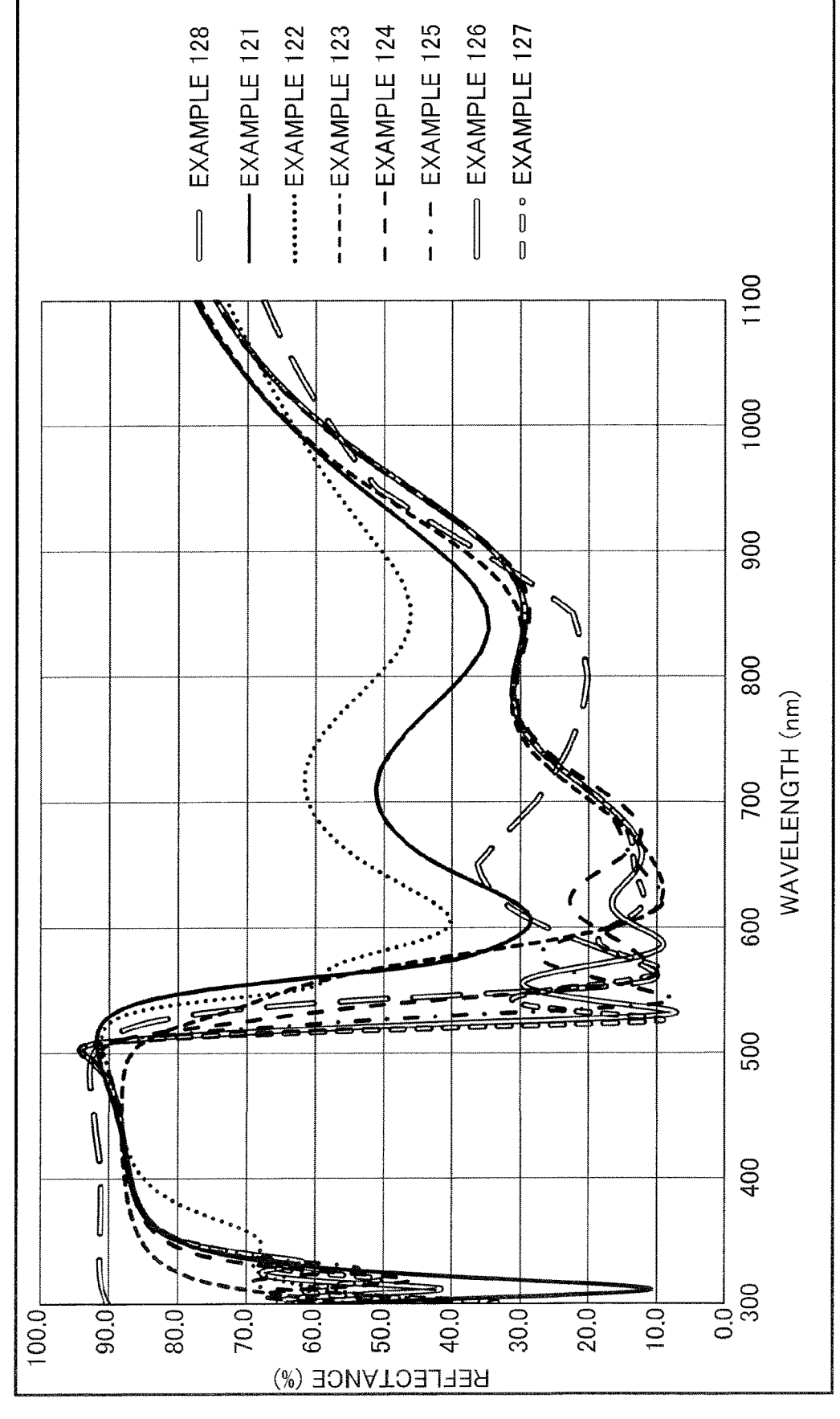
FIG. 50 is a graph of spectral reflectance distributions (reflection angle δ=65°), in the visible range and the ranges adjacent thereto, that are related to simulative examples 121 to 128.

Also, simulative spectral reflectance distributions (reflection angle δ=60°) of examples 121 to 128 are shown in FIG. 50.

Figure 51:
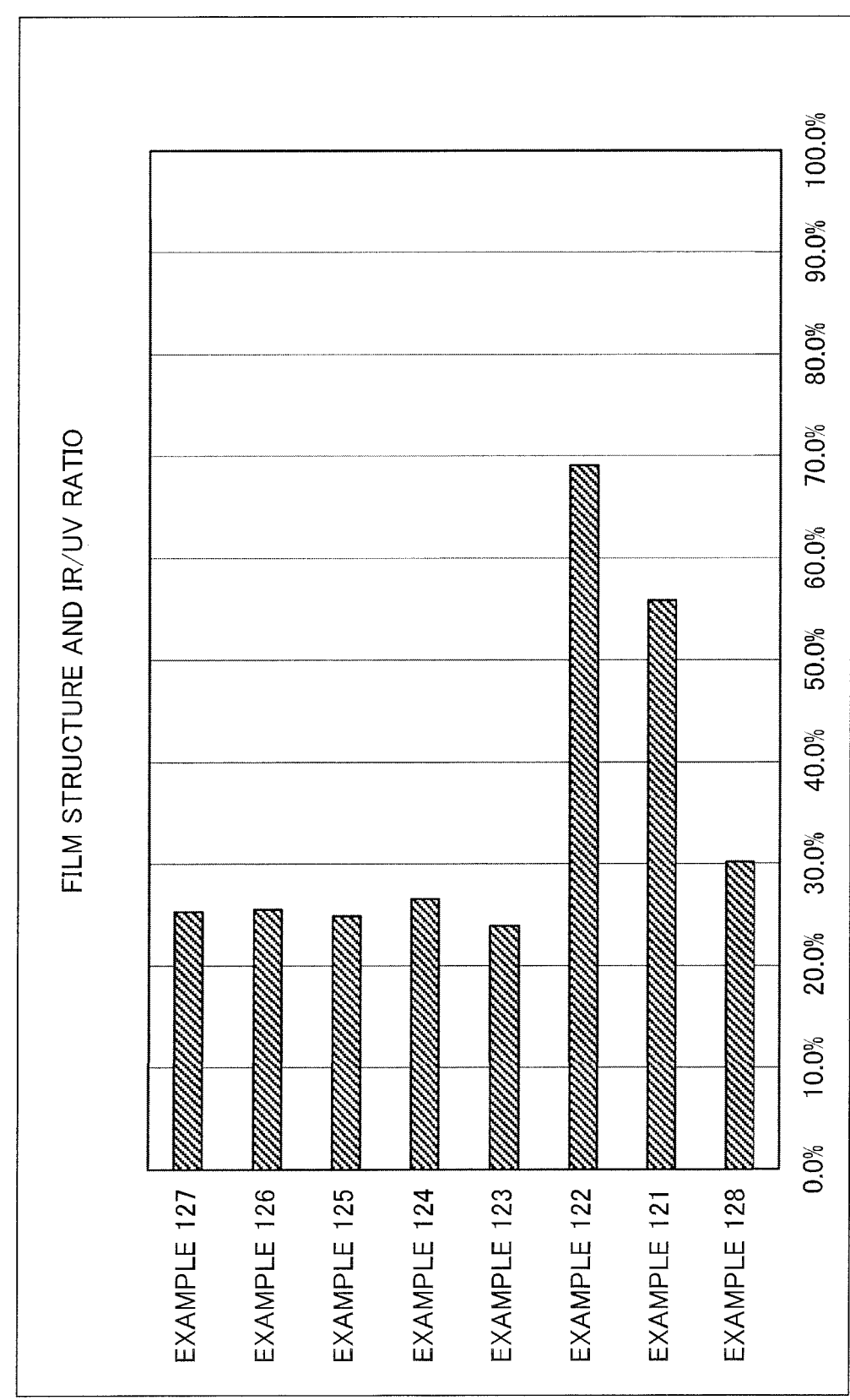
FIG. 51 is a graph related to the IR/UV ratios (%) in examples 121 to 128.

Further, the IR/UV ratios (%) in examples 121 to 128 are shown in FIG. 51.

TABLE 18

| | Example 121 | | Example 122 | | Example 123 | | Example 124 | |
|---|---|---|---|---|---|---|---|---|
| | Material | Film thickness | Material | Film thickness | Material | Film thickness | Material | Film thickness |
| Underlayer | $Al_2O_3$ | 10.0 | $Al_2O_3$ | 10.0 | $Al_2O_3$ | 10.0 | $Al_2O_3$ | 10.0 |
| First layer | Al | 130.0 | Al | 130.0 | Al | 130.0 | Al | 130.0 |
| Second layer | $HfO_2$ | 121.2 | $SiO_2$ | 209.5 | $SiO_2$ | 94.5 | $SiO_2$ | 94.5 |
| Third layer | Al | 10.0 | Al | 10.0 | $HfO_2$ | 65.8 | $HfO_2$ | 65.8 |
| Fourth layer | $SiO_2$ | 174.3 | $SiO_2$ | 209.5 | Al | 10.0 | Al | 10.0 |
| Fifth layer | — | — | — | — | $HfO_2$ | 65.8 | $SiO_2$ | 94.5 |
| Sixth layer | — | — | — | — | — | — | $HfO_2$ | 65.8 |
| Seventh layer | — | — | — | — | — | — | Al | 10.0 |
| Eighth layer | — | — | — | — | — | — | $HfO_2$ | 65.8 |
| Ninth layer | — | — | — | — | — | — | — | — |
| Tenth layer | — | — | — | — | — | — | — | — |
| Eleventh layer | — | — | — | — | — | — | — | — |
| Twelfth layer | — | — | — | — | — | — | — | — |
| Thirteenth layer | — | — | — | — | — | — | — | — |
| Fourteenth layer | — | — | — | — | — | — | — | — |
| Fifteenth layer | — | — | — | — | — | — | — | — |
| Sixteenth layer | — | — | — | — | — | — | — | — |
| Seventeenth layer | — | — | — | — | — | — | — | — |

| | Example 125 | | Example 126 | | Example 127 | | Example 128 | |
|---|---|---|---|---|---|---|---|---|
| | Material | Film thickness | Material | Film thickness | Material | Film thickness | Material | Film thickness |
| Underlayer | $Al_2O_3$ | 10.0 | $Al_2O_3$ | 10.0 | $Al_2O_3$ | 10.0 | $Al_2O_3$ | 10.0 |
| First layer | Al | 130.0 | Al | 130.0 | Al | 130.0 | Al | 123.0 |
| Second layer | $SiO_2$ | 94.5 | $SiO_2$ | 94.5 | $SiO_2$ | 94.5 | $SiO_2$ | 69.0 |
| Third layer | $HfO_2$ | 65.8 | $HfO_2$ | 65.8 | $HfO_2$ | 65.8 | $HfO_2$ | 42.5 |
| Fourth layer | Al | 10.0 | Al | 10.0 | Al | 10.0 | $SiO_2$ | 41.9 |
| Fifth layer | $SiO_2$ | 94.5 | $SiO_2$ | 94.5 | $SiO_2$ | 94.5 | Al | 5.0 |
| Sixth layer | $HfO_2$ | 65.8 | $HfO_2$ | 65.8 | $HfO_2$ | 65.8 | $SiO_2$ | 39.1 |
| Seventh layer | Al | 10.0 | Al | 10.0 | Al | 10.0 | $HfO_2$ | 35.7 |
| Eighth layer | $SiO_2$ | 94.5 | $SiO_2$ | 94.5 | $SiO_2$ | 94.5 | $SiO_2$ | 35.9 |
| Ninth layer | $HfO_2$ | 65.8 | $HfO_2$ | 65.8 | $HfO_2$ | 65.8 | — | — |
| Tenth layer | Al | 10.0 | Al | 10.0 | Al | 10.0 | — | — |
| Eleventh layer | $HfO_2$ | 65.8 | $SiO_2$ | 94.5 | $SiO_2$ | 94.5 | — | — |
| Twelfth layer | — | — | $HfO_2$ | 65.8 | $HfO_2$ | 65.8 | — | — |
| Thirteenth layer | — | — | Al | 10.0 | Al | 10.0 | — | — |
| Fourteenth layer | — | — | $HfO_2$ | 65.8 | $SiO_2$ | 94.5 | — | — |
| Fifteenth layer | — | — | — | — | $HfO_2$ | 65.8 | — | — |
| Sixteenth layer | — | — | — | — | Al | 10.0 | — | — |
| Seventeenth layer | — | — | — | — | $HfO_2$ | 65.8 | — | — |

In each of examples 121 to 128, reflection of UV and transmission of IR are realized, and the IR/UV ratio is not higher than 70%.

From these circumstances, it is found that sufficient reflection of UV and sufficient transmission of IR are realized in any of the film structures based on embodiments 3-1 to 3-8.

The film structures based on embodiments 3-1 to 3-8, and the like, are described again below.

Embodiment 3-1, example 121: MHAL
Embodiment 3-2, example 122: MLAL
Embodiment 3-3, example 123: MLHAH
Embodiment 3-4, example 124: MLHALHAH
Embodiment 3-5, example 125: MLHALHALHAH
Embodiment 3-6, example 126: MLHALHALHALHAH
Embodiment 3-7, example 127: MLHALHALHALHAL-HAH
Embodiment 3-8, example 128: MLHLALHL Each of examples 51 to 128 includes a base member 2 and an optical multilayer film formed indirectly above a film formation surface F of the base member 2. The optical multilayer film reflects light on a short wavelength side and suppresses reflection of light on a longer wavelength side than the light on the short wavelength side. The optical multilayer film has a first layer counted from the base member 2 side, the first layer being a metal layer M formed of a metal. The optical multilayer film further has one or more Al layers A, at least one of a low-refractive-index layer L disposed on the base member 2 side relative to each of the Al layers A and formed of a low-refractive-index material and a high-refractive-index layer H disposed on the base member 2 side relative to the Al layer A and formed of a high-refractive-index material, and at least one of a low-refractive-index layer L disposed on an air side relative to the Al layer A and formed of a low-refractive-index material and a high-refractive-index layer H disposed on the air side relative to the Al layer A and formed of a high-refractive-index material. The metal layer M has a physical film thickness of not smaller than 20 nm. The Al layer A that is closest to the air side has a physical film thickness of not smaller than 5 nm and not larger than 35 nm.

Therefore, a short-wavelength selective reflection type optical product in which deformation at the time of production is suppressed is provided.

Further, in each of examples 51 to 78 and 91 to 121, the high-refractive-index layer H is disposed to be adjacent to the substrate 2 side of the Al layer A that is closest to the air side, and the low-refractive-index layer L is disposed to be adjacent to the air side of the Al layer A that is closest to the air side. That is, "HAL" is attained for the Al layer A that is closest to the air side. Therefore, an optical product having a more favorable performance is provided.

Furthermore, in each of examples 51 to 128, the under-layer 3 for increasing the adhesiveness of the metal layer M to the base member 2 is provided between the base member 2 and the metal layer M. Therefore, an optical multilayer film is more stably provided, and the performance of the optical product is more stably exhibited.

In addition, in each of examples 51 to 128, the metal is at least one of Al and Ag, and thus an optical product is more easily formed.

Also, if any of examples 51 to 128 (in particular, examples 51 to 67, 81 to 107, and 121 to 128) is used for a light concentrator 101, a light concentrator capable of increasing the sensitivity of detecting a light in a predetermined wavelength range such as Cherenkov light is provided.

The invention claimed is:

1. An optical product comprising:
a base member; and
an optical multilayer film formed directly on or indirectly above a film formation surface of the base member, wherein
the optical multilayer film reflects light on a short wave-length side and suppresses reflection of light on a longer wavelength side than the light on the short wavelength side,
the optical multilayer film has a first layer, a second layer, a third layer, a fourth layer, a fifth layer, a sixth layer, a seventh layer, and an eighth layer counted from the base member side,
the first layer is a first Al layer formed of aluminum metal,
the second layer is a first low-refractive-index layer formed of a low-refractive-index material,
the third layer is a first high-refractive-index layer formed of a high-refractive-index material,
the fourth layer is a second low-refractive-index layer formed of a low-refractive-index material,
the fifth layer is a second Al layer formed of aluminum metal,
the sixth layer is a third low-refractive-index layer formed of a low-refractive-index material,
the seventh layer is a second high-refractive-index layer formed of a high-refractive-index material, and
the eighth layer is a fourth low-refractive-index layer formed of a low-refractive-index material.

2. The optical product according to claim 1, wherein the second Al layer has a physical film thickness of not smaller than 5 nm and not larger than 30 nm.

3. The optical product according to claim 1, wherein an underlayer for increasing an adhesiveness of the first Al layer to the base member is provided between the base member and the first Al layer.

4. The optical product according to claim 1, wherein a refractive index of each of the first low-refractive-index layer, the second low-refractive-index layer, the third low-refractive-index layer, and the fourth low-refrac-tive-index layer is lower than a refractive index of each of the first high-refractive-index layer and the second high-refractive-index layer.

5. An optical product comprising:
a base member; and
an optical multilayer film formed directly on or indirectly above a film formation surface of the base member, wherein

44 the optical multilayer film reflects light on a short wave-length side and suppresses reflection of a light on longer wavelength side than the light on the short wavelength side,
the optical multilayer film has a first layer counted from the base member side, the first layer being a metal layer formed of a metal,
the optical multilayer film further has
one or more Al layers,
at least one of a low-refractive-index layer disposed on the base member side relative to each of the Al layers and a high-refractive-index layer disposed on the base member side relative to the Al layer, and
at least one of a low-refractive-index layer disposed on an air side relative to the Al layer and a high-refractive-index layer disposed on the air side rela-tive to the Al layer,
wherein the low-refractive-index layer is formed of a low-refractive-index material and the high-re-fractive-index layer is formed of a high-refractive-index material,
the metal layer has a physical film thickness of not smaller than 20 nm, and
the Al layer that is closest to the air side has a physical film thickness of not smaller than 5 nm and not larger than 35 nm.

6. The optical product according to claim 5, wherein the high-refractive-index layer is disposed to be adjacent to a substrate side of the Al layer that is closest to the air side, and
the low-refractive-index layer is disposed to be adjacent to the air side of the Al layer that is closest to the air side.

7. The optical product according to claim 5, wherein an underlayer for increasing an adhesiveness of the metal layer to the base member is provided between the base member and the metal layer.

8. The optical product according to claim 5, wherein the metal is at least one of aluminum and silver.

9. The optical product according to claim 5, wherein the light on the short wavelength side is light in a wavelength range of shorter than 600 nm.

10. The optical product according to claim 9, wherein the light on the short wavelength side is light in a wavelength range of not shorter than 300 nm and not longer than 500 nm.

11. The optical product according to claim 5, wherein the light on the short wavelength side is light in a wavelength range of not shorter than 400 nm and not longer than 700 nm.

12. The optical product according to claim 5, wherein the low-refractive-index materials are at least any of $SiO_2$, $CaF_2$, and $MgF_2$.

13. The optical product according to claim 5, wherein the high-refractive-index materials are at least any of $Ta_2O_5$, $ZrO_2$, $TiO_2$, $Nb_2O_5$, $HfO_2$, $CeO_2$, $Al_2O_3$, and $YO_2$.

14. A light concentrator comprising
the optical product according to claim 5, and a semicon-ductor photomultiplier element (SiPM).

15. The light concentrator according to claim 14, com-prising
a light concentrator body having a tubular shape or a shape that is a part of the tubular shape, wherein
the optical multilayer film is disposed on an inner surface of the light concentrator body.

16. The light concentrator according to claim 14,
the light concentrator being for a gamma ray observation
  apparatus.

* * * * *